(12) United States Patent
Huang et al.

(10) Patent No.: US 12,011,982 B1
(45) Date of Patent: Jun. 18, 2024

(54) FOLDABLE COVER PLATE

(71) Applicant: Shenzhen WKSP Power Technology Co., Ltd., Shenzhen (CN)

(72) Inventors: Houwei Huang, Shenzhen (CN); Shengwen Hong, Shenzhen (CN); Xiaohong Yang, Shenzhen (CN); Qu Zhang, Shenzhen (CN); Yaping Xu, Shenzhen (CN)

(73) Assignee: SHENZHEN WKSP POWER TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/431,535

(22) Filed: Feb. 2, 2024

(30) Foreign Application Priority Data

Sep. 28, 2023 (CN) .......................... 202311282252.3

(51) Int. Cl.
*B60J 7/16* (2006.01)
*H02S 30/20* (2014.01)

(52) U.S. Cl.
CPC ............. *B60J 7/1607* (2013.01); *H02S 30/20* (2014.12)

(58) Field of Classification Search
CPC ....... B60J 7/14; B60J 7/141; B60J 7/16; B60J 7/1607; B60J 7/198; H02S 30/20
USPC ............. 296/100.02, 100.06, 100.07, 100.09
See application file for complete search history.

(56) References Cited

U.S. PATENT DOCUMENTS

| | | | | |
|---|---|---|---|---|
| 9,847,071 B2 * | 12/2017 | Nagao | ................... | G06F 1/3265 |
| 10,322,624 B2 * | 6/2019 | Facchinello | ............. | B60J 7/106 |
| 10,814,706 B2 * | 10/2020 | Ma | ........................... | B60J 7/198 |
| 11,407,294 B2 * | 8/2022 | Shen | ........................ | B60J 7/141 |
| 11,760,177 B2 * | 9/2023 | Rossi | ...................... | B60R 5/048 |
| | | | | 296/100.09 |
| 11,890,921 B2 * | 2/2024 | Qiu | ........................... | B60J 7/198 |
| 2012/0274091 A1 * | 11/2012 | Yue | ........................... | B60J 7/141 |
| | | | | 296/100.04 |
| 2013/0015678 A1 * | 1/2013 | Williamson | ........... | B60J 7/1607 |
| | | | | 296/100.09 |
| 2015/0165960 A1 * | 6/2015 | Yue | ........................... | B60J 7/141 |
| | | | | 296/100.09 |
| 2018/0331652 A1 * | 11/2018 | Okawa | ..................... | H02S 40/36 |
| 2023/0126558 A1 * | 4/2023 | Nguyen | ................ | B32B 27/306 |
| | | | | 156/71 |

* cited by examiner

*Primary Examiner* — Jason S Daniels
(74) *Attorney, Agent, or Firm* — Scully, Scott, Murphy & Presser, P.C.

(57) ABSTRACT

A foldable cover plate is configured to be mounted on a tail box of a mobile device, to cover an opening of the tail box. The foldable cover plate includes a cover plate assembly, a profile assembly, a connecting assembly, a waterproof assembly, and a locking assembly. The cover plate assembly includes three cover plates rotationally connected in sequence. The cover plate is rotationally folded over the remaining cover plates to expose the opening. The profile assembly is fixed to a periphery of the cover plate. The connecting assembly is connected to the profile assembly. The waterproof assembly is mounted to the profile assembly. The locking assembly is mounted to a face of the cover plate facing an interior of the tail box. The locking assembly is configured to fix the cover plate to the tail box. The foldable cover plate is easy to fold and has a stable structure.

20 Claims, 34 Drawing Sheets

41a

41a

FOLDABLE COVER PLATE

CROSS-REFERENCE TO RELATED APPLICATION

This application claims priority to and the benefit of Chinese Application Patent Application No. 202311282252.3, filed Sep. 28, 2023, the entire disclosure of which is hereby incorporated by reference.

TECHNICAL FIELD

The present disclosure relates to a technical field of covers for a tail box of a mobile device, and in particular relates to a foldable cover plate.

BACKGROUND

Conventional pickup trucks have an open tail box for loading cargoes (e.g., building materials, outdoor products, fruits, etc.). In order to protect the cargoes loaded in the tail box, a cover plate is usually used to cover the cargoes for waterproofing and dustproofing.

However, the conventional cover plate is not easy to open, which affects the user experience when loading and unloading cargoes from the tail box.

SUMMARY

The present disclosure provides a foldable cover plate. The foldable cover plate is configured to be mounted on a tail box of a mobile device, so as to cover an opening of the tail box, the foldable cover plate includes a cover plate assembly, a profile assembly, a connecting assembly, a waterproof assembly, and a locking assembly. The cover plate assembly includes three cover plates rotationally connected in sequence. The three cover plate includes a first cover plate, a second cover plate, and a third cover plate. The first cover plate is rotationally foldable to the second cover plate to expose the opening, or the first cover plate is rotationally foldable to the second cover plate, and the second cover plate is rotationally foldable to the third cover plate to expose the opening. The profile assembly is fixed to a periphery of the first cover plate, the second cover plate and the third cover plate. The connecting assembly is connected to the profile assembly. The waterproof assembly is mounted to the profile assembly. The locking assembly is mounted to a face of the first cover plate, the second cover plate and the third cover plate facing an interior of the tail box. The locking assembly is configured to fix the first cover plate, the second cover plate and the third cover plate to the tail box.

The locking assembly includes a first locking structure. The first locking structure includes a sliding rail, a sliding block, a threaded rod, a first locking member and a handle. The sliding rail is fixed to the third cover plate which is close to a driver's cab of the mobile device. The sliding rail defines a sliding groove. The sliding block is detachably slidably connected within the sliding groove of the sliding rail. The sliding block includes a first receiving portion located on one side of the sliding block facing the sliding rail. The first receiving portion defines a receiving groove. The sliding block further defines a first limiting hole penetrating through one side of the sliding block and interconnected with the receiving groove. The sliding block further includes two limiting ribs located on opposite sides of the first limiting hole. One end of the threaded rod is located within the receiving groove, the threaded rod is capable of rotating relative to the sliding block via the first limiting hole, and a gap between the two limiting ribs. The first locking member is sleeved on the threaded rod. The handle is threaded to the threaded rod. The two limiting ribs cooperatively limit a movement of the threaded rod so that the handle, the first locking member and the threaded rod are received within the sliding groove. When the threaded rod is subjected to a torsional force departing from the sliding groove, the threaded rod is capable of rotating relative to the sliding block such that the handle, the first locking member and the threaded rod are partially rotated to outside of the sliding groove. When the first locking member is located outside of the sliding groove, the first locking member is capable of fixing the first cover plate, the second cover plate and the third cover plate to the tail box through the handle.

The sliding groove has a first supporting surface for supporting the sliding block. The sliding block includes a first surface facing the first supporting surface, and a second surface opposite to the first surface. The first surface includes a first receiving portion defining a receiving groove. The sliding block further defines a first limiting hole penetrating through the first surface, the second surface, a side surface between the first surface and the second surface, and the first receiving portion. The first limiting hole is interconnected with the receiving groove. The first surface further includes two limiting ribs located on opposite sides of the first limiting hole.

The locking assembly includes a second locking structure. The second locking structure includes a sliding rail, a sliding block, a threaded rod, a second locking member, a hand shank and a rotating bolt. The sliding rail is fixed to the first cover plate which is proximate to a tail portion of the tail box and the second cover plate which is located in a center of the tail box. The sliding rail defines a sliding groove. The sliding block is detachably slidably connected within the sliding groove. One end of the threaded rod is detachably rotationally connected to the sliding block, the second locking member is sleeved on the threaded rod, the hand shank is rotationally coupled to the second locking member. The hand shank defines a mounting hole for mounting the rotating bolt; the rotating bolt is threaded to the threaded rod. The hand shank is configured to: rotate the rotating bolt in a circumferential direction of the threaded rod, so as to move the second locking member along the threaded rod; rotate relative to the second locking member to drive the second locking member, and drive the second locking member to rotate relative to the sliding block into the sliding groove or out of the sliding groove.

The sliding rail includes a bottom rail, two side rails located on two opposite sides of the bottom rail, two first limiting rails respectively connected to the two side rails, two second limiting rails respectively connected to the two first limiting rails. The two first limiting rails are inclined relative to the bottom rail so as to be in close proximity to each other. The two second limiting rails respectively extend from the two first limiting rails so as to be in close proximity to each other. The bottom rail, the two side rails, the two first limiting rails and the two second limiting rails cooperatively form the sliding groove.

The profile assembly includes a first profile. The first profile defines a first clamping hole and a first mounting groove penetrating axially through the first profile. The first clamping hole and the first mounting groove are separated by a first groove wall of the first mounting groove. The first profile is mounted on an edge of a circumferential side of the foldable cover plate through the first mounting groove. The connecting assembly includes: a first connecting member including a connecting body, and two first clamping portions respectively fixed to two ends of the connecting body. The first clamping portion includes a first clamping post, two first bending posts bent and connected to opposite sides of the first clamping post, and two second bending posts each bent and connected to a side of one of the two first bending posts away from the first clamping post; the two second bending posts are disposed in close proximity to each other. A shape and a dimension of the first clamping portion is adapted to the first clamping hole. The two first clamping portions are clamped with the first clamping holes of the two adjacent first profiles on the first cover plate or the third cover plate.

The first profile includes a first top wall and a first bottom wall opposite to the first top ball; the first clamping hole has a first supporting member disposed on the first groove wall, a second supporting member disposed on the first bottom wall, and a first fixed member connecting the first supporting member to the second supporting member; the connecting body defines a fourth through hole, the fourth through hole penetrates through one side of the connecting body where the connecting body sets the first clamping portion, and another side of the connecting body opposite to the side of the connecting body where the connecting body sets the first clamping portion; the fourth through hole is configured to allow a first fastener to pass through and fasten with the first fixed member of the first profile; the fourth through hole is located within a space formed by the first clamping post, the first bending post, and the second bending post.

The first supporting member, the second supporting member, the first bottom wall, and the first groove wall cooperatively form a first clamping groove; the first bottom wall defines a first through hole interconnected with the first clamping groove; the waterproof assembly includes a first waterproof structure; the first waterproof structure includes a first waterproof member; the first waterproof member includes a first bearing portion and a first clamping rib; the first clamping rib is protruded from one side of the first bearing portion and configured to clamp into the first clamping groove of the first profile which is located close to a driver's cab of the mobile device, and the first clamping groove of the first profile which is located close to a tail portion of the tail box.

The first waterproof member further includes a first water retaining portion, and a first sealing portion; the first water retaining portion protrudes from an opposite side of the first bearing portion; the first sealing portion is bent in a direction away from the first bearing portion so that a second end of the first sealing portion is located on one side of the first water retaining portion away from the first end; the first sealing portion is enclosed with the first bearing portion to form a sealing space; the first water retaining portion is received within the sealing space; in a direction of the first end pointing toward the first water retaining portion, the second end is protruded from the first bearing portion, and the second end of the first sealing portion is capable of rotating relative to the first bearing portion.

The first bottom wall protrudes over the first groove wall and the second supporting member.

The profile assembly further includes a second profile defining a second through hole and a first mounting groove spaced apart from each other. The second profile wraps an edge of the first cover plate close to the second cover plate through the first mounting groove, or wraps an edge of the third cover plate close to the second cover plate through the first mounting groove, or wraps two edges of the second cover plate respectively close to the first cover plate and the second cover plate through the first mounting groove. The second through hole has a division portion. The second through hole is separated by the division portion into a second clamping hole and a weight reducing hole. The division portion includes a locking portion located within the weight reducing hole. The connecting assembly further includes a second connecting member. One side of the second connecting member includes a second clamping portion and a mounting member spaced apart from each other. The second clamping portion is configured to be inserted into the second clamping hole. The mounting member is configured to be inserted into the weight reducing hole. A height of the second clamping portion is greater than that of the mounting member. Another side of the second connecting member includes a first clamping portion; the second connecting member connects to the first profile and the second profile on the same cover plate through the first clamping portion, the second clamping portion and the mounting member.

The profile assembly further includes a third profile. The third profile is located between the second profile located at an edge of the third cover plate close to a driver's cab and the second profile located at an edge of the second cover plate in a center of the tail box. One side of the third profile is curved to form a circular second clamping groove. The second clamping groove extends along an extension direction of the third profile. A width of an opening of the second clamping groove is smaller than a diameter of the second clamping groove. The waterproof assembly includes a second waterproof structure; the waterproof structure includes a sealing plate and two second clamping ribs located on one side of the second clamping plate; the second waterproof structure is attached to the two second clamping grooves by the two second clamping ribs respectively.

A top surface of the second profile defines a second clamping groove. The waterproof assembly includes a plurality of second waterproof structures. The waterproof structure includes a sealing plate and two second clamping ribs located on one side of the second clamping plate. One second clamping rib in the partial second waterproof structure is clamped into one second clamping groove, and the other second clamping rib in the partial second waterproof structure is clamped into another second clamping groove provided at intervals, to block a gap between the two second profiles that are rotationally connected, or to block a gap between the second profile and the third profile that are rotationally connected.

The connecting assembly further includes: a third connecting member. The third connecting member has an insertion surface for inserting the third profile, the insertion surface has a resisting portion, the resisting portion abuts against a top surface of the sealing plate, the top surface of the sealing plate is opposite to the second clamping rib.

Along an extension direction of the second clamping rib, the second clamping rib defines a first fixed hole. The resisting portion abuts against a top surface of the sealing plate. The second connecting member and the third connecting member each defines a locking hole interconnected to the first fixed hole. The locking hole and the first fixed hole are configured to insert the fixed member to fix the second waterproof structure.

The foldable cover plate further includes a rotating mechanism. The rotating mechanism includes two rotating assemblies rotationally connected. The rotating assembly includes at least two rotating arms including a third end and a fourth end opposite to the third end; a rotating seat including a first face, a second face opposite to the first face, and a third face connecting the first face to the second face; wherein the first face of one rotating assembly faces the other rotating assembly; the rotating seat defines at least two second limiting holes penetrating through the first face, the second face and the third face; each of at least two second limiting holes is configured to receive the third end of one rotating arm; the second face defines a sliding groove interconnected with the second limiting hole; a first rotating shaft penetrating through the third end and being slidably mounted in the sliding groove; and a second rotating shaft. The second rotating shaft of one rotating assembly is rotationally connected to the rotating seat and penetrates through the fourth end of the other rotating assembly, to rotationally connect the rotating arm of the other rotating assembly to the rotating seat of the one rotating assembly. The rotating mechanism located between the first cover plate which is located close to a tail portion of the tail box and the second cover plate which is located in a center of the tail box is connected to the two second profiles by the two rotating seats. The rotating mechanism located between the third cover plate which is located close to a driver's cab and the second cover plate located which is located in the center of the tail box is connected to the second profile and the third profile respectively through the two rotating seats.

The cover plate assembly further includes: a photovoltaic panel including a light absorbing surface and a backlight surface opposite to the light absorbing surface; and a bonding layer being bonded to the backlight surface. The three cover plates are bonded to one side of the bonding layer away from the photovoltaic panel. Each of the three cover plates includes a supporting layer and a reinforcing layer; the reinforcing layer is located on at least one side of the supporting layer. The supporting layer includes a plastic supporting layer or aluminum alloy supporting layer.

The supporting layer includes a plurality of annular supporting portions connected with each other, each annular supporting portion defines a third through hole penetrating along a direction from the light absorbing surface to the backlight surface, an aperture of the third through hole is 5 mm to 15 mm.

Each of the three cover plates further includes a reinforcement layer and a heat insulation layer located between the supporting layer and the reinforcement layer.

A thickness of the reinforcement layer close to the photovoltaic panel is less than that of the reinforcement layer away from the photovoltaic panel.

The foldable cover plate provided in the present disclosure can be conveniently folded and the structure of the foldable cover plate is stable.

BRIEF DESCRIPTION OF THE ACCOMPANYING DRAWINGS

In order to more clearly illustrate the technical solutions of the embodiments of the present disclosure, the accompanying drawings to be used in the embodiments will be briefly introduced below. Obviously, the accompanying drawings in the following description are some of the embodiments of the present disclosure, and that for a person of ordinary skill in the art, other accompanying drawings can be obtained based on these drawings without creative labor.

LABELS OF DRAWING

Figure 1:
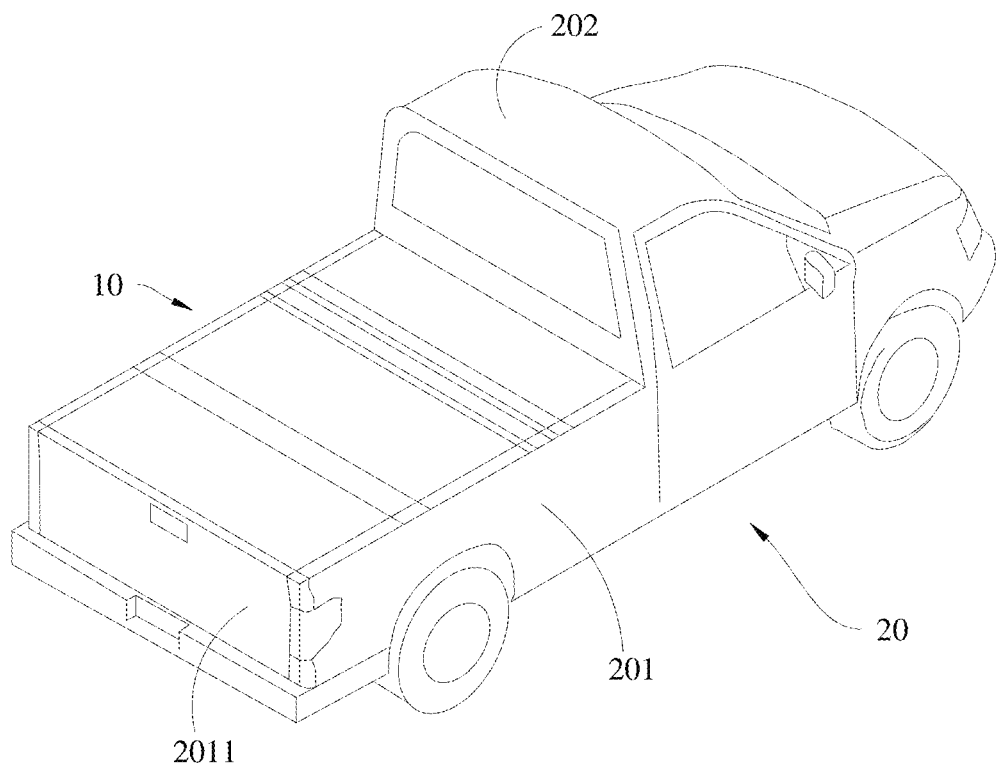
FIG. 1 illustrates a schematic structural view of a foldable cover plate mounted on a tail box of a mobile device in accordance with one embodiment of the present disclosure.

1—cover plate assembly; 11—cover plate; 111—supporting layer; 1111—annular supporting portion; 1112—third through hole; 112—reinforcement layer; 113—heat insulation layer; 12—photovoltaic panel; 121—light absorbing surface; 122—backlight surface; 123—battery sheet; 124—hot melt adhesive layer; 13—bonding layer; 14—flat layer; 15—connector; 151—positive connecting terminal; 152—negative connecting terminal; 162—second conductor; 163—third conductor; 2—profile assembly; 21—first profile; 211—first clamping hole; 212—first mounting groove; 2121—first groove wall; 2122—first top wall; 2123—anti-slip groove; 2124—first bottom wall; 2141—first through hole; 215—first supporting member; 216—second supporting member; 217—first fixed member; 218—first clamping groove; 2181—extension slot; 219a—first sidewall; 219b—second sidewall; 22—second profile; 221—second through hole; 2211—second clamping hole; 2212—weight reducing hole; 222—first division portion; 2220—widened groove; 2221—molded groove; 223—third locking part; 2231—locking hole; 224—first wall; 2241—first sub-wall; 2242—second sub-wall; 225—second wall; 226—third sidewall; 23—third profile; 231—second clamping groove; 232—first portion; 233—second portion; 3—connecting assembly; 31a—first connecting member; 311—first clamping portion; 3111—first clamping post; 3112—first bending post; 3113—second bending post; 312—connecting body; 3121—fourth through hole; 3125—first avoidance groove; 3125a—first sub-portion; 3125b—second sub-portion; 301—first side; 302—second side; 303—third side; 304—fourth side; 31b—first connecting member; 314—first bottom surface; 3141—first weight reducing hole; 315—reinforcement assembly; 3151—first reinforcing member; 3152—second avoidance groove; 316—third fixed hole; 317—fourth fixed hole; 305—fifth side; 306—sixth side; 307—outer peripheral side; 3071—first outer side surface; 3072—second outer side surface; 32—second connecting member; 321—second clamping portion; 322—mounting member; 323—accommodating groove; 324—containing groove; 325—drain tank; 326—locking hole; 33—third connecting member; 331—insertion surface; 3311—resisting portion; 3312—top surface; 3313—second bottom surface; 3314—second division portion; 3316—second weight reducing groove; 3317—supporting portion; 3318—second supporting surface; 4—waterproof assembly; 41—first waterproof structure; 41a—first waterproof member; 411—first bearing portion; 412—first clamping rib; 4121—first main body; 4122—first clamping block; 413—first water retaining portion; 414—first sealing portion; 4141—first end; 4142—second end; 41b—second waterproof member; 415—second bearing portion; 416—convex strip; 4161—inclined surface; 417—first buffer block; 418—second buffer block; 42—second waterproof structure; 421—sealing plate; 422—second clamping rib; 4221—first fixed hole; 4222—groove; 423—fixed member; 424—convex rib; 425—fitting portion; 4251—top surface; 4252—bottom surface; 4253—first side surface; 5—locking assembly; 5a—first locking structure; 51—sliding rail; 511—sliding groove; 512—first supporting surface; 513—bottom rail; 514—side rail; 515—first limiting rail; 516—second limiting rail; 518—decoration block; 519—plug block; 52—sliding block; 521—first surface; 522—second surface; 523—first receiving portion; 5231—receiving groove; 524—second side surface; 525—first limiting hole; 526—limiting rib; 5261—protrusion; 5262—avoidance groove; 53—threaded rod; 531—horizontal rod; 532—longitudinal rod; 54a—first locking member; 541a—sleeved portion; 542a—extension portion; 543a—first locking portion; 55a—handle; 56—buffer member; 5b—second locking structure; 54b—second locking member; 541b—third bearing portion; 5411b—third avoidance groove; 5412b—second opening; 542b—second sleeved portion; 543b—second locking portion; 544b—first rotation matching portion; 55b—hand shank; 551b—first mounting hole; 552b—second main body; 5521b—first limiting side; 5522b—second limiting side; 5523b—avoidance space; 5524b—limiting post; 553b—second rotation matching portion; 56b—rotating bolt; 57b—fixing bolt; 6—rotating mechanism; 60—rotating assembly; 61—rotating arm; 611—third end; 612—fourth end; 613—fifth end; 62—rotating seat; 621—first face; 622—second face; 623—third face; 624—second limiting hole; 625—sliding groove; 629—fourth face; 63—first rotating shaft; 64—second rotating shaft; 7—retaining assembly; 71—first retaining member; 72—second retaining member; 10—foldable cover plate; 20—mobile device; 201—tail box; 2011—tail door; 2012—vehicle frame; 202—driver's cab.

DETAILED DESCRIPTION OF ILLUSTRATED EMBODIMENTS

The technical solutions in the embodiments of the present disclosure will be described clearly and completely in the following with reference to the accompanying drawings in the embodiments of the present disclosure. Obviously, the described embodiments are only a part of the embodiments of the present disclosure and not all of the embodiments. Based on the embodiments in this application, all other embodiments obtained by a person of ordinary skill in the art without creative labor shall fall within the protection scope of the present disclosure.

The terms "first", "second", etc. in the specification and claims of the present disclosure and the above-described accompanying drawings are used to distinguish different objects and are not used to describe a particular order. In addition, the terms "include", "comprise" and "have", and any variations thereof, are intended to cover non-exclusive inclusion. For example, a process, method, system, product, or apparatus including a series of steps or units is not limited to the listed steps or units, but optionally also includes steps or units that are not listed, or optionally includes other steps or units that are inherent to the process, method, product, or apparatus.

"Embodiments" or "embodiments" mentioned herein imply that particular features, structures, or characteristics described in conjunction with the embodiments or implementation manner may be included in at least one embodiment of the present disclosure. The presence of the phrase at various points in the specification does not necessarily refer to the same embodiment, nor is it a separate or alternative embodiment that is mutually exclusive of other embodiments. It is understood by those skilled in the art, both explicitly and implicitly, that the embodiments described herein may be combined with other embodiments.

Figure 2:
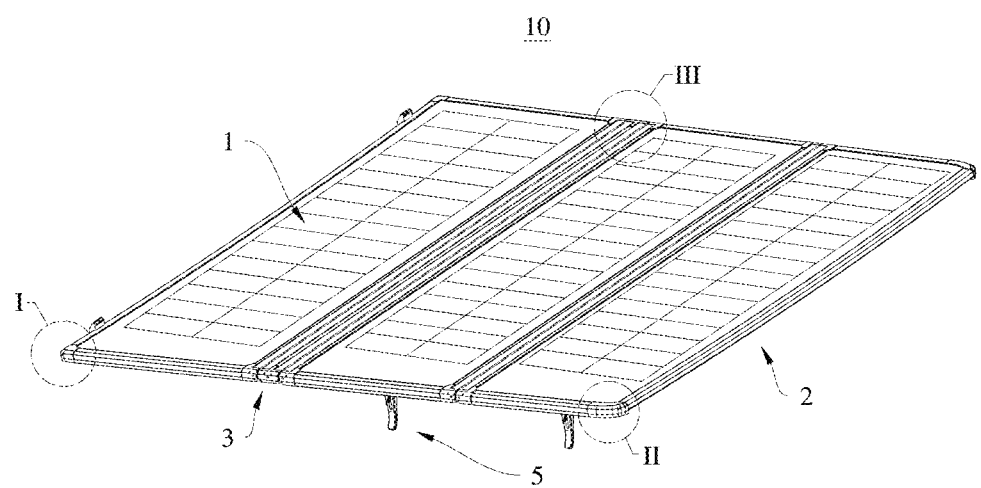
FIG. 2 illustrates a schematic structural view of the foldable cover plate in FIG. 1.
Figure 3:
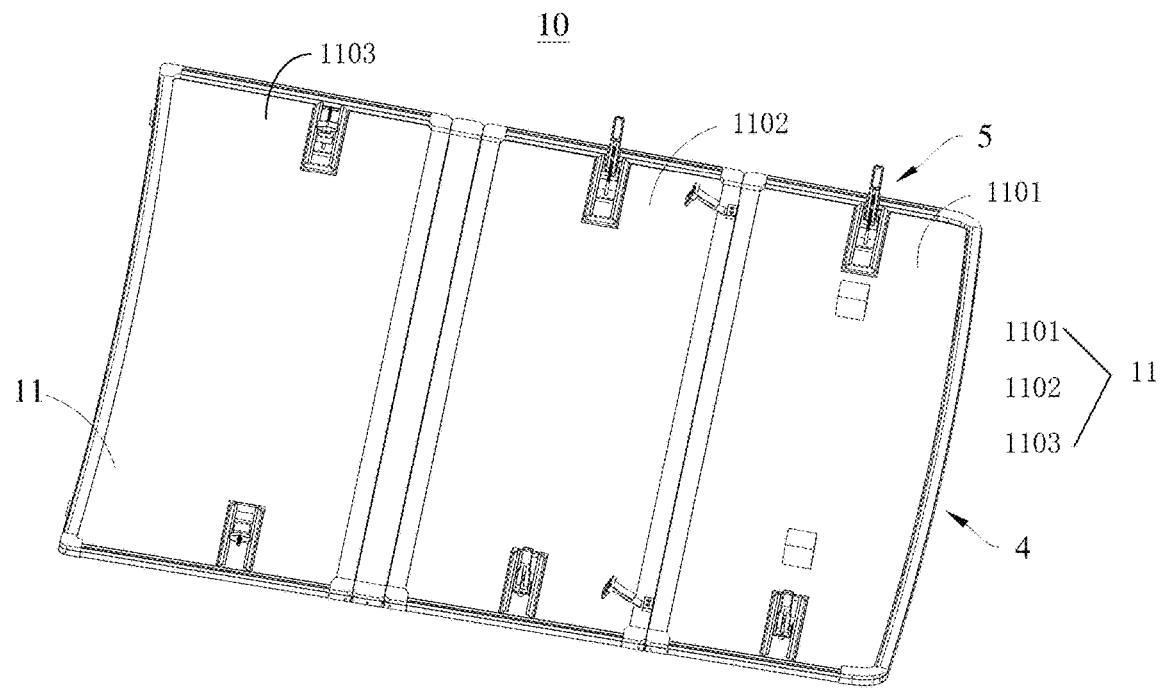
FIG. 3 illustrates a schematic structural view of the foldable cover plate in FIG. 2 from another view.
Figure 4:
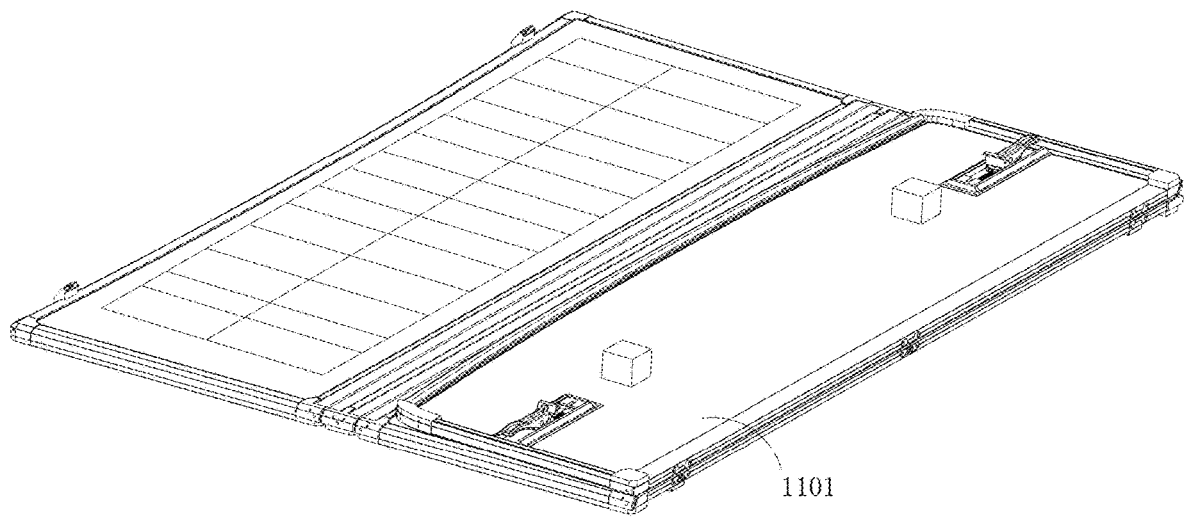
FIG. 4 illustrates a schematic structural view of the foldable cover plate in FIG. 2 after first folding.
Figure 5:
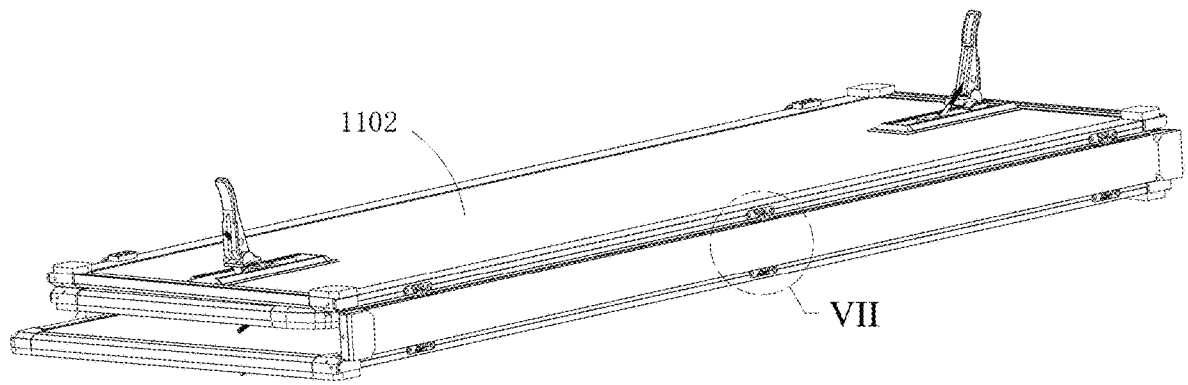
FIG. 5 illustrates a schematic structural view of the foldable cover plate in FIG. 2 after second folding.
Figure 6:
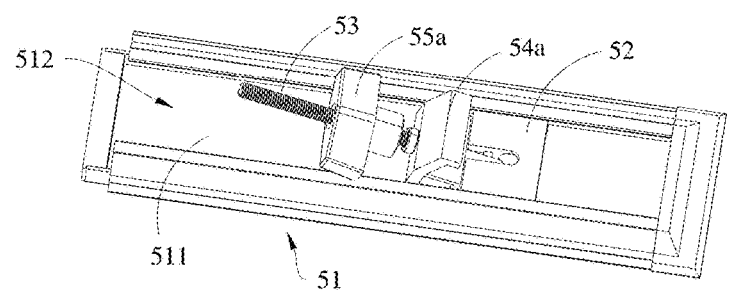
FIG. 6 illustrates a schematic structural view of the first locking structure in FIG. 3.

Referring to FIGS. 1-5, FIG. 1 illustrates a schematic structural view of a foldable cover plate mounted on a tail box of a mobile device in accordance with one embodiment of the present disclosure; FIG. 2 illustrates a schematic structural view of the foldable cover plate in FIG. 1; FIG. 3 illustrates a schematic structural view of the foldable cover plate in FIG. 2 from another view; FIG. 4 illustrates a schematic structural view of the foldable cover plate in FIG. 2 after first folding; FIG. 5 illustrates a schematic structural view of the foldable cover plate in FIG. 2 after second folding. In this embodiment, the foldable cover plate 10 is configured to be mounted to a tail box 201 of a mobile device 20 to cover an opening of the tail box 201. The foldable cover plate 10 includes a cover plate assembly 1, a profile assembly 2, a connecting assembly 3, a waterproof assembly 4, and a locking assembly 5. The cover plate assembly 1 includes three cover plates 11 rotationally connected in sequence. The three cover plates 11 includes a first cover plate 1101, a second cover plate 1102 and a third cover plate 1103. The first cover plate 1101 is rotationally foldable to the second cover plate 1102 to expose the opening, or the first cover plate 1101 is rotationally foldable to the second cover plate 1102, and the second cover plate 1102 is rotationally foldable to the third cover plate 1103 to expose the opening. The profile assembly 2 fixed to a peripheral edge of the first cover plate 1101, the second cover plate 1102 and the third cover plate 1103. The connecting assembly 3 is connected to the profile assembly 2. The waterproof assembly 4 is mounted to the profile assembly 2. The locking assembly 5 is mounted to a face of the first cover plate 1101, the second cover plate 1102 and the third cover plate 1103 facing an interior of the tail box 201. The locking assembly 5 is configured to fix the first cover plate 1101, the second cover plate 1102 and the third cover plate 1103 to the tail box 201.

In this embodiment, the movable device 20 may be, but is not limited to, a vehicle having an open tail box such as a pickup truck, a truck, a box van, a snowmobile, and the like.

The first cover plate 1101 located at a tail portion of the tail box 201 can be rotated to lap onto the second cover plate 1102 located in a middle of the tail box 201 to expose a portion of the opening of the tail box 201 for easy access to loading cargoes. Furthermore, the second cover plate 1102 located in the middle of the tail box 201 can be rotated again so that the second cover plate 1102 in the middle of the tail box 201 and the first cover plate 1101 located at the tail portion of the tail box 201 can be lapped together to the third cover plate 1103 close to a driver's cab 202 to expose more of the opening of the tail box 201, facilitating access to larger loading cargoes. Optionally, the third cover plate 1103 close to the driver's cab 202 can be further rotated towards the driver's cab 202 to a side wall of the driver's cab 202 to fully open the opening of the tail box 201.

The profile assembly 2 is fixed to the peripheral edge of the first cover plate 1101, the second cover plate 1102 and the third cover plate 1103, which is capable of improving a structural strength of the first cover plate 1101, the second cover plate 1102 and the third cover plate 1103. The connecting assembly 3 is connected to the profile assembly 2, and the profile assembly 2 is fixed to the first cover plate 1101, the second cover plate 1102 and the third cover plate 1103, which is capable of improving a structural stability of the profile assembly 2. The waterproof assembly 4 is mounted on the profile assembly 2, which is capable of improving a scaling performance of the foldable cover plate 10 to prevent the entry of external debris or water into the tail box 201. The locking assembly 5 is configured to fix the first cover plate 1101, the second cover plate 1102 and the third cover plate 1103 to the tail box 201, which improves an assembly stability of the foldable cover plate 10 and the tail box 201.

Figure 7:
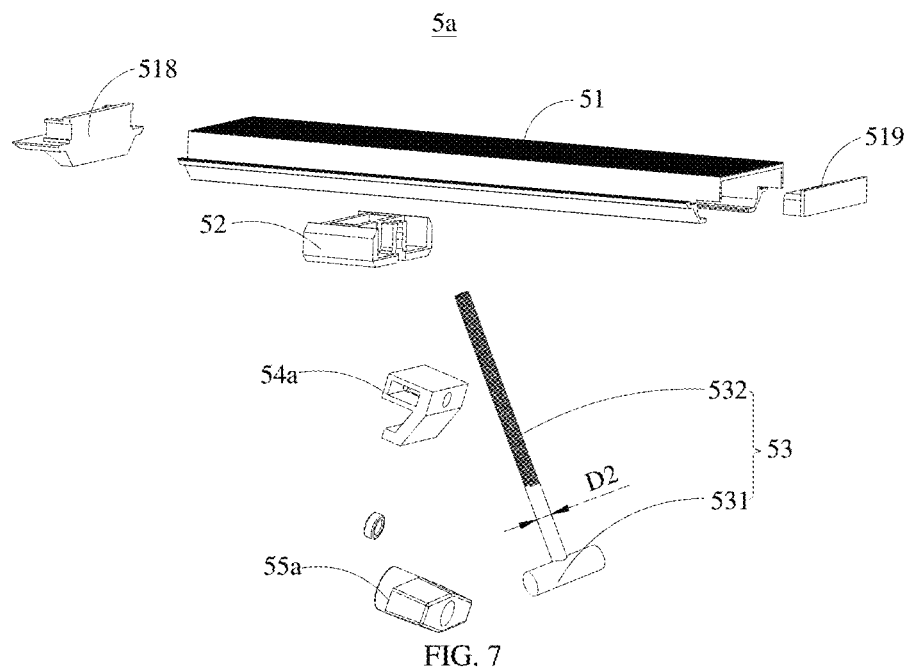
FIG. 7 illustrates an exploded view of the first locking structure in FIG. 6.
Figure 8:
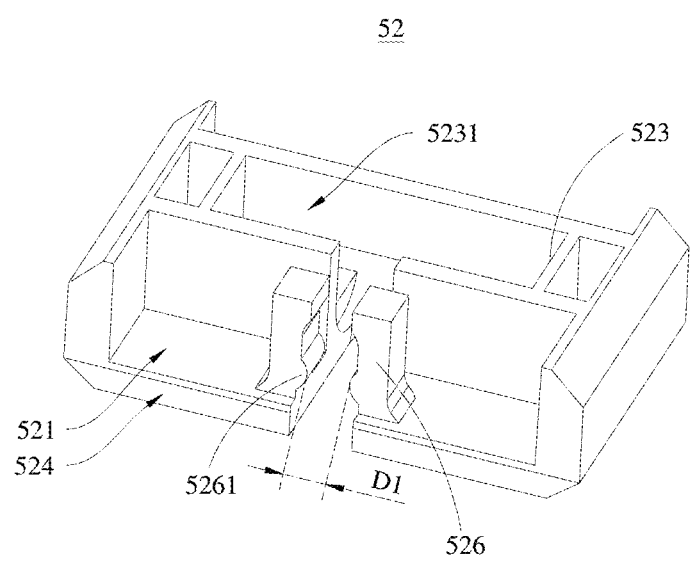
FIG. 8 illustrates a schematic structural view of the sliding block in FIG. 6.
Figure 9:
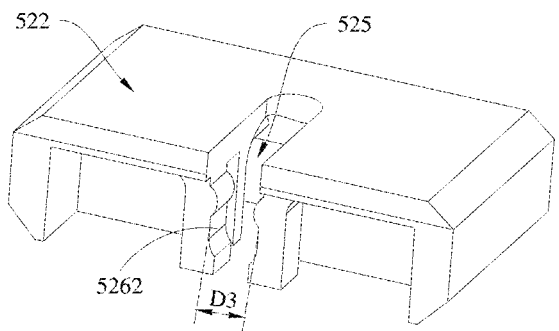
FIG. 9 illustrates a schematic structural view of the sliding block in FIG. 8 from another view.
Figure 10:
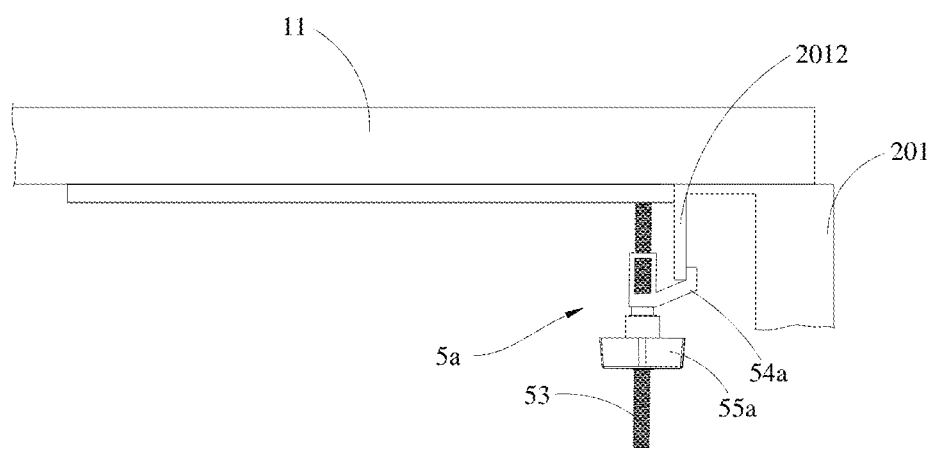
FIG. 10 illustrates a schematic structural view of the first locking structure in FIG. 6 fixing the cover plate to the tail box.
Figure 11:
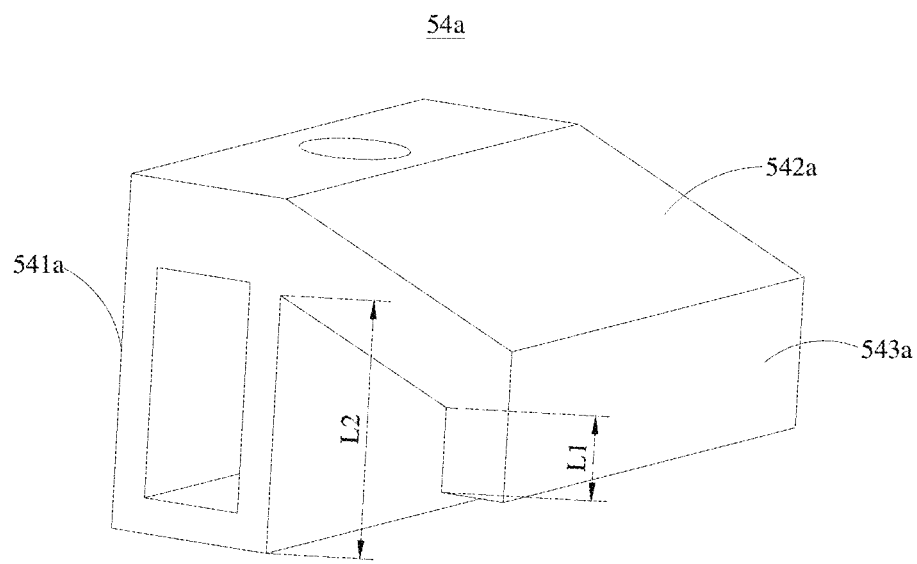
FIG. 11 illustrates a schematic structural view of the first locking member in FIG. 6.
Figure 12:
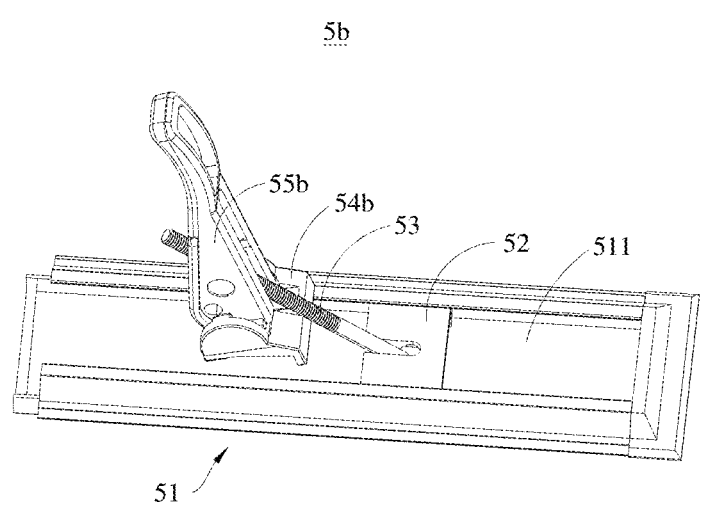
FIG. 12 illustrates a schematic structural view of the second locking structure in FIG. 3.
Figure 13:
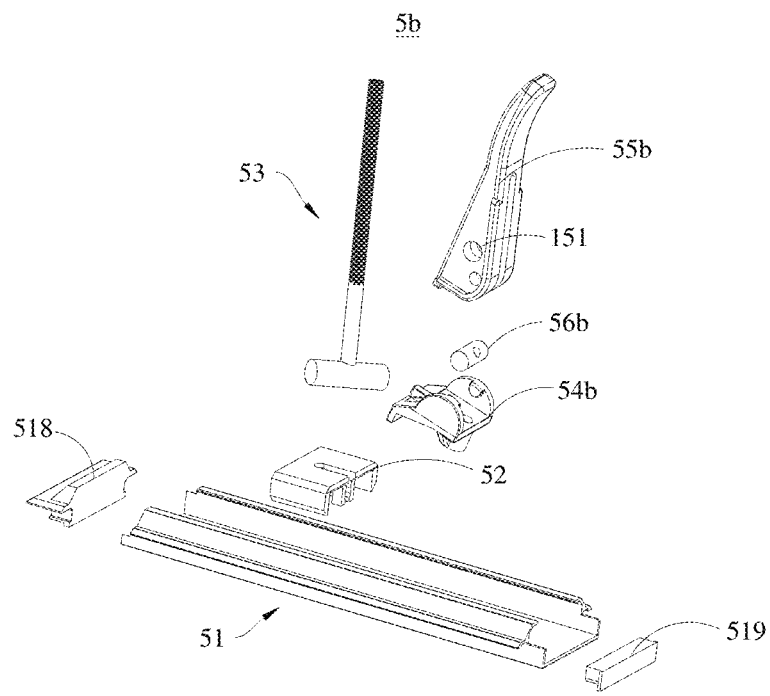
FIG. 13 illustrates an exploded view of the second locking structure in FIG. 12.

Referring to FIGS. 3, and 6-12, FIG. 6 illustrates a schematic structural view of the first locking structure in FIG. 3; FIG. 7 illustrates an exploded view of the first locking structure in FIG. 6; FIG. 8 illustrates a schematic structural view of the sliding block in FIG. 6; FIG. 9 illustrates a schematic structural view of the sliding block in FIG. 8 from another view; FIG. 10 illustrates a schematic structural view of the first locking structure in FIG. 6 fixing the cover plate to the tail box; FIG. 11 illustrates a schematic structural view of the first locking member in FIG. 6; FIG. 12 illustrates a schematic structural view of the second locking structure in FIG. 3. In this embodiment, the locking assembly 5 includes a first locking structure 5a. The first locking structure 5a includes: a sliding rail 51, a sliding block 52, a threaded rod 53, a first locking member 54a, and a handle 55a. The sliding rail 51 is fixed to the third cover plate 1103 which is proximate the driver's cab 202 of the mobile device 20. The sliding block 52 is detachably slidably connected within a sliding groove 511 of the sliding rail 51. The sliding groove 511 includes a first supporting surface 512 for supporting the sliding block 52. The sliding block 52 includes a first surface 521 facing the first supporting surface 512, and a second surface 522 opposite to the first surface 521. The first surface 521 includes a first receiving portion 523 defining a receiving groove 5231. The sliding block 52 defines a first limiting hole 525 that penetrates through the first surface 521, the second surface 522, the second side surface 524 between the first surface 521 and the second surface 522, and the first receiving portion 523. The first limiting hole 525 interconnects the receiving groove 5231. The first surface 521 is provided with two limiting ribs located on opposite sides of the first limiting hole 525. One end of the threaded rod 53 is received in the receiving groove 5231, and the other end of the threaded rod 53 is capable of rotating relative to the sliding block 525 through the first limiting hole 525, and a gap between the two limiting ribs 526. The first locking block 54a is sleeved on the threaded rod 53. The handle 55a is threaded on the threaded rod 53. The two limiting ribs 526 cooperate with each other to limit the threaded rod 53, avoiding the threaded rod 53 from rotating relative to the two limiting ribs 523 so that the handle 55a, the first locking member 54a, and the threaded rod 53 are received in the sliding groove 511. When the threaded rod 53 is subjected to a torsion force that departs from the first supporting surface 512, the threaded rod 53 can rotate relative to the sliding block 52 so that the handle 55a, the first locking member 54a, and the threaded rod 53 can partially rotate outside the sliding groove 511. When the first locking member 54a is located outside the sliding groove 511, the first locking member 54a is able to fix the third cover plate 1103 to the tail box 201 via the handle 55a.

In this embodiment, the sliding rail 51 is configured to be fixed to the third cover plate 1103. The sliding block 52 is detachably slidably connected within the sliding groove 511 of the sliding rail 51. One end of the threaded rod 53 is located within the receiving groove 5231 of the sliding block 52, and the opposite end of the threaded rod 53 is sleeved with the first locking member 54a and the handle 55a. The handle 55a is threaded to the threaded rod 53. The threaded rod 53 and the first locking member 54a are movable relative to the sliding block 52 driven by the handle 55a, and the sliding block 52 is movable relative to the sliding rail 51 within the sliding groove 511 driven by the handle 55a, and handle 55a may rotate circumferentially with respect to the threaded rod 53 to move in a threaded region of the threaded rod 53, thereby driving a change in position of the first locking member 54a. The handle 55a may drive the threaded rod 53 and the first locking member 54a to move so as to receive in the sliding groove 511, thereby realizing a stowage of the handle 55a, the threaded rod 53, and the first locking member 54a. The handle 55a may drive the threaded rod 53 and the first locking member 54a to move outside of the sliding groove 511, in this state, after the position of the sliding block 52 within the sliding groove 511 is adjusted, the handle 55a may be rotated to enable the handle 55a to resist and drive the first locking member 54a to resist the tail box 201 of the mobile device 20, thereby fixing the third cover plate 1103 to the tail box 201 of the mobile device 20.

In this embodiment, the two limiting ribs 526 can cooperate with each other to limit the threaded rod 53. When the handle 55a, the threaded rod 53 and the first locking member 54a are received in the sliding groove 511, the threaded rod 53 is clamped between the two limiting ribs 526 to prevent the threaded rod 53 from rotating relative to the two limiting ribs 526, thereby allowing the handle 55a, the first locking member 54a and the threaded rod 53 to rotate relative to the limiting ribs 526 without being detached from the sliding groove 511, and facilitating to receive the first locking structure 5a. Specifically, when the threaded rod 53 is restrained against the two limiting ribs 526, the oppositely disposed surfaces of the two limiting ribs 526 are capable of restricting the threaded rod 53 by frictional resistance between the threaded rod 53 and the oppositely disposed surfaces of the two limiting ribs 526, so as to enable the handle 55a, the first locking member 54a and the threaded rod 53 can be received within the sliding groove 511 without being detached from the sliding groove 511. When the threaded rod 53 is subjected to a force that departs from the first supporting surface 512 and the force is greater than the frictional resistance on the oppositely disposed surfaces of the two limiting ribs 526, the threaded rod 53 is able to deform the two limiting ribs 526 by squeezing the two limiting ribs 526 in a direction opposite each other so that the threaded rod 53 is able to disengage from the two limiting ribs 526, which allows the handle 55a, the first locking member 54a, and the threaded rod 53 to partially rotate outside of the sliding groove 511. Specifically, the threaded rod 53 includes a horizontal rod 531 and a longitudinal rod 532 connected to the horizontal rod 531. The horizontal rod 531 is received within the receiving groove 5231. The longitudinal rod 532 has threads. The limiting rib 526 satisfies at least one of the following cases: in a first case, each limiting rib 526 includes a protrusion 5261 facing a surface of another limiting rib 526, and the distance between the two protrusions 5261 (refer to D1 in FIG. 8) is less than the diameter (refer to D2 in FIG. 7) of the longitudinal rod 532; in a second case, each limiting rib 526 defines an avoidance groove 5262 facing the surface of the another limiting rib 526, and the distance between the groove bottom walls of the two avoidance grooves 5262 (please refer to D3 in FIG. 9) is larger than a diameter of the longitudinal rod 532.

In this embodiment, the first locking structure 5a fixes and mounts the third cover plate 1103 to the tail box 201, specifically the first locking member 54a of the first locking structure 5a abuts against and hooks against the vehicle frame 2012 of the tail box 201, to keep the first locking structure 5a fixed relative to the vehicle frame 2012, thereby securing the third cover plate 1103 to the tail box 201. The vehicle frame 2012 is mounted on an edge of the tail box 201 and extends into the interior of the tail box 201, to present a hook-type structure and an opening of the hook-type structure faces a bottom wall of the tail box 201 so as to facilitate the vehicle frame 2012 to be fixed to the first locking member 54a.

Optionally, one end of the sliding rail 51 is mounted with a decoration block 518 for decoration, and the opposite end of the sliding rail 51 is mounted with a plug block 519 to limit the sliding groove 511, and to be able to serve as cushioning, waterproofing, and the like.

Referring to FIG. 6 to FIG. 11, in this embodiment, the first locking member 54a includes a sleeved portion 541a sleeved on the threaded rod 53, an extension portion 542a connected to the sleeved portion 541a, and a first locking portion 543a bent to connect the extension portion 542a. One end of the first locking portion 543a away from the extension portion 542a is configured for clamping and fixing. In a direction of the alignment of the first locking member 54a with the handle 55a, a length of the first locking portion 543a (please refer to L1 in FIG. 11) is smaller than a length of the sleeved portion 541a (please refer to L2 in FIG. 11). The extension portion 542a is set at an inclined position compared to the sleeved portion 541a and is inclined in a direction departing from the handle 55a. An end surface of the first locking portion 543a departing from the handle 55a is away from the handle 55a as compared to an end surface of the sleeved portion 541a departing from the handle 55a, so that a force arm of the first locking portion 543a is shorter when fixed to the tail box 201 of the mobile device 20, which is conducive to reduce the torque applied to the first locking portion 543a, thereby enabling the first locking portion 543a to withstand a greater squeezing force to improve a securing strength.

Optionally, the two limiting ribs 526 are provided at a gap with the second side surface 524, with the gap forming a step surface. When a buffer member 56 is clamped to the handle 55a and the first locking member 54a, a bearing portion is clamped to the step surface, and buffer member 56 is configured to clamp the sleeved portion 541a to the two limiting ribs 526, to limit the sleeved portion 541a between a bearing surface and the sliding rail 51.

Figure 14:
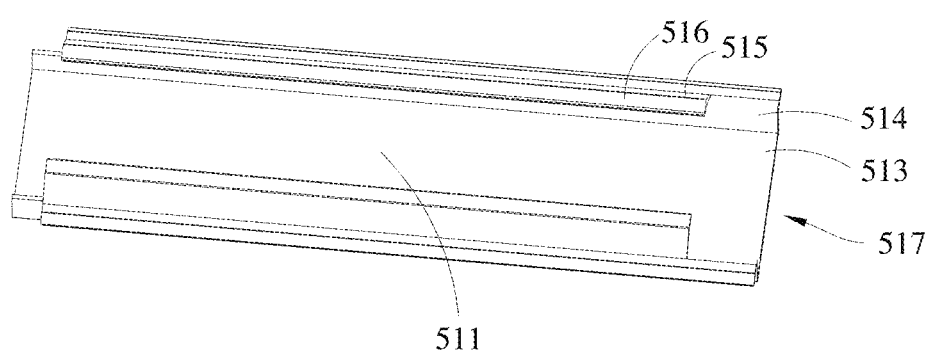
FIG. 14 illustrates a schematic structural view of the sliding rail in FIG. 3.
Figure 15:
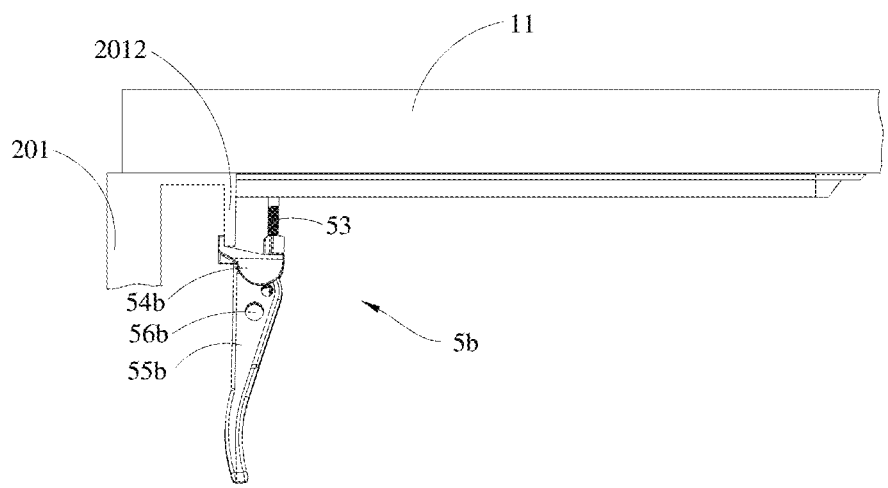
FIG. 15 illustrates a schematic structural view of the second locking structure for fixing the cover plate to the tail box in FIG. 12.
Figure 16:
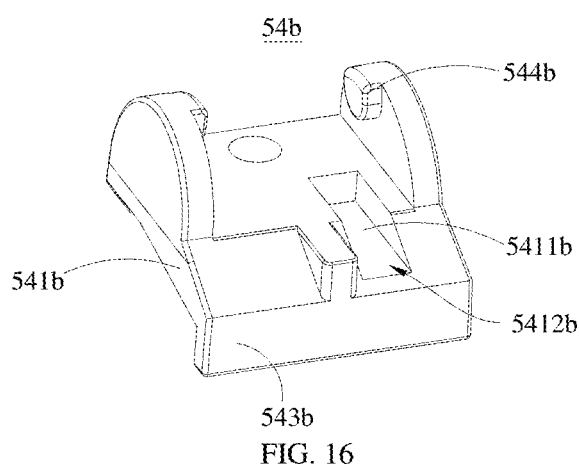
FIG. 16 illustrates a schematic structural view of the second locking member in FIG. 12.

Referring to FIGS. 12 to 15, FIG. 13 illustrates an exploded view of the second locking structure in FIG. 12; FIG. 14 illustrates a schematic structural view of the sliding rail in FIG. 3; FIG. 15 illustrates a schematic structural view of the second locking structure for fixing the cover plate to the tail box in FIG. 12. In this embodiment, the locking assembly 5 includes a second locking structure 5b. The second locking structure 5b includes a sliding rail 51, a sliding block 52, a threaded rod 53, a second locking member 54b, a hand shank 55b, and a rotating bolt 56b. The sliding rail 51 is fixed the first cover plate 1101 which is proximate to the tail portion of the tail box 201 and second cover plate 1102 which is in a center of the tail box 201. The sliding rail 51 includes a bottom rail 513, two side rails 514 located on two opposite sides of the bottom rail 513, two first limiting rails 515 respectively connected to the two side rails 514, two second limiting rails 516 respectively connected to the two first limiting rails 515. The two first limiting rails 515 are inclined relative to the bottom rail 513 so as to be in close proximity to each other. The two second limiting rails 516 respectively extend from the two first limiting rails 515 so as to be in close proximity to each other. The bottom rail 513, the two side rails 514, the two first limiting rails 515 and the two second limiting rails 516 cooperatively form the sliding groove 511. The sliding block 52 is detachably slidably coupled within the sliding groove 511. One end of the threaded rod 53 is detachably rotationally coupled to the sliding block 52, the second locking member 54b is sleeved on the threaded rod 53, the hand shank 55b is rotationally coupled to the second locking member 54b. The hand shank 55b defines a mounting hole 551b for mounting the rotating bolt 56b. The rotating bolt 56b is threaded to the threaded rod 53. The hand shank 55b is configured to: rotate the rotating bolt 56b in a circumferential direction of the threaded rod 53, so as to move the second locking member 54b along the threaded rod 53. The hand shank 55b is further configured to rotate relative to the second locking member 54b to drive the second locking member 54b, and drive the second locking member 54b to rotate into the sliding groove 511 or out of the sliding groove 511 relative to the sliding block 52.

In this embodiment, the first limiting rail 515 and the second limiting rail 516 form an anti-dislodgement limitation of the sliding block 52, preventing the sliding block 52 from dislodging from the sliding groove 511. By installing the sliding block 52 into the sliding groove 511, the hand shank 55b can be configured to move the sliding block 52 within the sliding groove 511 relative to the sliding rail 51.

In this embodiment, the second locking structure 5b fixes and mounts the first cover plate 1101 or the second cover plate 1102 to the tail box 201, specifically, the second locking member 54b of the second locking structure 5b abuts against and hooks against the vehicle frame 2012 of the tail box 201 to keep the first cover plate 1101 or the second cover plate 1102 fixed relative to the vehicle frame 2012, thereby fixing the first cover plate 1101 or the second cover plate 1102 to the tail box 201. The vehicle frame 2012 is mounted on an edge of the tail box 201 and extends to the interior of the tail box 201 to present a hook-type structure and an opening of the hook-type structure faces a bottom wall of the tail box 201, to facilitate to connect the vehicle frame 2012 to the second locking member 54b.

Figure 17:
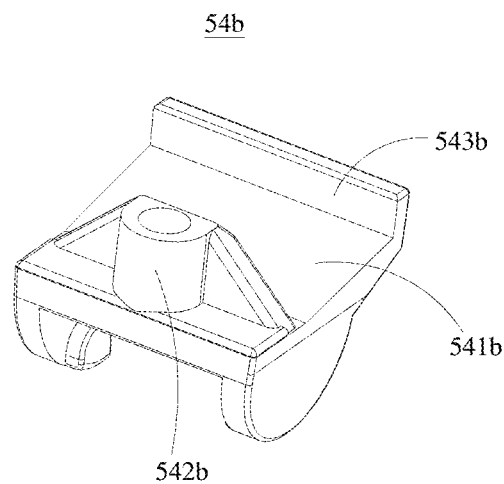
FIG. 17 illustrates a schematic structural view of the second locking member in FIG. 16 from another view.
Figure 18:
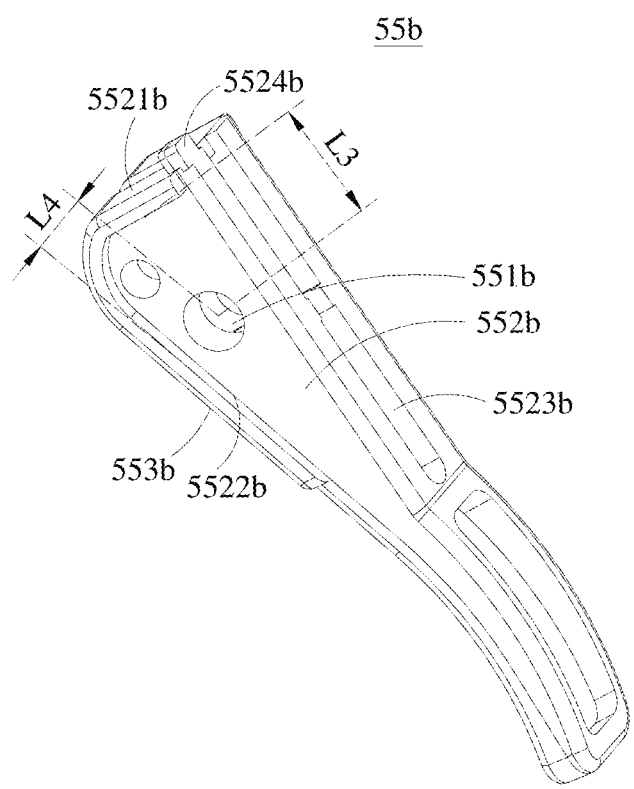
FIG. 18 illustrates a schematic structural view of a hand shank in FIG. 12.
Figure 19:
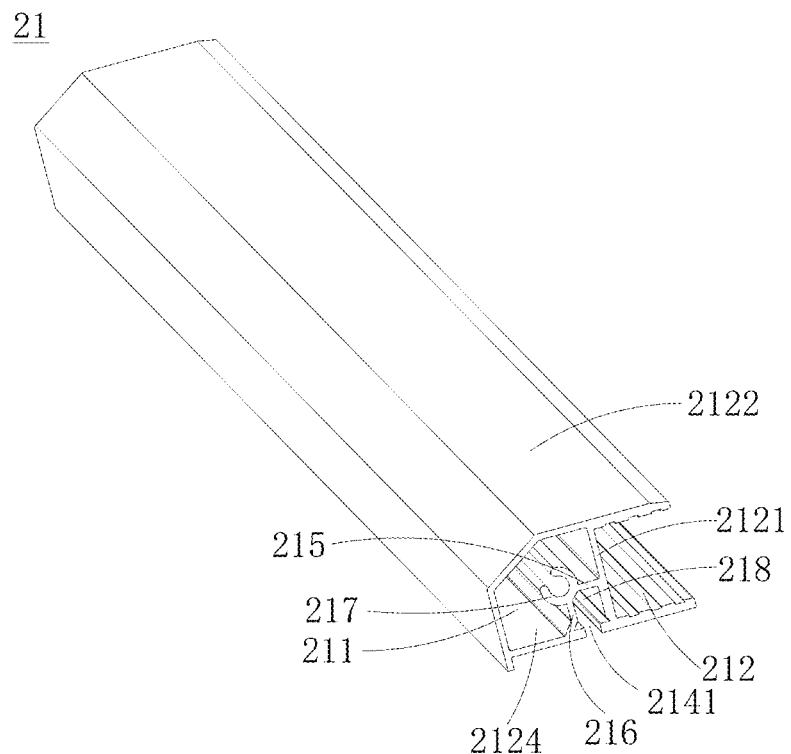
FIG. 19 illustrates a schematic structural view of a first profile in FIG. 2.

Referring to FIGS. 12, and 16-18, FIG. 16 illustrates a schematic structural view of the second locking member in FIG. 12; FIG. 17 illustrates a schematic structural view of the second locking member in FIG. 16 from another view; FIG. 18 illustrates a schematic structural view of a hand shank in FIG. 12. In this embodiment, the second locking member 54b includes a third bearing portion 541b, a second sleeved portion 542b, a second locking portion 543b, and a first rotation matching portion 544b. The second sleeved portion 542b and the second locking portion 543b are spaced apart on a face of the third bearing portion 541b away from the hand shank 55b. The second sleeved portion 542b defines a sleeve locking hole to fit over the second locking portion 542b. The third bearing portion 541b defines a through hole interconnected to the sleeve locking hole to allow the threaded rod 53 to pass through. The first rotation matching portion 544b is located on the face of the third bearing portion 541b away from the hand shank 55b. The hand shank 55b includes a second main body 552b and a second rotation matching portion 553b. The second main body 552b includes a first limiting side 5521b close to the second locking member 54b and a second limiting side 5522b connected to the first limiting side 5521b. The second main body 552b defines a first mounting hole 551b so as to mount the rotating bolt 56b. A minimum distance between a center of the first mounting hole 551b and the first limiting side 5521b (see L3 in FIG. 18) is greater than a minimum distance between the center of the first mounting hole 551b and the second limiting side 5522b (see L4 in FIG. 18). The second main body 552b also defines an avoidance space 5523b to accommodate the threaded rod 53 and allow the threaded rod 53 to pass through. The second rotation matching portion 553b is located between the first limiting side 5521b and the second limiting side 5522b. The second rotation matching portion 553b is rotationally mated with the first rotation matching portion 544b so that the hand shank 55b can be rotated relative to the second locking member 54b, so as to push the second locking member 54b.

In this embodiment, the minimum distance between the center of the first mounting hole 551b and the first limiting side 5521b is greater than the minimum distance between the center of the first mounting hole 551b and the second limiting side 5522b such that when the hand shank 55b is rotated such that a portion of the second rotation matching portion 553b located on the second limiting side 5522b is mated with the first rotation matching portion 544b, the hand shank 55b and the second locking member 54b are in an unlocked state, which is capable of removing the second locking member 54b from the tail box 201 of the mobile device 20. When the hand shank 55b is rotated such that a portion of the second rotation matching portion 553b located on the first limiting side 5521b is mated with the first rotation matching portion 544b, the hand shank 55b locks the second locking member 54b, such that the second locking member 54b is resisted against the tail box 201 of the mobile device 20, so as to fix the first cover plate 1101 or the second cover plate 1102 to the tail box 201. Therefore, the locking and unlocking of the second locking member 54b can be realized by rotating the hand shank 55b relative to the second locking member 54b, which is easy to operate and highly efficient.

Optionally, the first limiting side 5521b includes a limiting post 5524b facing the second locking member 54b. The third bearing portion 541b defines a third avoidance groove 5411b facing the hand shank 55b. One side of the third avoidance groove 5411b close to the second locking portion 543b defines a second opening 5412b to allow the limiting post 5524b to enter or exit the third avoidance groove 5411b. The inner wall of the side of the third avoidance groove 5411b away from the second locking portion 543b is configured to limit the limiting post 5524b.

Optionally, the end of the second main body 552b away from the second locking member 54b is curved in design to improve feel for gripping and thereby improving the experience of use.

Figure 20:
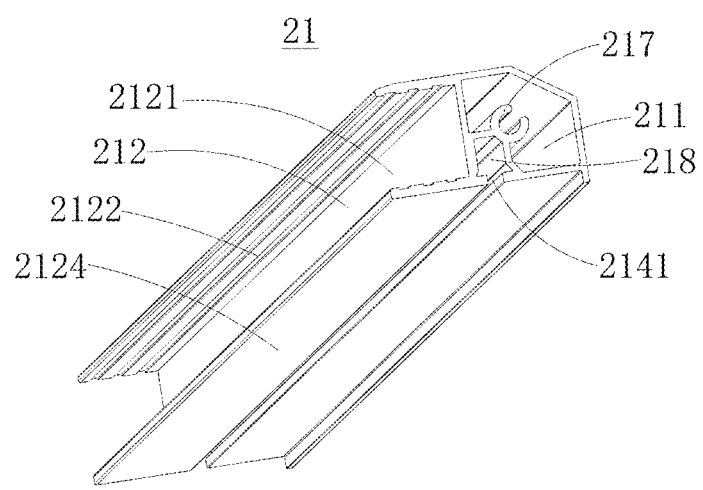
FIG. 20 illustrates a schematic structural view of the first profile in FIG. 19 from another view.
Figure 21:
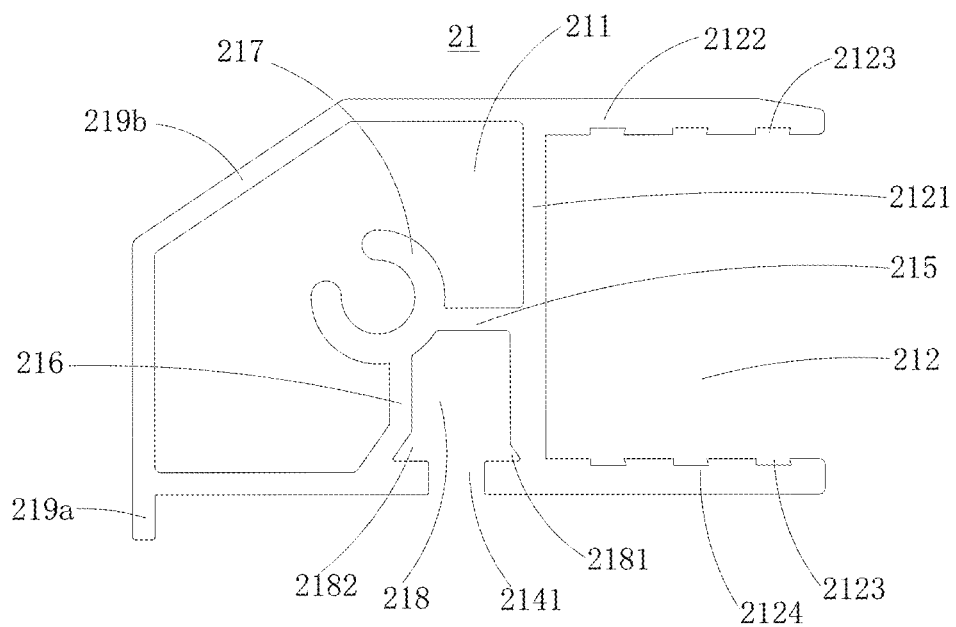
FIG. 21 illustrates a schematic structural view of an end face of the first profile in FIG. 19.
Figure 22:
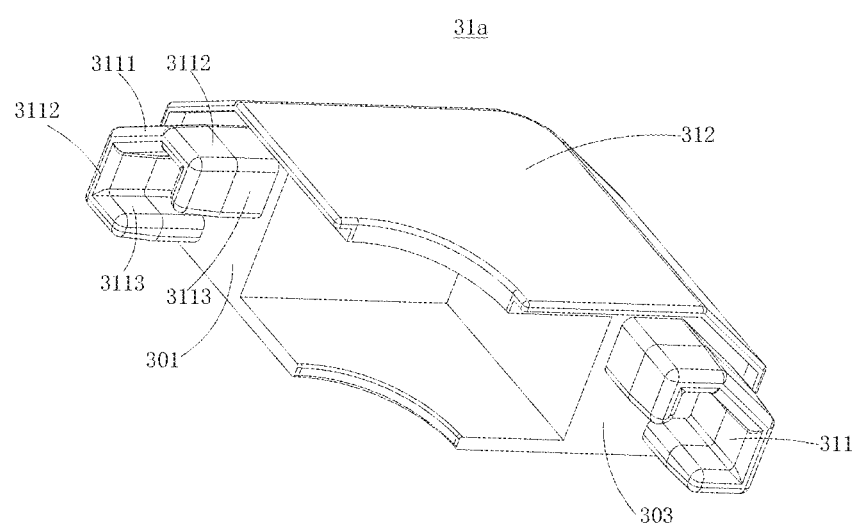
FIG. 22 illustrates a schematic structural view of a first connecting member close to the driver's cab in FIG. 2.
Figure 23:
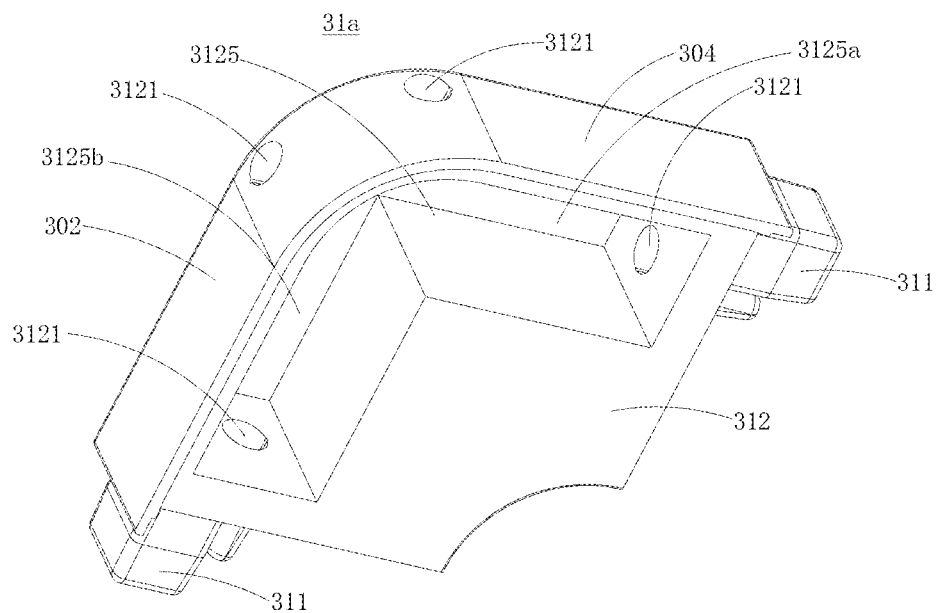
FIG. 23 illustrates a schematic structural view of the first connecting member in FIG. 22 from another view.
Figure 24:
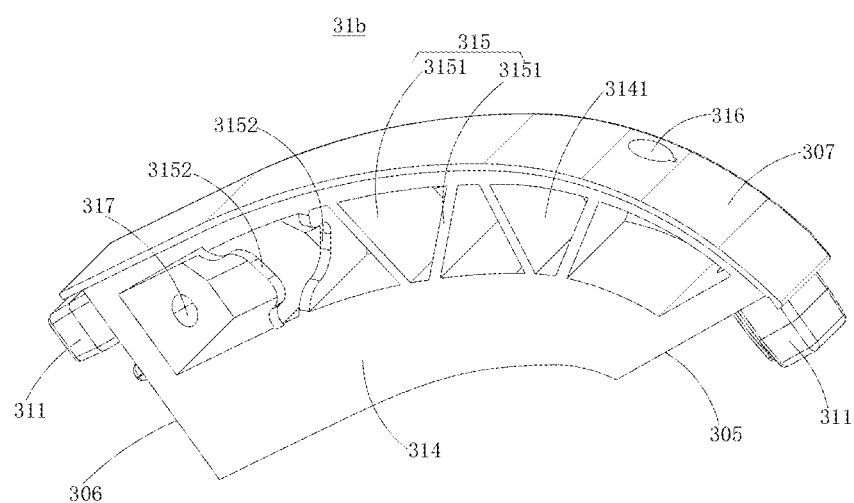
FIG. 24 illustrates a schematic structural view of the first connecting member close to a tail portion of the tail box in FIG. 2.
Figure 25:
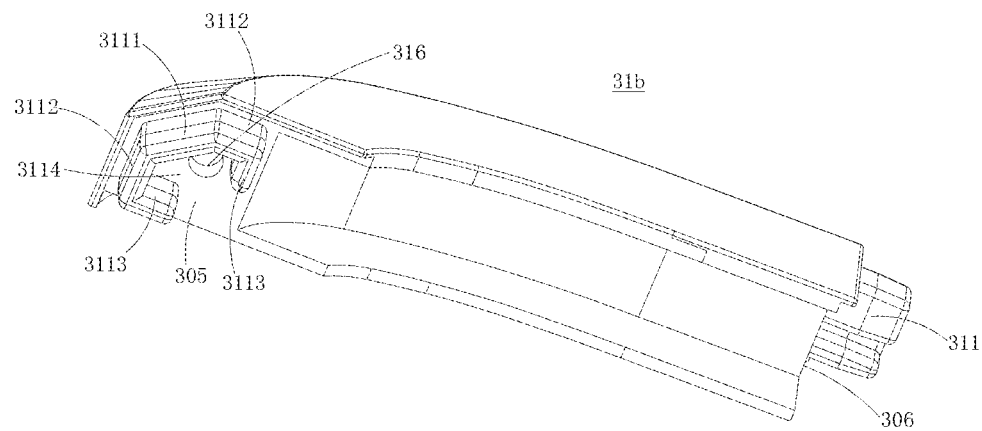
FIG. 25 illustrates a schematic structural view of the first connecting member in FIG. 24 from another view.
Figure 26:
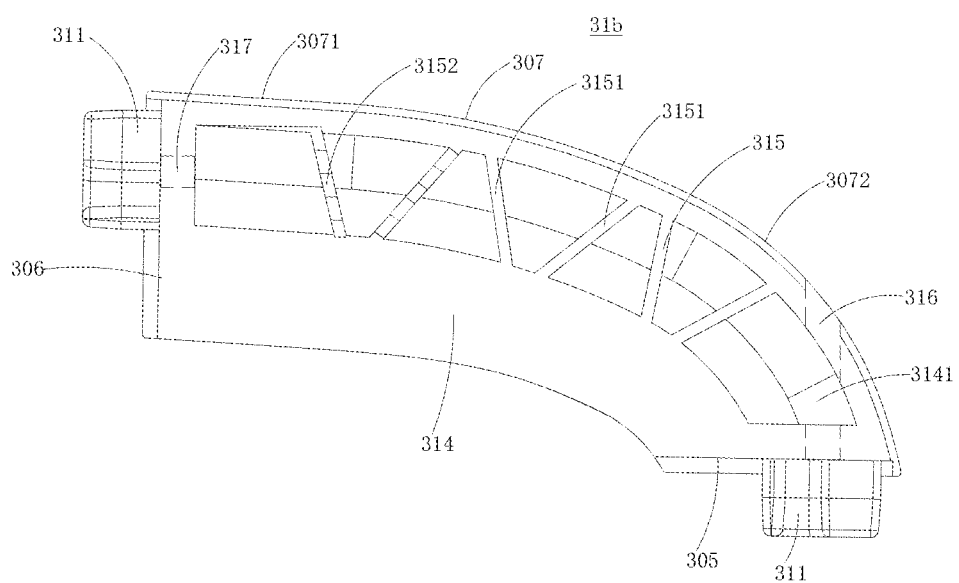
FIG. 26 illustrates a schematic structural view of the first connecting member in FIG. 24 from yet another view.
Figure 27:
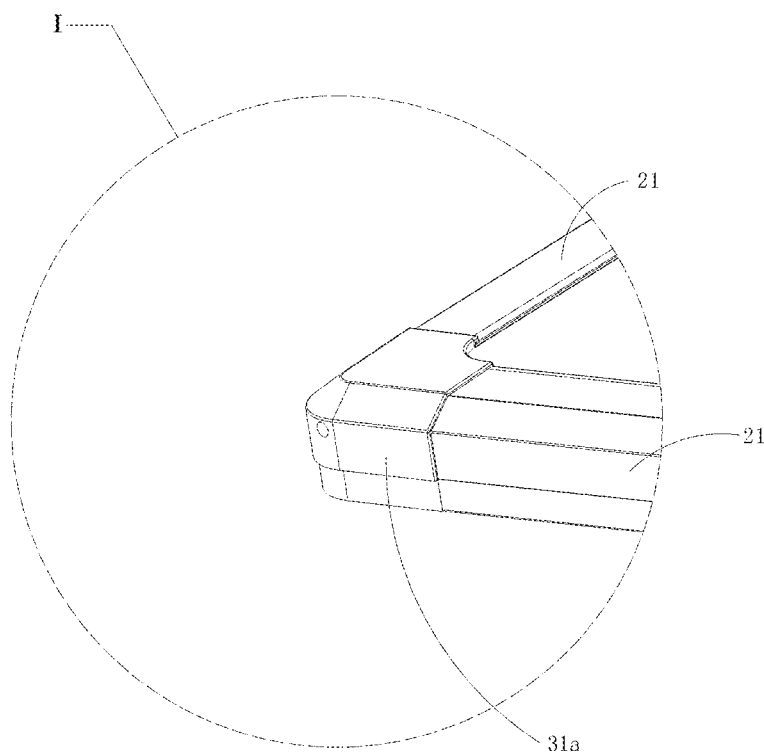
FIG. 27 shows a partially enlarged schematic view at I in FIG. 2.
Figure 28:
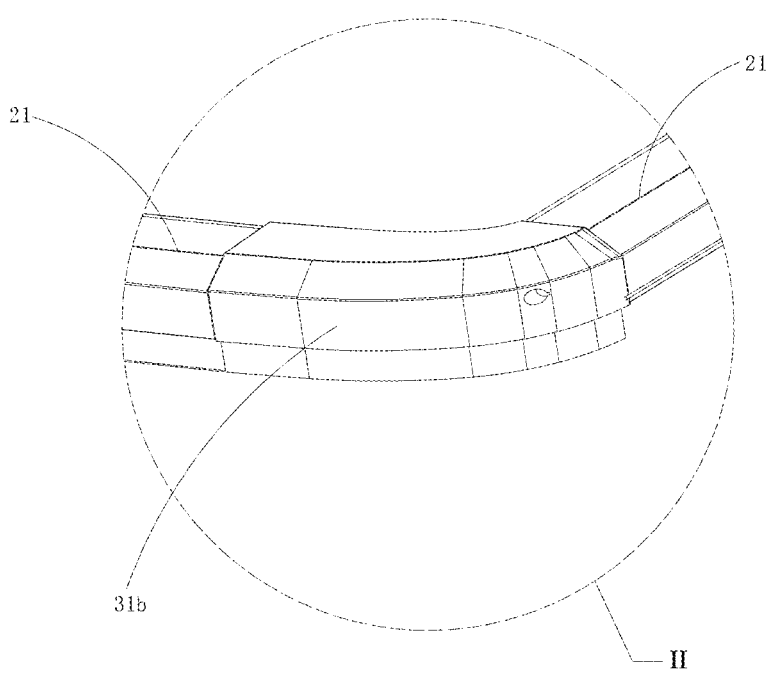
FIG. 28 shows a partially enlarged schematic view at II in FIG. 2.
Figure 29:
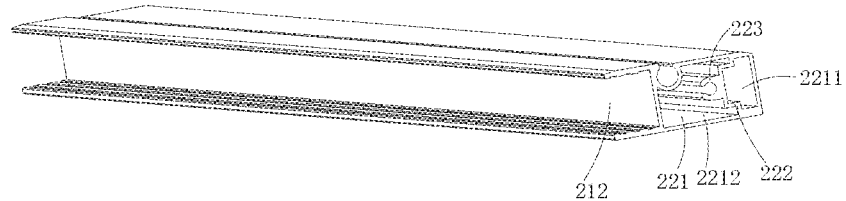
FIG. 29 illustrates a schematic structural view of a second profile in FIG. 2.

Referring to FIGS. 19 to 28, FIG. 19 illustrates a schematic structural view of a first profile in FIG. 2; FIG. 20 illustrates a schematic structural view of the first profile in FIG. 19 from another view; FIG. 21 illustrates a schematic structural view of an end face of the first profile in FIG. 19; FIG. 22 illustrates a schematic structural view of a first connecting member close to the driver's cab in FIG. 2; FIG. 23 illustrates a schematic structural view of the first connecting member in FIG. 22 from another view; FIG. 24 illustrates a schematic structural view of the first connecting member close to the tail portion of the tail box in FIG. 2; FIG. 25 illustrates a schematic structural view of the first connecting member in FIG. 24 from another view; FIG. 26 illustrates a schematic structural view of the first connecting member in FIG. 24 from yet another view; FIG. 27 shows a partially enlarged schematic view at I in FIG. 2; FIG. 28 shows a partially enlarged schematic view at II in FIG. 2. In this embodiment, the profile assembly 2 includes a first profile 21. The first profile 21 defines a first clamping hole 211 and a first mounting groove 212 penetrating through an axial direction of the first profile 21. The first clamping hole 211 and the first mounting groove 212 are separated by a first groove wall 2121 of the first mounting groove 212. The first profile 21 includes a first top wall 2122 and a first bottom wall 2124 disposed diametrically opposite to each other. The first clamping hole 211 is provided with a first supporting member 215 located on the first bottom wall 2124, a second supporting member 216 located on the first bottom wall 2124, and a first fixed member 216 connecting the first supporting member 215 and the second supporting member 216. The first supporting member 215, the second supporting member 216, the first bottom wall 2124, and the first groove wall 2121 cooperatively form a first clamping groove 218. The first bottom wall 2124 defines a first through hole 2141 interconnected to the first clamping groove 218. The first bottom wall 2124 protrudes from the first groove wall 2121 and the second supporting member 216. The first profile 21 is connected to a edge of the cover plate 11 disposed on a circumferential side of the foldable cover plate 10 via the first mounting groove 212. The connecting assembly 3 includes: a first connecting member 31 (see 31a in FIGS. 22 and 31b in FIG. 24). The first connecting member 31 includes a connecting body 312, and two first clamping portions 311 fixed to two ends of the connecting body 312. The first clamping portion 311 includes a first clamping post 3111, two first bending posts 3112 bent and coupled to opposite sides of the first clamping post 3111, and two second bending post 3113 each bent and coupled to one of the two first bending posts 3112. The two second bending posts 3113 are disposed in close proximity to each other. The shape and the dimension of the first clamping portion 311 is adapted to the first clamping hole 211. The two first clamping portions 311 are clamped with the first clamping holes 211 of the two adjacent first profiles 21 on the first cover plate 1101, the second cover plate 1102 or the third cover plate 1103.

The material of the first profile 21 includes, but is not limited to, an aluminum alloy, a magnesium alloy, etc. The first profile 21 is an elongate structure having a certain length, and the specific dimensions of the first profile 21 are dependent on the dimensions of the component being set by the first profile 21. Optionally, the first profile 21 may be straight, or the first profile 21 may also have a certain curvature and curvature. Therefore, the first profile 21 defines the first clamping hole 211 and the first mounting groove 212 in the axial direction, the first mounting groove 212 is configured for fixing the first cover plate 1101, the second cover plate 1102 or the third cover plate 1103. Since the first cover plate 1101, the second cover plate 1102 or the third cover plate 1103 has a certain shape, the edges of the first cover plate 1101, the second cover plate 1102 or the third cover plate 1103 located on the outer peripheral side of the foldable cover plate 10 need to be provided with the first profiles 21, and therefore the first connecting member 31 may be provided between the two first profiles 21 of the same first cover plate 1101, the second cover plate 1102 or the third cover plate 1103 for connecting the two adjacent first profiles 21, and the first clamping portion 311 of the first connecting member 31 is configured to cooperate with the first clamping hole 211 to realize fixation. The first clamping hole 211 is not interconnected to the first mounting groove 212, but are separated by the groove wall 2121 of the first mounting groove 212, forming two separate spaces.

When the first profile 21 is subsequently applied to the tail box 201, one side of the first profile 21 close to the tail box 201 is the first bottom wall 2124, one side of the first profile 21 away from the tail box 201 is the first top wall 2122. The groove wall 2121 of the first clamping hole 211 includes the first supporting member 215; the first bottom wall 2124 of the first clamping hole 211 includes the second supporting member 216; and the fixed member 216 connects the first supporting member 215 to the second supporting member 216. At this time, the first supporting member 215, the second supporting member 216, the first bottom wall 2124, and the groove wall 2121 cooperatively form a rectangular groove, which may be called the first clamping groove 218. At the same time, the first bottom wall 2124 defines the first through hole 2141 interconnected to the first clamping groove 218. In this way, the first clamping groove 218 can be utilized to clamp with other components.

In this embodiment, the first bottom wall 2124 is protruded from the groove wall 2121 and the second supporting member 216, i.e., the groove wall 2121 and the second supporting member 216 both include a step structure formed by the projection of the first bottom wall 2124, which improves the connectivity of the first profile 21 with other components.

Optionally, one side of the groove wall 2121 close to the first bottom wall 2124 is recessed with an extension slot 2181 interconnected to the first clamping groove 218. This embodiment may provide the extension slot 2181 at the connection between the groove wall 2121 and the first bottom wall 2124, thereby exposing more of the first bottom wall 2124, further increasing the size of the first bottom wall 2124 against which the first clamping portion 311 is able to rest, and further improving the clamping effect and connection performance. Optionally, the shape of the extension slot 2181 may be similar to the shape of the edge of the first clamping portion 311 for better harboring the first clamping portion 311.

Optionally, the first profile 21 further includes a first sidewall 219a bent to connect the first bottom wall 2124, and a second sidewall 219b bent to connect the first sidewall 219a to the first top wall 2122. The first bottom wall 2124, the first top wall 2122, the first sidewall 219a, and the second sidewall 219b cooperatively form the first clamping hole 211. The second sidewall 219b is inclined. The first profile 21 includes two sidewalls in addition to the first top wall 2122 and the first bottom wall 2124, the first sidewall 219a is bent to connect one side of the first bottom wall 2124 away from the groove wall 2121. Optionally the first sidewall 219a is perpendicular to the first bottom wall 2124. The second sidewall 219b bends to connect the first sidewall 219a to the first top wall 2122, i.e. one end of the second sidewall 219b is bent to connect the first sidewall 219a, and the other end is bent to connect the first top wall 2122. The first bottom wall 2124, the first top wall 2122, the first sidewall 219a, the second sidewall 219b may cooperatively form the first clamping hole 211. The present embodiment may cause the second sidewall 219b to be inclined, so that both the inner and outer surfaces of the second sidewall 219b are inclined. The inclined setting of the inner surface can be configured for subsequent assembly with the first connecting member 31 to act as a positioning stop, which improves the assembly effect and connection performance. The inclined setting of the outer surface not only improves the appearance effect, but also guides the water to flow out if there is water on the first profile 21, realizing the function of guiding.

Optionally, one end of the first sidewall 219a away from the second sidewall 219b protrudes from the first bottom wall 2124. A portion of the first sidewall 219a that protrudes from the first bottom wall 2124 may be referred to as a covering portion, which is configured to cover and pressure a portion of the first waterproof member 41a when the clamping portion of the first waterproof member 41a is mounted within the first clamping groove 218, and the scaling portion of the first waterproof member 41a is also able to cover and extend beyond the covering portion. Thus the covering portion in conjunction with the first waterproof member 41a can further improve the sealing effect.

Optionally, at least one of the first top wall 2122 and the first bottom wall 2124 defines an anti-slip groove 2123 at a side facing the first mounting groove 212. The first mounting groove 212 is mainly formed by the groove wall 2121, the first top wall 2122, and the first bottom wall 2124. The present embodiment may be provided with the anti-slip groove 2123 on the side of the at least one of the first top wall 2122 and the first bottom wall 2124 that are facing each other. For example, the anti-slip groove 2123 may be defined only on the first top wall 2122 or on the first bottom wall 2124, or on the anti-slip groove 2123 may be defined on both the first top wall 2122 and the first bottom wall 2124. In this embodiment, only the fact that the first top wall 2122 and the first bottom wall 2124 both define the anti-slip groove 2123. When components such as the first cover plate 1101, the second cover plate 1102 or the third cover plate are mounted into the first mounting groove 212, the anti-slip groove 2123 can be utilized to increase the friction performance of the first top wall 2122 and the first bottom wall 2124 with the first cover plate 1101, the second cover plate 1102 or the third cover plate, so as to improve the connection performance between the first profile 21 with the first cover plate 1101, the second cover plate 1102 or the third cover plate.

The first connecting member 31 is divided into the first connecting member 31a and the first connecting member 31b according to the different installation positions, the first connecting member 31a is located close to the driver's cab 202, and the first connecting member 31b is located close to the tail portion of the tail box 201.

The first profile 21 is configured for wrapping the side edges of the first cover plate 1101, the second cover plate 1102 or the third cover plate, and the first connecting member 31a is configured for wrapping the corner edges of the first cover plate 1101 or the third cover plate, so as to realize full wrapping of the edges of the first cover plate 1101, or the third cover plate. The first connecting member 31a includes a connecting body 312 and two first clamping portions 311 for different purposes. The connecting body 312 is mainly configured for wrapping the peripheral edges at the corners of the first cover plate 1101, or the third cover plate, and the first clamping portion 311 is located on at least one side of the connecting body 312. The first clamping portion 311 is configured to be inserted into the first clamping hole 211 of the first profile 21 for realizing to clamp the first connecting member 31a with the first profile 21. Optionally, the connecting body 312 and the first clamping portion 311 are of a one-piece structure or a split structure, and this embodiment is only illustrated schematically with the connecting body 312 and the first clamping portion 311 being of a one-piece structure. Furthermore, optionally, the material of the first connecting member 31a includes but is not limited to plastic, carbon fiber, aluminum alloy, magnesium alloy, and the like.

The first clamping portion 311 provided in the present includes three parts: first clamping post 3111, first bending post 3112, and second bending post 3113. The first clamping post 3111 is flat. The number of the first bending posts 3112 and the second bending posts 3113 are both two. The two first bending posts 3112 are bent and connected to opposite sides of the first clamping post 3111. The second bending post 3113 is bent and connected to one side of each first bending post 3112 that is away from the first clamping post 3111. Optionally, the angle between the first bending post 3112 and the first clamping post 3111 is not less than 90°, and the angle between the first bending post 3112 and the second bending post 3113 is not greater than 90°. The above content can also be understood to mean that the overall shape of the first clamping portion 311 is not flat and straight, but rather has a bent shape that has been bent twice. The bent shape of the first clamping portion 311 can firstly increase a clamping size and a clamping area of the first clamping portion 311. When the first clamping portion 311 is inserted into the first clamping hole 211 of the first profile 21, the size of the clamping area of the first clamping portion 311 and the first clamping portion 311 can be increased, thereby improving the clamping effect. Secondly, since bending can change a direction of the first clamping portion 311, it can increase a direction of the clamping, limiting more degrees of freedom between the first connecting member 31a and the first profile 21, and further improving the clamping effect. In addition, the present embodiment also sets the two second bending posts 3113 close to each other instead of setting the two second bending posts 3113 away from each other, which can reduce the overall size of the first clamping portion 311, thereby reducing the overall size of the first connecting member 31a and the first profile 21 and realizing miniaturization of the first clamping portion 311 and the first profile 21.

Optionally, the shape and size of the first clamping portion 311 is configured to adapt to the shape and size of the first clamping hole 211. As can be seen from the foregoing, designing the first clamping portion 311 in the shape of being bent twice may improve the clamping effect. The present embodiment also allows the shape and size of the first clamping portion 311 to be adapted to the shape and size of the first clamping hole 211, in other words, the shape of the first clamping hole 211 is correspondingly designed to be bent twice, which further improves the clamping effect of the first clamping member 31a and the first clamping hole 211. In addition to the shape, the size of the first clamping portion 311 can be adapted to the size of the first clamping hole 211, and the size of the first clamping post 3111, the size of the first bending post 3112, and the size of the second bending post 3113 can be adapted to the size of the first clamping hole 211, respectively. Optionally, the first clamping post 3111, the first bending post 3112, the second bending post 3113 of the first clamping portion 311 may be abutted against the hole wall of the first clamping hole 211.

Optionally, the connecting body 312 defines a fourth through hole 3121. The fourth through hole 3121 penetrates through one side of the connecting body 312 where the connecting body 312 sets the first clamping portion 311, and another side of the connecting body 312 opposite to the side of the connecting body 312 where the connecting body 312 sets the first clamping portion 311. The fourth through hole 3121 is configured to allow a first fastener to pass through and fasten with the first fixed member 217 of the first profile 21. The fourth through hole 3121 is located within a space formed by the first clamping post 3111, the first bending post 3112, and the second bending post 3113.

In addition, after installing the first fastener inside the fourth through hole 3121, a rubber plug is inserted inside the fourth through hole 3121, on the one hand, the rubber plug serves as a waterproof scaling to prevent the first fastener from rusting, and on the other hand, the rubber plug can cover the first fastener and the fourth through hole 3121 for aesthetic appearance. Plugs may be inserted into other through holes where fastening structures are to be inserted to protect the fastening structures and improve the appearance.

Optionally, the connecting body 312 includes a first side 301 and a second side 302 opposite to the first side 301, and a third side 303 located between the first side 301 and the second side 302, and a fourth side 304 located between the first side 301 and the second side 302, and opposite to the third side 303. The first side 301 is bent to connect the third side 302. The first side 301 and the third side 303 each includes the first clamping portion 311. The second side 302 is bent to connect the fourth side 304. The second side 302 and the fourth side 304 each defines the fourth through hole 3121.

Alternatively, the present embodiment may define the fourth through hole 3121 both on the second side 302 and the fourth side 304, respectively, and utilize two first fasteners to fix the first connecting member 31a and the two first profiles 21, respectively. For example, the first profile 21 and the first connecting member 31a where located on the first side 301 are fixed by one first fastener passing through the fourth through hole 3121 where defined on the second side 302, and the third profile 21 and the first connecting member 31a where located on the third side 303 are fixed by the other first fastener passing through the fourth through hole 3121 where defined on the fourth side 304, realizing the securing of the first connecting member 31a with the plurality of first profiles 21.

In this embodiment, the first connecting member 31a is configured to first enable a first fastener to be fastened to a first fixed member 217 of a first profile 21 through a fourth through hole 3121 and the end of the first fastener is located within the first avoidance groove 3125; the first connecting member 31a is also configured to further enable the other first fastener to be fastened to the other first fixed member 217 of the other first profile 21 through the other fourth through hole 3121, and the end of the other first fastener is located within the first avoidance groove 3125.

Furthermore, in this embodiment, the first avoidance groove 3125 defines a first sub-portion 3125a axially disposed along one fourth through hole 3121, and a second sub-portion 3125b axially disposed along the other fourth through hole 3121. The first sub-portion 3125a is interconnected to the second sub-portion 3125b. The end of one first fastener is received within the first sub-portion 3125a, and the end of the other first fastener is received within the second sub-portion 3125b. The first avoidance groove 3125 is shaped as a bend. The end of one of the two first fasteners is located in the first sub-portion 3125a, such that the end of the other of the first fasteners entered into the second sub-portion 3125b through another fourth through hole 3121 is not affected by the previous first fastener located within the first sub-portion 3125a, further preventing the two first fasteners from interfering with each other.

The first bottom surface 314 of the first connecting member 31b defines a first weight reducing hole 3141 for reduce the weight of the first connecting member 31b. At the same time, the present embodiment may also be provided with a plurality of reinforcing assemblies 315 arranged in an extension direction of the first weight reducing hole 3141, thereby improving the structural strength of the first connecting member 31b. The present embodiment is illustrated schematically with only three reinforcement assemblies 315. In addition, each reinforcing assembly 315 includes two first reinforcing members 3151, each first reinforcing member 3151 connects both the side walls on opposite sides of the first weight reducing hole 3141 and the bottom wall of the first weight reducing hole 3141. The two first reinforcing members 3151 are set at an angle on the sidewalls of the first weight reducing hole 3141 and the two first reinforcing members 3151 are set axisymmetrically, which can further improve the structural strength of the first connecting member 31b, and make the first connecting member 31b have a high structural strength while reducing weight.

Optionally, the first connecting member 31b includes a fifth side 305 for connecting the first profile 21 on one side of the cover plate 11, and a sixth side 306 for connecting another first profile 21 on an adjacent side of the cover plate 11. The first connecting member 31b defines a third fixed hole 316 penetrating through the outer peripheral side 307 of the first connecting member 31b and the fifth side 305. The third fixed hole 316 interconnects the first weight reducing hole 3141. The third fixed hole 316 is closer to the fifth side 305 than the sixth side 306. The first connecting member 31b includes multiple sides, one of which is the fifth side 305 for connecting the first profile 21 on one side of the cover plate 11, and the other of which is the sixth side 306 for connecting the first profile 21 on the neighboring side of the cover plate 11, so that the fifth side 305 and the sixth side 306 are also provided adjacent to each other. In addition, the subsequent exterior side of the first connecting member 31b may be called the outer peripheral side 307. The first connecting member 31b defines the third fixed hole 316, wherein the third fixed hole 316 penetrates through the outer peripheral side 307 and the fifth side 305 of the first connecting member 31b, and the third fixed hole 316 is interconnected to the first weight reducing hole 3141, and a screw is subsequently passed through the third fixed hole 316 on the outer peripheral side 307, the first weight reducing hole 3141, and the third fixed hole 316 on the of the fifth side 305 of the first connecting member 31, and finally through the third fixed hole 316 and thus fixedly connected to the first profile 21, realizing the fixation of the first connecting member 31b to the first profile 21. This embodiment allows the third fixed hole 316 to be closer to the fifth side 305, thereby reducing the length of the third fixed hole 316 and subsequently making it easier for the screw to pass through the third fixed hole 316.

Optionally, the outer peripheral side 307 of the first connecting member 31b includes a first outer side surface 3071 bent to connect the sixth side 306 and a second outer side surface 3072 bent to connect the fifth side 305. The second outer side surface 3072 has a curved shape. The outer peripheral side 307 includes the first outer side surface 3071 and the second outer side surface 3072 connected with each other. The first outer side surface 3071 is bent to connect to the sixth side 306. The second outer side surface 3072 is bent to connect the fifth side 305. This embodiment allows the second outer side surface 3072 to be set in a curved shape and the third fixed hole 316 is defined on the second outer side surface 3072. The first connecting member 31b is elongated, so by defining the third fixed hole 316 on the curved second outer side surface 3072 opposite to the fifth side 305, the length of the third fixed hole 316 can be reduced, which facilitates the access and tightening of the screws.

In summary, since the first connecting member 31b is long due to the presence of the first outer side surface 3071 and the second outer side surface 3072, it is possible to define the third fixed hole 316 with a shorter length, but it is not possible to provide the fourth fixed hole 317 with a longer length, which not only does not have a screw with a longer length, but also does not facilitate fixing with the first profile 21. Therefore, the present embodiment enables the screw to pass directly through the second avoidance groove 3152 in the first weight reducing hole 3141 by defining the second avoidance groove 3152 in the first reinforcing member 3151, so as to pass through the sixth side 306, which reduces the difficulty of tightening the screw.

Figure 30:
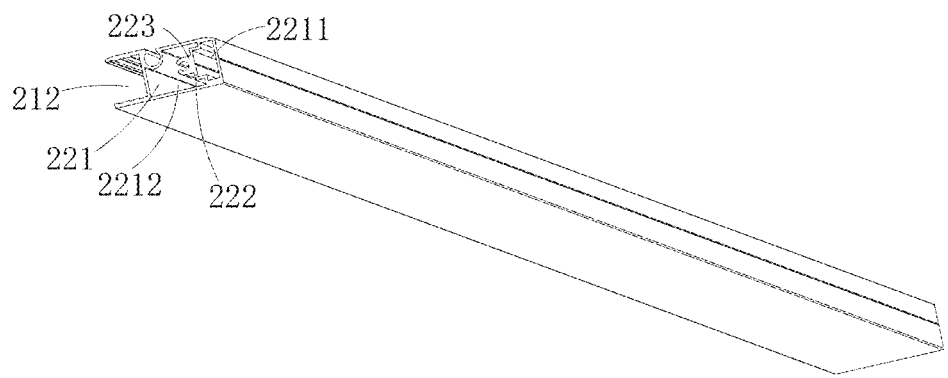
FIG. 30 illustrates a schematic structural view of the second profile in FIG. 29 from another view.
Figure 31:
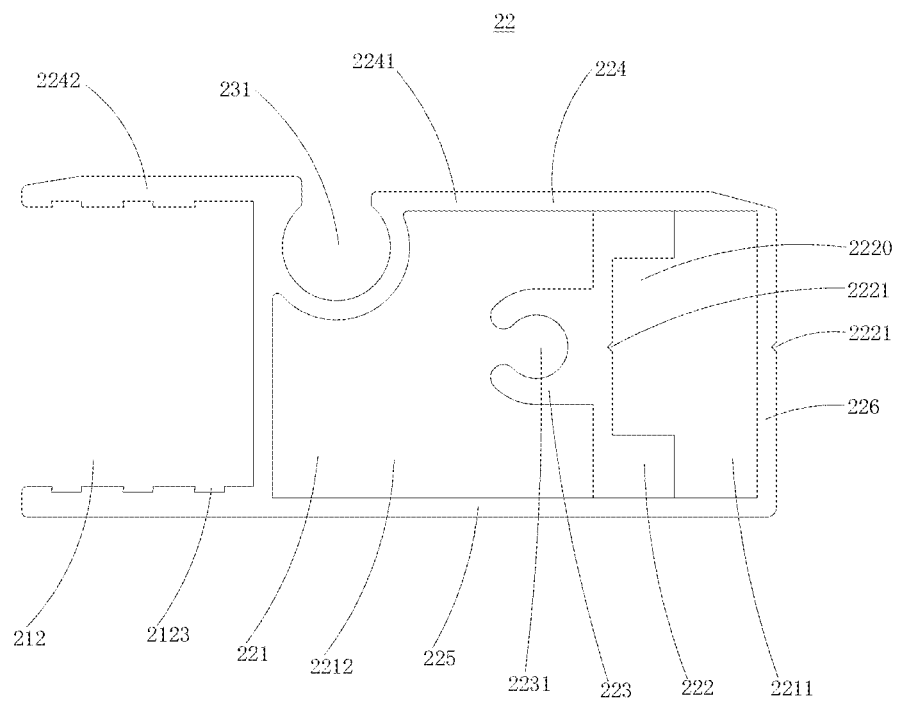
FIG. 31 illustrates a schematic view of an end face of the second profile in FIG. 29.
Figure 32:
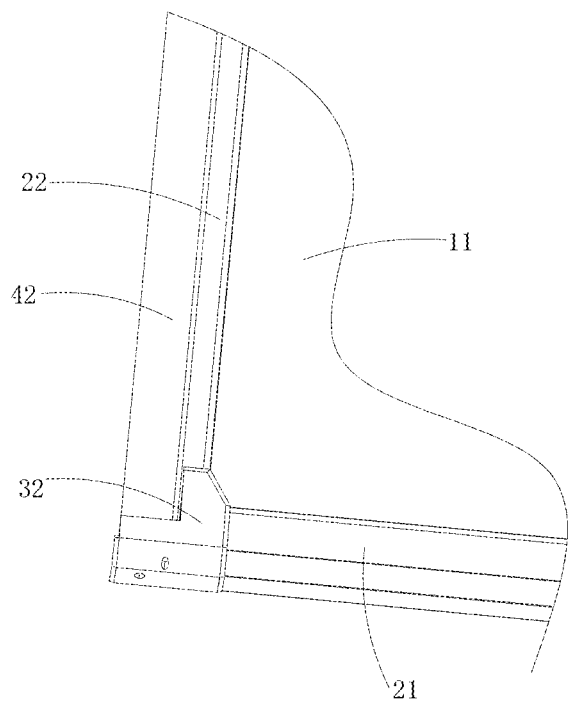
FIG. 32 illustrates a schematic structural view of the second connecting member connecting the first profile to the second profile in FIG. 2.
Figure 33:
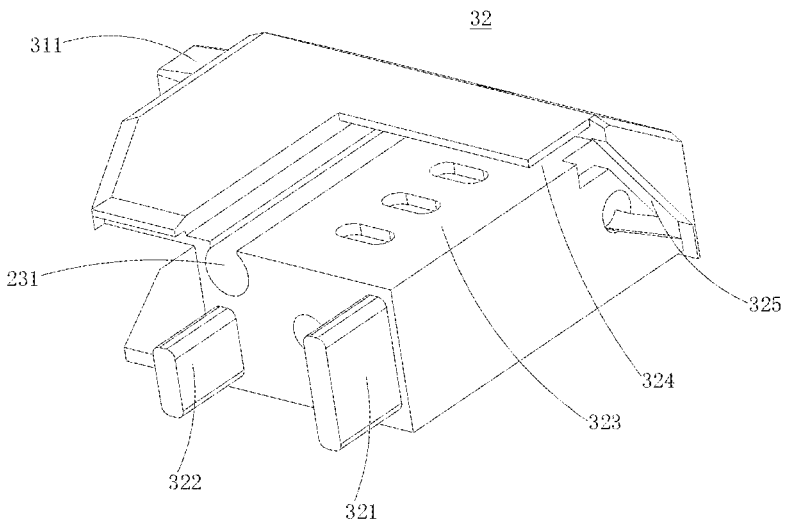
FIG. 33 illustrates a schematic structural view of the second connecting member in FIG. 32.
Figure 34:
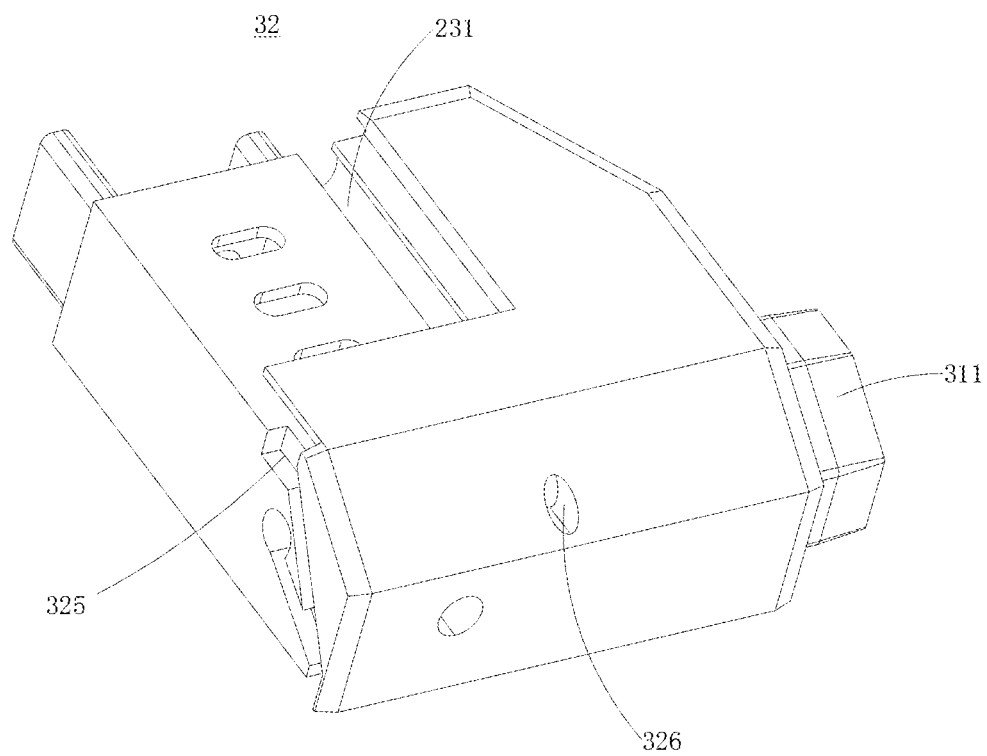
FIG. 34 illustrates a schematic structural view of the second connecting member in FIG. 33 from another view.
Figure 35:
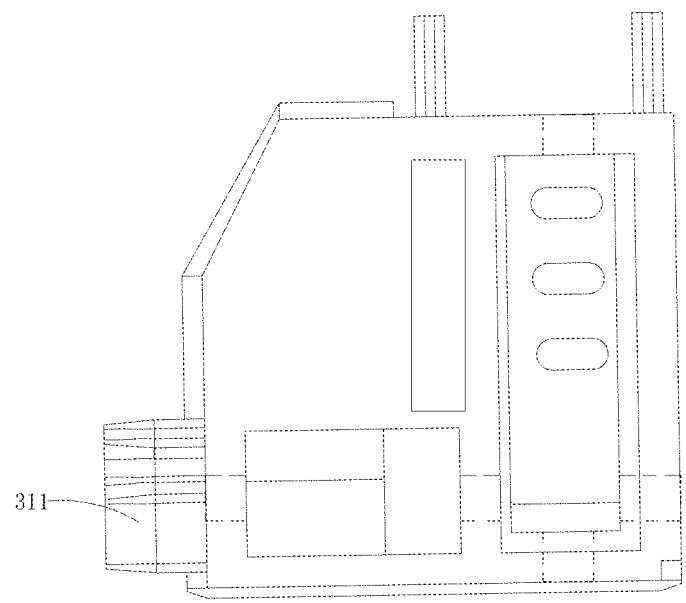
FIG. 35 illustrates a schematic structural view of a bottom surface in FIG. 32.
Figure 36:
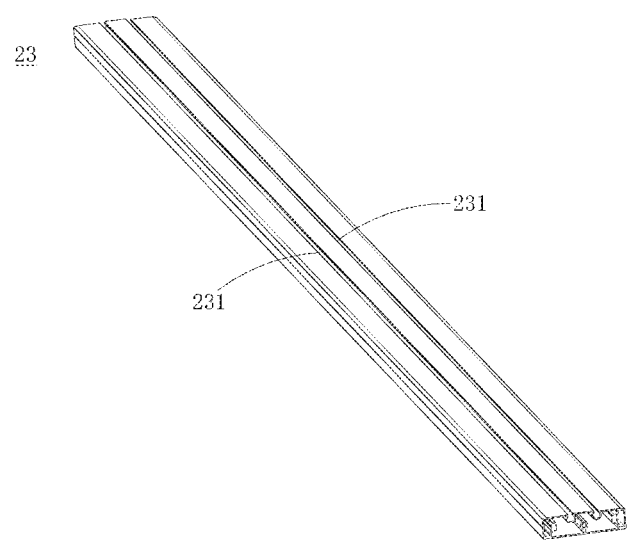
FIG. 36 illustrates a schematic structural view of a third profile in FIG. 2.

Referring to FIGS. 1 and 29 to 35, FIG. 29 illustrates a schematic structural view of a second profile in FIG. 2; FIG. 30 illustrates a schematic structural view of the second profile in FIG. 29 from another view; FIG. 31 illustrates a schematic view of an end face of the second profile in FIG. 29; FIG. 32 illustrates a schematic structural view of the second connecting member connecting the first profile to the second profile in FIG. 2; FIG. 33 illustrates a schematic structural view of the second connecting member in FIG. 32; FIG. 34 illustrates a schematic structural view of the second connecting member in FIG. 33 from another view; FIG. 35 illustrates a schematic structural view of a bottom surface in FIG. 32. In this embodiment, the profile assembly 2 further includes: a second profile 22. The second profile 22 defines a second through hole 221 and a first mounting groove 212 spaced apart from each other. The second profile 22 wraps the edge of the first cover plate 1101 which is close to the second cover plate 1102 through the first mounting groove 212, or edge of the third cover plate 1103 which is close to the second cover plate 1102 through the first mounting groove 212, or the two edges of the second cover plate 1102 which are close to the first cover plate 1101 and the third cover plate 1103 respectively. The second through hole 221 has a first division portion 222. The second through hole 221 is separated by the first division portion 222 into a second clamping hole 2211 and a weight reducing hole 2212. The first division portion 222 includes a third locking part 223 located in the weight reducing hole 2212. The connecting assembly 3 further includes a second connecting member 32. One side of the second connecting member 32 includes a second clamping portion 321 and a mounting member 322 spaced apart from each other. The second clamping portion 321 is configured to be inserted into the second clamping hole 2211. The mounting member 322 is configured to be inserted into the weight reducing hole 2212. A height of the second clamping portion 321 is greater than that of the mounting member 322. Another side of the second connecting member 32 includes a first clamping portion 311. The second connecting member 32 connects to the first profile 21 and the second profile 22 on the same cover plate 11 through the first clamping portion 311, the second clamping portion 321 and the mounting member 322.

The second profile 22 is made of materials including, but not limited to, carbon fiber, ferrous alloy, aluminum alloy, magnesium alloy, etc. The end face of the second profile 22 includes two hole structures spaced apart from each other: the second through hole 221 and the first mounting groove 212. The two hole structures extend along the length of the second profile 22. The two hole structures are separated by an inner wall. The first mounting groove 212 is a hole structure with an side opening so that a peripheral edge of a subsequent component can enter through the side opening and be fixed in the first mounting groove 212. The second through hole 221 is a closed second through hole 221 on four sides, penetrating only on the opposite ends of the second profile 22. The second through hole 221 is configured to set other components of the second profile 22. For example, the first division portion 222 may be set in the second through hole 221, and the first division portion 222 connects the top wall and the bottom wall of the second profile 22, thereby separating the second through hole 221 into two hole structures again: the second clamping hole 2211 and the weight reducing hole 2212.

In addition, the first division portion 222 includes a third locking part 223 located on one side of the first division portion 222 close to the weight reducing hole 2212. The third locking part 223 is located within the weight reducing hole 2212. The third locking part 223 may subsequently lock with the second connecting member 32 to fix the second connecting member 32 to the second profile 22. By setting the third locking part 223 on the first division portion 222, not only the structure can be simplified, the design can be optimized, and the space in the weight reducing hole 2212 be effectively utilized, but also the structural strength of the second profile 22 can be improved, and cracking of the second profile 22 can be avoided, which improves the service life of the second profile 22.

Optionally, the third locking part 223 defines a locking hole 2231. The locking hole 2231 penetrates through a side surface of the third locking part 223 away from the first division portion 222 to expose the locking hole 2231. The third locking part 223 is disposed axisymmetrically. The third locking part 223 defines the locking hole 2231, and the locking hole 2231 also penetrates through the end surfaces of the second profile 22 on opposite sides. The locking hole 2231 may subsequently be configured for a locking fit with the second connecting member 32.

Moreover, the threaded hole also penetrates through one surface of the third locking part 223 on one side away from the first division portion 222 to expose the locking hole 2231, which can also be understood to mean that the locking hole 2231 is not a peripherally closed hole, but rather a hole structure with an opening to allow for the locking hole 2231 to penetrate through the surface of the third locking part 223 on the side away from the first division portion 222, thereby preventing the third locking part 223 from rupturing or being damaged, and improving a service life of the third locking part 223.

Optionally, at least one of the outer peripheral of the third sidewall 226 and the bottom wall of the widened groove 2220 of the second profile 22 defines a molded groove 2221. In this embodiment, the molded groove 2221 is defined on the outer peripheral third sidewall 226 of the second profile 22. The molded groove 2221 may facilitate drainage and venting of the wrapped edge so that water or gas can be discharged out of the second profile 22 as quickly as possible through the molded groove 2221. In other embodiments, the molded groove 2221 may also be defined on the bottom wall of the widened groove 2220. The molded groove 2221 on the widened bottom wall is mainly configured for drainage and venting, so that water, gas, etc. inside is discharged as soon as possible out of the second profile 22 through the molded groove 2221.

Optionally, the first wall 224 includes a first sub-wall 2241 and a second sub-wall 2242 located on opposite sides of the second clamping groove 231. The first sub-wall 2241 corresponds to the second through hole 221. The second sub-wall 2242 corresponds to the first mounting groove 212. A distance between the first sub-wall 2241 and the second wall 225 is less than that of between the second sub-wall 2242 and the second wall 225. The second waterproof structure 42 will not only make a sealing connection with the second profile 22, but also with adjacent components (e.g., connectors, second profile 22, etc.) of the second profile 22, and the second profile 22 and the connecting member may also be rotated relative to each other. Therefore, this embodiment can eliminate the dent in the second waterproof structure 42 by controlling the height of the first sub-wall 2241 and the second sub-wall 2242, improve the appearance of the sealing member, and also increase the effect of squeezed positioning.

Figure 50:
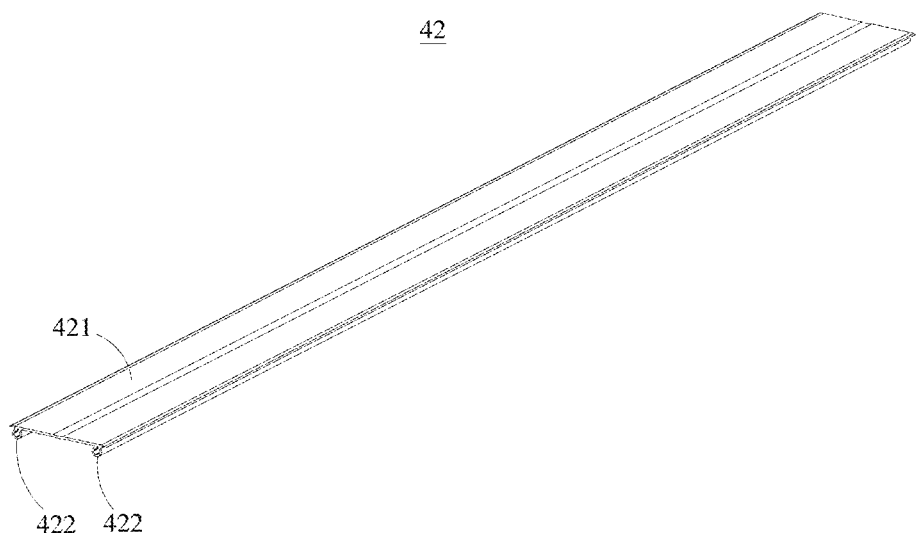
FIG. 50 illustrates a schematic structural view of the second waterproof structure in FIG. 2.

The second connecting member 32 also connects the first profile 21 and the second profile 22 located on adjacent sides of the cover plate 11 so as to make the circumference of the cover plate 11 have a smooth connection and transition. The first profile 21 and the second profile 22 are defined with the second clamping groove 231 subsequently to accommodate a second clamping rib 422 (as shown in FIG. 50) protruding from the second waterproof structure 42, thereby connecting the first profile 21 and the second profile 22 to the second waterproof structure 42. The first profile 21 and the second profile 22 also define an assembly hole and a weight reducing hole. The second clamping portion 321 can be inserted into the assembly hole, and the mounting member 322 can be inserted into the weight reducing hole. Since the sealing groove provided above will be provided in the weight reducing hole, the height of the weight reducing hole therein will be reduced. Optionally, the second clamping portion 321 and the mounting member 322 have a plate shape. Optionally, the second clamping portion 321 and the mounting member 322 each is provided with a guided inclined surface on one side away from the second connecting member 32, so as to facilitate the second clamping portion 321 and the mounting member 322 to be mounted into the first profile 21 and second profile 22.

This embodiment allows the height of the second clamping portion 321 to be greater than the height of the mounting member 322, so that the second clamping portion 321 which has higher height can be configured for subsequent insertion into the assembly hole which has higher height, and the mounting member 322 which has lower height can be configured for subsequent insertion into the weight reducing hole which has lower height. That is to say, the mounting member 322 is located underneath the second clamping groove 231 in the weight reducing hole, and does not occupy the other space in the weight reducing hole, thereby saving space in the weight reducing hole, reducing the size of the first profile 21 and the second profile 22, effectively utilizing the space, making the first profile 21 and the second profile 22 narrower, and enabling the second connecting member 32 to be better adapted to the new first profile 21 and second profile 22, and improving the adapting effect of the second connecting member 32 with the first profile 21 and the second profile 22.

Optionally, the materials of the first profile 21 and the second profile 22 include but are not limited to plastic, carbon fiber, aluminum alloy, magnesium alloy, and the like.

Optionally, the second connecting member 32 has a top side and a bottom side. The top side is a side of the second connecting member 32 away from the tail box 201 when the second connecting member 32 is subsequently applied to the foldable cover plate 10 and the foldable cover plate 10 is covered on the tail box 201 and is in the unfolded state. In contrast, the side of the second connecting member 32 close to the tail box 201 is the bottom side. The present embodiment may form an accommodating groove 323 recessed in the top side. The accommodating groove 323 may be configured to accommodate a second waterproof structure 42 connected to the first profile 21 and the second profile 22. The second waterproof structure 42 may protrude from the ends of the first profile 21 and the second profile 22, so that the protruding portion may be located in the accommodating groove 323 of the second connecting member 32, thereby preventing the first profile 21 and the second profile 22 from protruding at the second connecting member 32, such that the first profile 21 and the second profile 22 are set flush.

Optionally, the sidewall of the accommodating groove 323 defines a containing groove 324 interconnected with the accommodating groove 323. The containing groove 324 is configured to contain an end portion of the second waterproof structure 42. The sidewall of the accommodating groove 323 may also define the containing groove 324 interconnected to the accommodating groove 323. The end portion of the second waterproof structure 42 may be inserted into the containing groove 324, thereby preventing the end portion of the second waterproof structure 42 from warping and flanging, and also effectively protecting the second waterproof structure 42.

Optionally, the side of the second connecting member 32 defines a drain tank 325 interconnected with the containing groove 324 and the accommodating groove 323. The side may include the drain tank 325 that interconnects the containing groove 324 with a waterproof tank. When water falls on the top surface, the water will flow to the drain tank 325 through the accommodating groove 323 and the containing groove 324, and then flow to outside of the second connecting member 32 through the drain tank 325, so that the water can be efficiently guided to the outside of the second connecting member 32.

Figure 37:
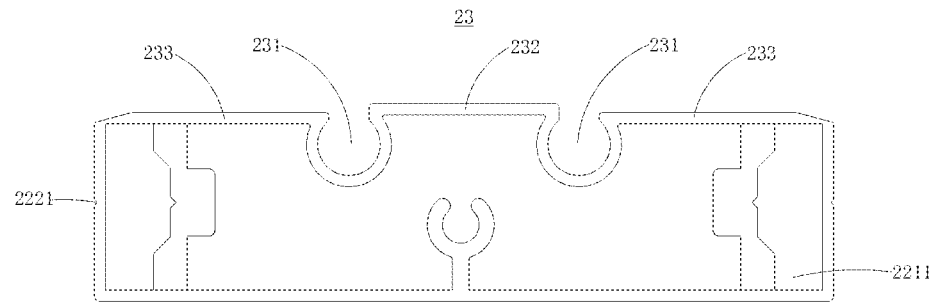
FIG. 37 illustrates a schematic structural view of an end face of the third profile in FIG. 36.
Figure 38:
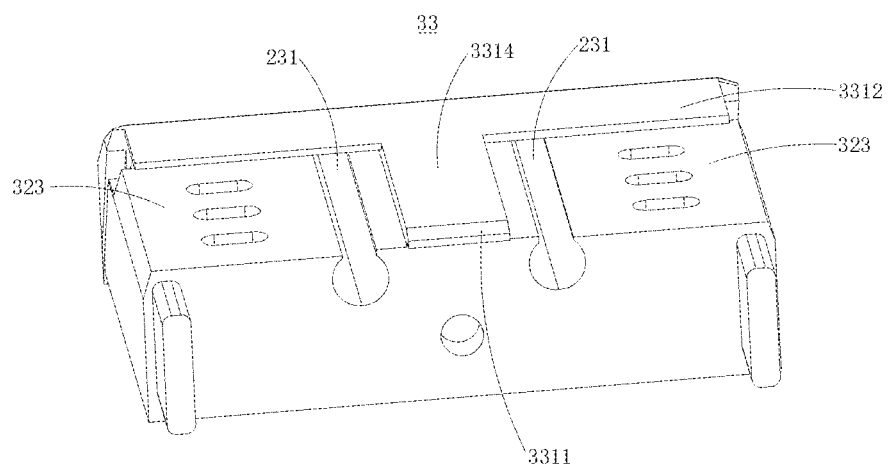
FIG. 38 illustrates a schematic structural view of a third connecting member of FIG. 2.
Figure 39:
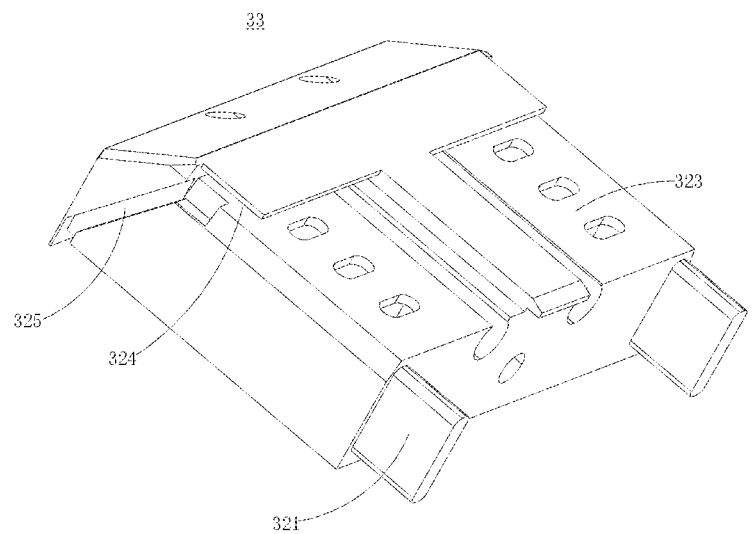
FIG. 39 illustrates a schematic structural view of the third connecting member of FIG. 38 from another view.
Figure 40:
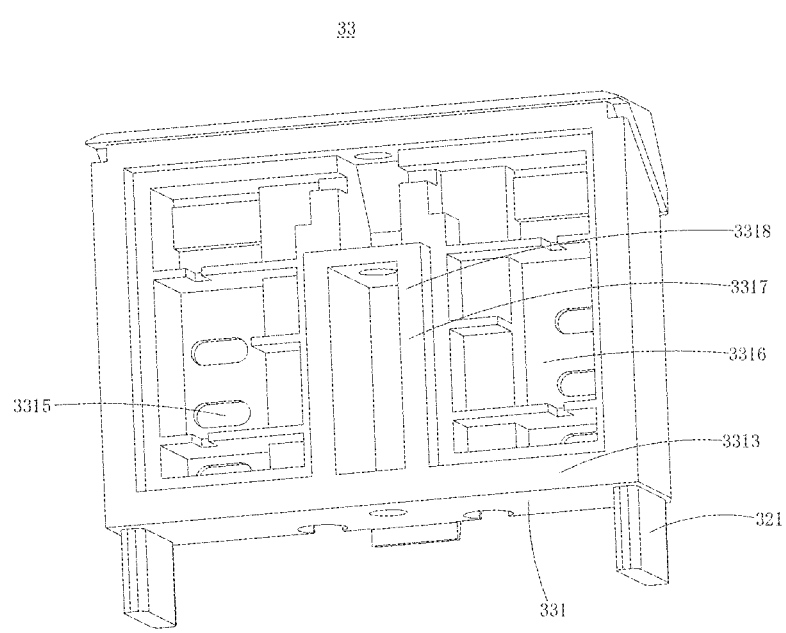
FIG. 40 illustrates a schematic structural view of a bottom surface of the third connecting member in FIG. 38.
Figure 41:
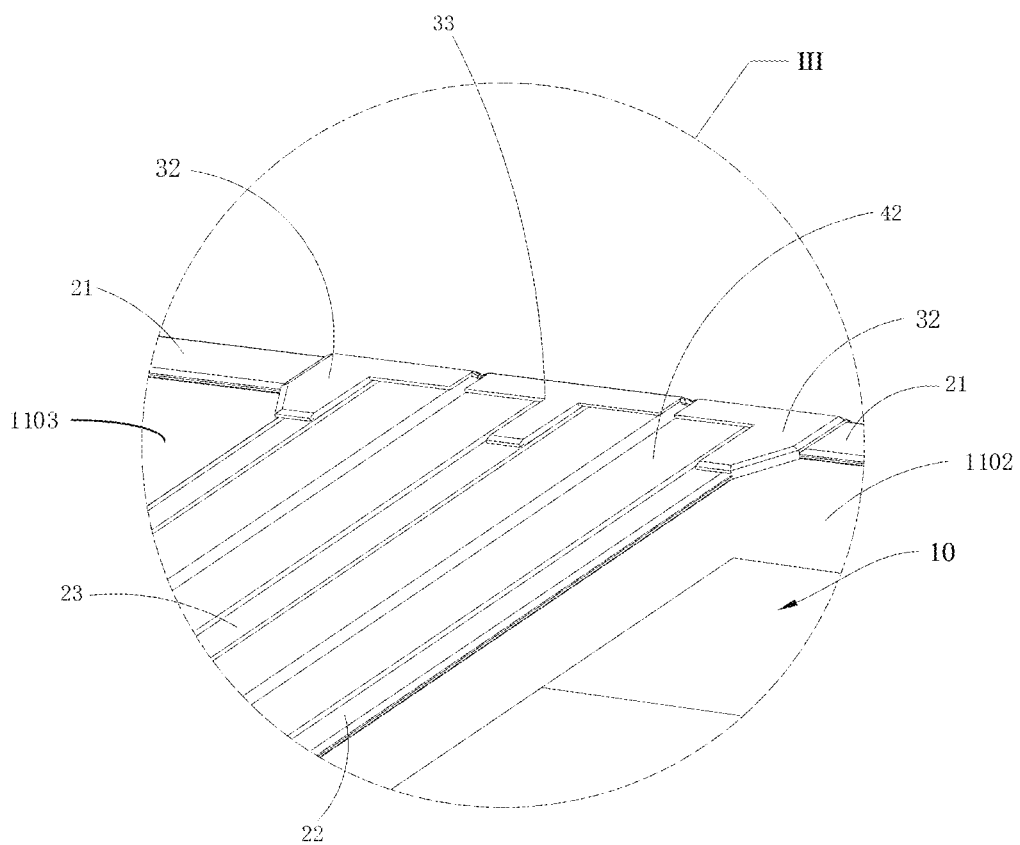
FIG. 41 illustrates a partially enlarged schematic view at III in FIG. 2.
Figure 42:
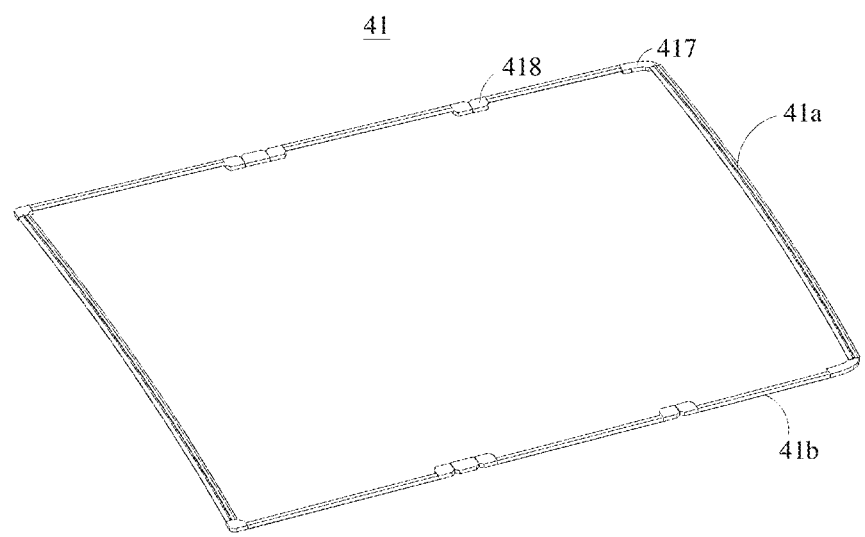
FIG. 42 illustrates a schematic structural view of a first waterproof structure in FIG. 2.

Referring to FIGS. 36 to 41, FIG. 36 illustrates a schematic structural view of a third profile in FIG. 2; FIG. 37 illustrates a schematic structural view of an end face of the third profile in FIG. 36; FIG. 38 illustrates a schematic structural view of a third connecting member of FIG. 2; FIG. 39 illustrates a schematic structural view of the third connecting member of FIG. 38 from another view; FIG. 40 illustrates a schematic structural view of a bottom surface of the third connecting member in FIG. 38; FIG. 41 illustrates a partially enlarged schematic view at III in FIG. 2. In this embodiment, the profile assembly 2 further includes a third profile 23. The third profile 23 is located between the second profile 22 located at an edge of the third cover plate 1103 close to the driver's cab 202 and the second profile 22 located at an edge of the second cover plate 1102 in the center of the tail box 201. One side of the third profile 23 is curved to form the circular second clamping groove 231. The second clamping groove 231 extends along an extension direction of the third profile 23. The second clamping groove 231 has an opening width that is smaller than a diameter of the second clamping groove 231. The connecting assembly 3 further includes: a third connecting member 33. The third connecting member 33 has an insertion surface 331 for inserting the third profile 23. The insertion surface 331 has a resisting portion 3311.

In this embodiment, the material of the third profile 23 includes, but is not limited to, aluminum alloy, magnesium alloy, etc. The third profile 23 may be connected to a second waterproof structure 42 in addition to the second cover plate 1102 and the third cover plate 1103. The second waterproof structure 42 is configured to cover the surface of the third profile 23, so as to avoid water, dust, and other impurities from entering other parts or the inside of the tail box 201 through the third profile 23. Therefore, the third profile 23 needs to have a good scaling connection performance with the second cover plate 1102 and the third cover plate 1103, and if the second cover plate 1102 and the third cover plate 1103 and the third profile 23 are loose or separated from each other, water, dust and other impurities will be caused to enter the other parts or the inside of the tail box 201 through the third profile 23.

In this embodiment, one side surface of the third profile 23 defines a second clamping groove 231. The second waterproof structure 42 correspondingly includes a mounting portion. The second waterproof structure 42 is connected to the third profile 23 by the mounting portion inserting into the second clamping groove 231. For the second clamping groove 231, the second clamping groove 231 is formed by bending one side of the third profile 23 to the inside of the third profile 23, and is not a conventional second clamping groove 231 formed by opening the second clamping groove 231 on one side of the third profile 23. The second clamping groove 231 extends in an extension direction of the third profile 23, thereby facilitating subsequent assembly of the second waterproof structure 42 when the second waterproof structure 42 can completely cover and obscure the third profile 23 along the length direction.

Moreover, since the second clamping groove 231 is formed by one side of the third profile 23 being curved, therefore, the second clamping groove 231 has an opening, and the curved second clamping groove 231 likewise has a diameter within it. This embodiment allows the width of the opening of the second clamping groove 231 to be smaller than the diameter of the second clamping groove 231. In this way, due to the smaller size of the opening, after the second clamping rib 422 is mounted in the second clamping groove 231 by whatever method, the second clamping rib 422 cannot be easily pulled out of the second clamping groove 231, which increases the difficulty of removing the second clamping rib 422 from the second clamping groove 231, and prevents the second clamping rib 422 from being pulled out from the second clamping groove 231 along the direction of alignment between the third profile 23 and the second waterproof structure 42, i.e., the vertical direction, thereby increasing the tightness of the connection between the third profile 23 and the second waterproof structure 42, and preventing the third profile 23 from separating from the second waterproof structure 42.

Optionally, one side of the third profile 23 includes a first portion 232 and a second portion 233. The first portion 232 is located between the two second clamping grooves 231. The second portion 233 is located on one side of the second clamping groove 231 that departs from the first portion 232. The first portion 232 protrudes from the second portion 233. The third profile 23 may include a first portion 232 and two second portions 233. The first portion 232 may be located between two second clamping grooves 231. One second portion 233 is located on one side of the second clamping groove 231 that is away from the first portion 232, and another second portion 233 is located on one side of the other second clamping groove 231 that is away from the first portion 232. In other words, one side of the third profile 23 may be the second portion 233, the second clamping groove 231, the first portion 232, the second clamping groove 231, and the second portion 233 in that order. This embodiment may allow the first portion 232 to protrude from the second portion 231, which can eliminate the dent of the second waterproof structure 42, increase the extrusion positioning, and improve the appearance effect and positioning effect of the second waterproof structure 42.

In this embodiment, the third profile 23 can be connected and sealed in the axial direction by utilizing the insertion surface 331 of the third connecting member 33. In this embodiment, a resisting portion 3311 can be set on the insertion surface 331, and the position of the resisting portion 3311 can be controlled which allows the third connecting member 33 to be inserted into the axial end face of the third profile 23, using the resisting portion 3311 to also hold the third profile 23 against the top surface of the third profile 23 which sets the second waterproof structure 42.

Optionally, the top surface 3312 of the third connecting member 33 is located on the same side as the top surface 3312 of the third profile 23, and the top surface 3312 of the third connecting member 33 defines two spaced apart accommodating grooves 32, and a second division portion 3314 located between the two accommodating grooves 323. The second division portion 3314 and the resisting portion 3311 are of one-piece structure. The accommodating groove 323 is configured to receive the second waterproof structure 42. A bottom wall of each accommodating groove 323 includes a curved second clamping groove 231. Each second clamping groove 231 is configured to mate with the second clamping rib 422 of the second waterproof structure 42. The two second waterproof structures 42 are located on opposite sides of the second division portion 3314. This embodiment may also provide the curved second clamping groove 231 at the bottom wall of each of the accommodating grooves 323, utilizing the curved second clamping groove 231 to mate with the second clamping rib 422 of the second waterproof structure 42, thereby improving the connection effect between the second waterproof structure 42 and the third connecting member 33. Moreover, each of the accommodating grooves 323 defines a curved second clamping groove 231, the two curved second clamping grooves 231 define the two second waterproof structures 42 respectively. Each second waterproof structure 42 includes two second clamping ribs 422. One second clamping rib 422 is mated with the second clamping groove 231 of one accommodating groove 323, and the other second clamping rib 422 is then mated with the second clamping groove 231 of the adjacent component of the third profile 23, not only to seal out water, but also to connect the third profile 23 to the adjacent component.

Optionally, the sidewall of the accommodating groove 323 may also define a containing groove 324 for accommodating the end portion of the second waterproof structure 42. Optionally, the side surface of the third connecting member 33 may also include the drain tank 325 for guiding water between the accommodating groove 323 and the containing groove 324.

Optionally, the second bottom surface 3313, which is opposite to the top surface 3312 of the third connecting member 33, defines a second weight reducing groove 3316. The second bottom surface 3313 is configured to set a buffer member for resisting the tail box 201. The second weight reducing groove 3316 is provided with a supporting portion 3317 for supporting the buffer member, and the second supporting surface 3318 of the supporting portion 3317 is flush with the second bottom surface 3313.

Figure 43:
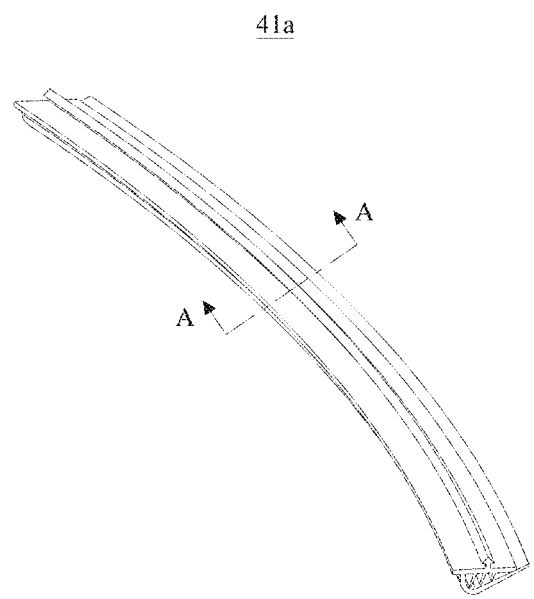
FIG. 43 illustrates a schematic structural view of a first waterproof member in FIG. 42.
Figure 44:
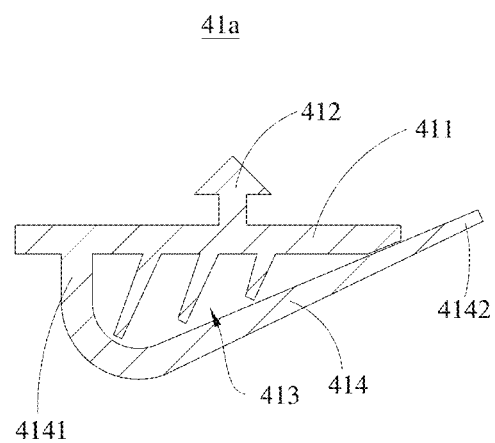
FIG. 44 illustrates a schematic structural view of the first waterproof member in FIG. 43 after being sectioned along line A-A.
Figure 45:
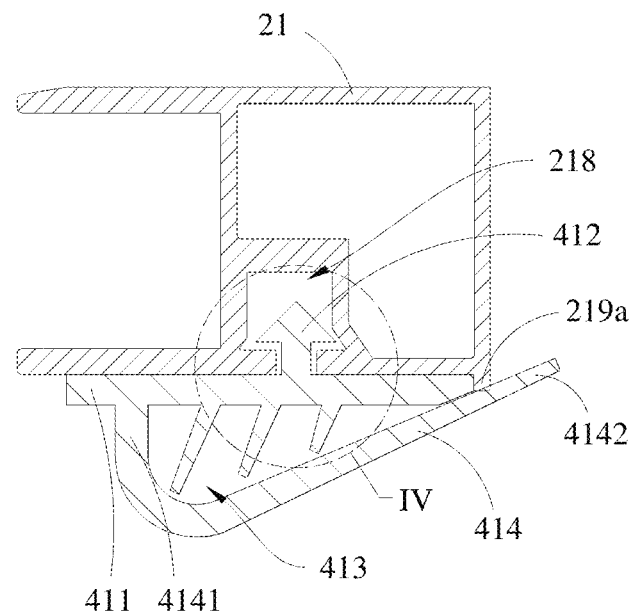
FIG. 45 illustrates a schematic structural view of the first waterproof member clamping the first profile close to the tail portion of the tail box.
Figure 46:
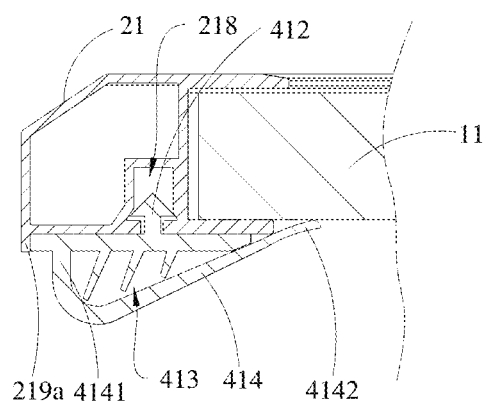
FIG. 46 illustrates a schematic structural view of the first waterproof member clamping the first profile of the driver's cab.
Figure 47:
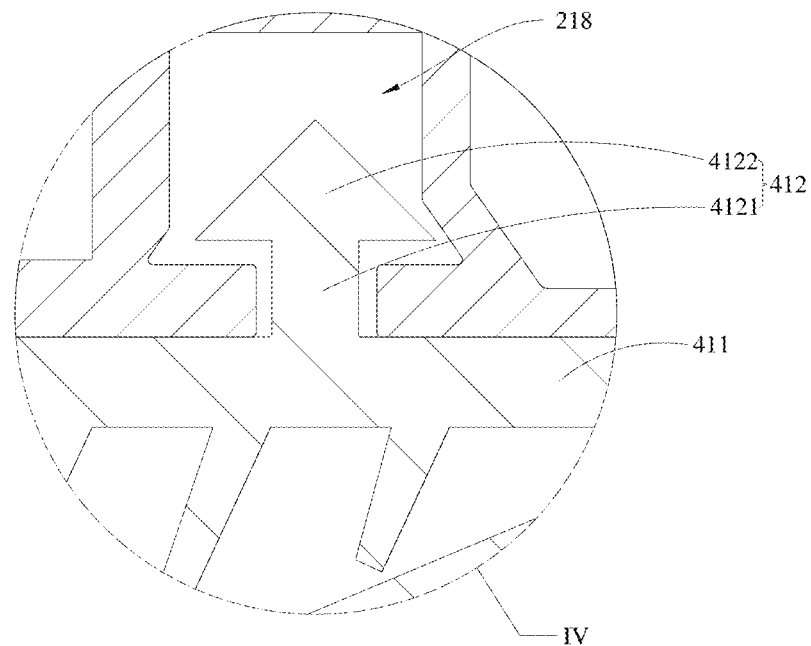
FIG. 47 illustrates a partially enlarged schematic view at IV in FIG. 45.
Figure 48:
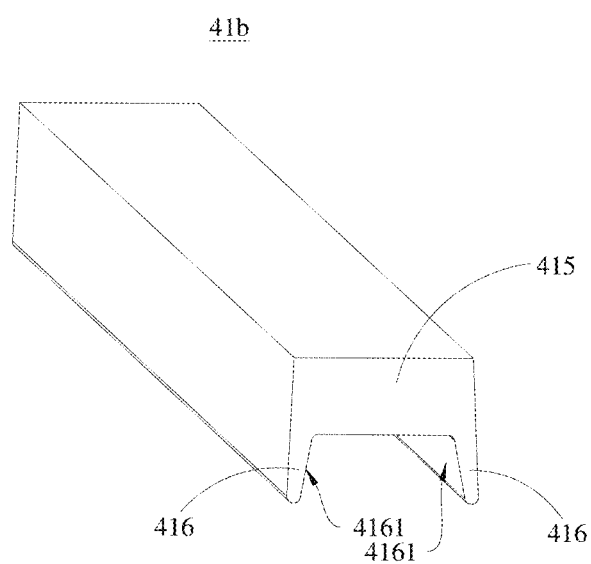
FIG. 48 illustrates a schematic structural view a second waterproof member in FIG. 42.
Figure 49:
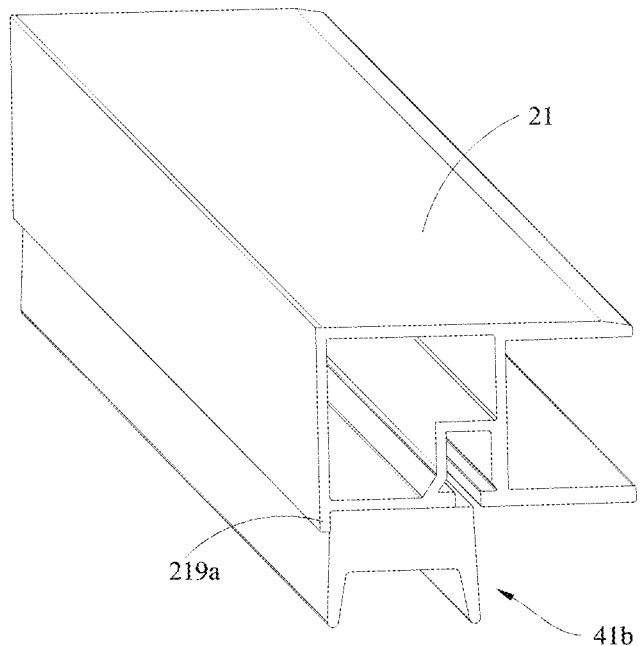
FIG. 49 illustrates a schematic structural view of the second waterproof member connecting the first profile.

Referring to FIGS. 42 to 49, FIG. 42 illustrates a schematic structural view of a first waterproof structure in FIG. 2; FIG. 43 illustrates a schematic structural view of a first waterproof member in FIG. 42; FIG. 44 illustrates a schematic structural view of the first waterproof member in FIG. 43 after being sectioned along line A-A; FIG. 45 illustrates a schematic structural view of the first waterproof member clamping the first profile close to the tail portion of the tail box; FIG. 46 illustrates a schematic structural view of the first waterproof member clamping the first profile of the driver's cab; FIG. 47 illustrates a partially enlarged schematic view at IV in FIG. 45; FIG. 48 illustrates a schematic structural view a second waterproof member in FIG. 42; FIG. 49 illustrates a schematic structural view of the second waterproof member connecting the first profile. In this embodiment, the waterproof assembly 4 includes a first waterproof structure 41. The first waterproof structure 41 includes a first waterproof member 41a. The first waterproof member 41a includes a first bearing portion 411, a first clamping rib 412, a first water retaining portion 413, and a first sealing portion 414. The first clamping rib 412 is protruded from one side of the first bearing portion 411 and configured to clamp into the first clamping groove 218 of the first profile 21 close to the driver's cab 202 of the mobile device 20, and the first clamping groove 218 of the first profile 21 close to the tail portion of the tail box 201. The first water retaining portion 413 protrudes from the opposite side of the first bearing portion 411. The first sealing portion 414 is bent in a direction away from the first bearing portion 411 so that the second end 4142 of the first sealing portion 414 is located on one side of the first water retaining portion 413 away from the first end 4141. The first sealing portion 414 is enclosed with the first bearing portion 411 to form a sealing space. The first water retaining portion 413 is received within the sealing space. In a direction of the first end 4141 pointing toward the first water retaining portion 413, the second end 4142 is protruded from the first bearing portion 411, and the second end 4142 of the first sealing portion 414 is capable of rotating relative to the first bearing portion 411.

In this embodiment, the first waterproof structure 41 includes a first waterproof member 41a. The first waterproof member 41a is configured to be mounted on the first profile 21 of the edge of the foldable cover plate 10 close to the tail portion of the tail box 201 of the mobile device 20, and/or, is configured to be mounted on the first profile 21 of the edge of the foldable cover plate 10 close to the driver's cab 202 of the tail box 201 of the mobile device 20, for scaling the edges of the foldable cover plate 10 on opposite sides in the lengthwise direction.

In this embodiment, the first waterproof member 41a includes a first bearing portion 411, a first clamping rib 412, a first water retaining portion 413, and a first sealing portion 414. The first clamping rib 412 is configured to clamp the first bearing portion 411 into the first clamping groove 218 of the first profile 21. The first end 4141 of the first sealing portion 414 is connected to the first bearing portion 411. The first sealing portion 414 is bent first in a direction away from the first bearing portion 411 and then in a direction proximity to the first bearing portion 411 so that the second end 4142 is located on one side of the first water retaining portion 413 away from the first end 4141. The first sealing portion 414 and the first bearing portion 411 cooperatively form a sealing space. The second end 4142 is capable of rotating relative to the first bearing portion 411 so as to open or close the sealing space. Since the second end 4142 is protruded from the first bearing portion 411 in a direction where the first end 4141 is pointing toward the first water retaining portion 413, to enable the second end 4142 is protruded from the edge of the first profile 21 in a direction where the first end 313 is pointing toward the first water retaining portion 413, such that when a portion of the first sealing portion 414 close to the second end 4142 abuts against the first bearing portion 411, the second end 4142 closes the sealing space, which in turn can better prevent external water from flowing into the tail box 201 of the mobile device 20 via the edge of the first profile 21. Even if there exists a partial infiltration of water from between the first profile 21 and the first scaling portion 414, the infiltrated water flows into the sealing space and is blocked by the first water retaining portion 413 to prevent the water from flowing into the tail box 201 of the mobile device 20, thereby preventing the water from flowing into the tail box 201 of the mobile device 20. Thereby, a multi-level waterproof effect is realized. Furthermore, since the second end 4142 is capable of rotating relative to the first bearing portion 411, when it is necessary to discharge the water in the sealing space, the sealing space can be opened from the second end 4142 to actively discharge the water, thereby facilitating drying and cleaning.

Optionally, one side of the first bearing portion 411 is configured to abut against the first sidewall 219a of the first profile 21, and the second end 4142 of the first sealing portion 414 is configured to cover the first sidewall 219a. Along the direction of the first end 4141 pointing toward the first water retaining portion 413, the second end 4142 protrudes from the first sidewall 219a, or, the second end 4142 of the first sealing portion 414 obscures a portion of the first water retaining portion 413 located on the first profile 21 of the first cover plate 1101, the second cover plate 1102 or the third cover plate 1103.

Optionally, the first clamping rib 412 includes a first main body 4121 and a first clamping block 4122. One end of the first main body 4121 is connected to the first bearing portion 411 and the first clamping block 4122 is connected to an opposite end of the first main body 4121. In a direction perpendicular to a direction of extension of the first clamping rib 412, a width of the first clamping block 4122 on a side close to the first main body 4121 is greater than a width of the first clamping block 4122 on a side away from the first main body 4121, so as to enable the first clamping block 4122 to be better clamped into the first clamping groove 218 of the first profile 21, thereby improving the stability of the connection between the first bearing portion 411 and the first profile 21, which is conducive to improving the waterproof effect.

Optionally, the first waterproof structure 41 includes two first waterproof members 41a. The two first waterproof members 41a are set facing each other. One first waterproof member 41a is clamped into the first clamping groove 218 of the first profile 21 close to the tail door 2011 of the tail box 201, and the second end 4142 abuts against the first sidewall 219a of the first profile 21 under the compression of the tail door 2011 of the tail box 201. The other first waterproof member 41a is clamped into the first clamping groove 218 of the first profile 21 close to the driver's cab 202 of the mobile device 20, and the first end 4141 abuts against the inner wall of the tail box 201 close to the driver's cab 202.

The two first waterproof members 41a being set facing each other means that the second ends 4142 of the two first waterproof members 41a are facing a same direction. Specifically, one first waterproof member 41a is mounted on the first profile 21 of the third cover plate 1103 close to the tail door 2011 of the mobile device 20, and one side of the first bearing portion 411 close to the second end 4142 abuts against the first sidewall 219a of the first profile 21, and the second end 4142 protrudes from the first sidewall 219a, and a portion of the first sealing portion 414 close to the second end 4142 is squeezed by the tail door 2011 of the mobile device 20 such that the second end 4142 closes the sealing space, thereby providing a waterproof effect. Another first waterproof member 41a is mounted on the first profile 21 of the third cover plate 1103 close to the driver's cab 202 of the mobile device 20, and one side of the first bearing portion 411 close to the first end 4141 abuts against the first sidewall 219a of the first profile 21, the second end 4142 protrudes from the another end of the first profile 21 opposite to the first sidewall 219a and rests on the third cover plate 1103 to cover a portion of the third cover plate 1103, a portion of the first sealing portion 414 close to the first end 4141 abuts against the inner wall of the tail box 201 of the mobile device 20 close to the driver's cab 202 to squeeze a portion of the first sealing portion 414 close to the first end 4141 and the squeezing force is conducted from a portion of the first sealing portion 414 close to the first end 4141 to second end 4142, to close the sealing space, thereby providing a waterproof effect.

In this embodiment, the first waterproof structure 41 further includes a second waterproof member 41b. The second waterproof member 41b includes a second bearing portion 415 and two convex strip 416 protruded from a side of the second bearing portion 415 and spaced apart from each other. One side of the second bearing portion 415 away from the convex strip 416 is configured to connect to the first profile 21. The two convex strips 416 are configured to press-fit to the tail box 201. An extension direction of the second waterproof member 41b intersects an extension direction of the first waterproof member 41a. The convex strip 416 is resilient. Each convex strip 416 has an inclined surface 416 facing the other convex strip 416. The two inclined surfaces 4161 are inclined in opposite directions, to cause the convex strip 416 to bend and deform in a direction away from the other convex strip 416 under an external force.

In this embodiment, a surface of the second bearing portion 415 away from the convex strip 416 is configured to fix the first profile 21 by bonding. The first profile 21 to which the second waterproof member 41b is connected and the first profile 21 to which the first waterproof member 41a are located on two adjacent sides of the foldable cover plate 10, so that the extension direction of the second waterproof member 41b intersects with the extension direction of the first waterproof member 41a, specifically the second waterproof member 41b is configured to mount the first profile 21 on the side of the foldable cover plate 10.

The convex strip 416 is resilient and each convex strip 416 has an inclined surface 4161 facing the other convex strip 416, and the two inclined surfaces 4161 are inclined in opposite directions, such that when the foldable cover plate 10 is mounted on the tail box 201, the convex strip 416 is compressed to the tail box 201 under the gravity of the foldable cover plate 10 and the first profile 21, thereby causing the convex strip 416 to bend and deform in a direction away from the other convex strip 416, thereby sealing the two convex strips 416 and further improving the fitting effect between the second waterproof member 41b and the tail box 201, so as to improve the waterproofing effect.

Optionally, the first waterproof structure 41 includes a first buffer block 417 connecting the first waterproof member 41a to the second waterproof member 41b and a second buffer block 418 located at one end of second waterproof member 41b that departs from first buffer block 417.

Figure 51:
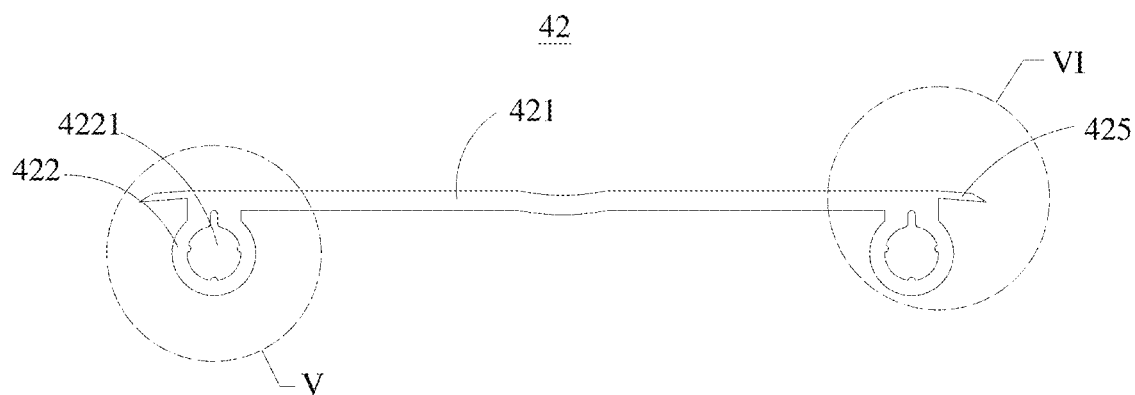
FIG. 51 illustrates a schematic structural view of an end face of the second waterproof structure in FIG. 50.
Figure 52:
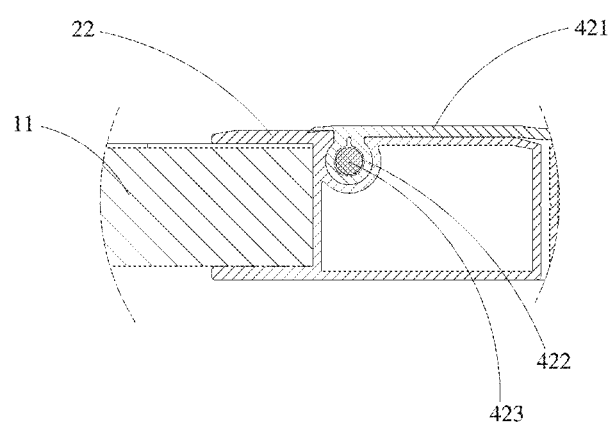
FIG. 52 illustrates a schematic structural view of the second waterproof structure clamping the second clamping groove in FIG. 50.
Figure 53:
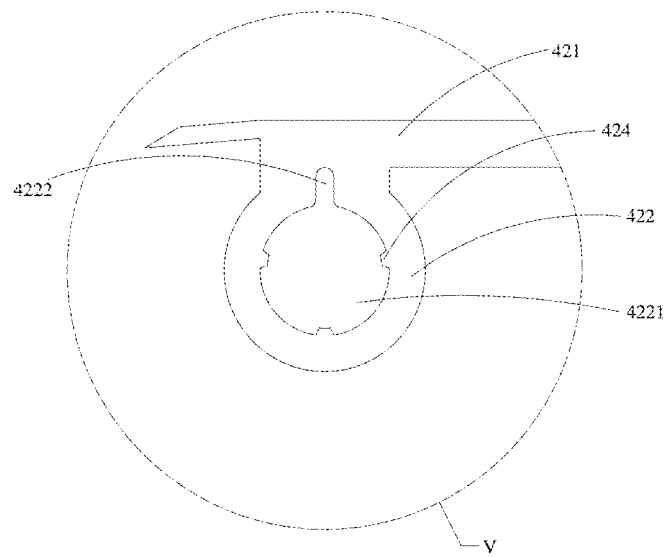
FIG. 53 illustrates a partially enlarged schematic view at V in FIG. 51.
Figure 54:
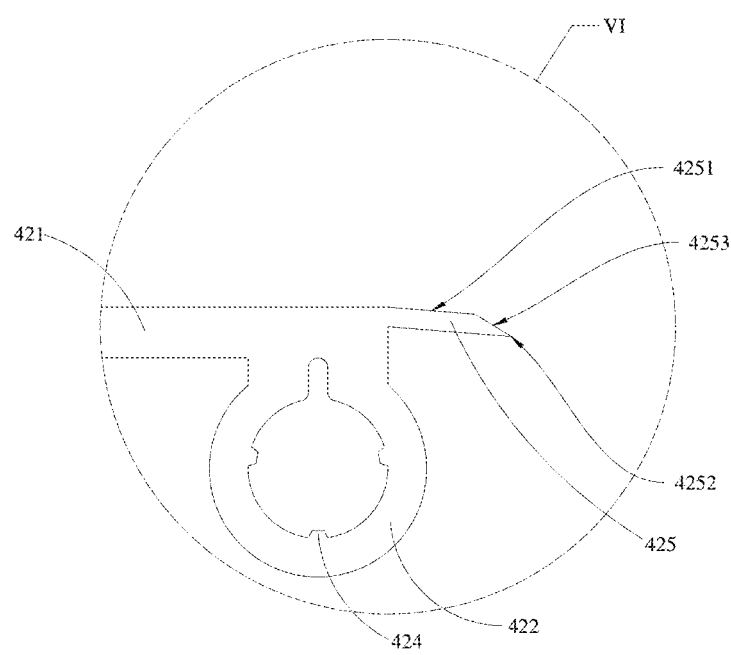
FIG. 54 illustrates a partially enlarged schematic view at VI in FIG. 51.

Referring to FIG. 29, FIG. 36, and FIG. 50 to FIG. 54, FIG. 50 illustrates a schematic structural view of the second waterproof structure in FIG. 2; FIG. 51 illustrates a schematic structural view of an end face of the second waterproof structure in FIG. 50; FIG. 52 illustrates a schematic structural view of the second waterproof structure clamping the second clamping groove in FIG. 50; FIG. 53 illustrates a partially enlarged schematic view at V in FIG. 51; FIG. 54 illustrates a partially enlarged schematic view at VI in FIG. 51. In this embodiment, the top surface of the second profile 22 defines a second clamping groove 231. The waterproof assembly 4 includes a plurality of second waterproof structures 42. The second waterproof structures 42 includes a sealing plate 421 and two second clamping ribs 422 located on one side of the second clamping plate 421. One of the second clamping rib 422 in the partial second waterproof structure 42 is clamped into one second clamping groove 231, and the other second clamping rib 422 is clamped into another second clamping groove 231 provided at intervals, to block a gap between the two second profiles 22 that are rotationally connected, or to block a gap between the second profile 22 and the third profile 23 that are rotationally connected. Along the extension direction of the second clamping rib 422, the second clamping rib 422 defines a first fixed hole 4221. The resisting portion 3311 rests against the top surface of the sealing plate 421, the second connecting member 32 and the third connecting member 33 each defines a locking hole 326 interconnected to the first fixed hole 4221. The locking hole 326 and the first fixed hole 4221 are configured to insert the fixed member 423 to fix the second waterproof structure 42.

In this embodiment, the second waterproof structure 42 is clamped into the two adjacent spaced-apart second clamping grooves 231 by the two second clamping ribs 422, respectively, to enable the sealing plate 421 to cover the gap between the two spaced-apart second cover plate 1102 and third cover plate 1103. Specifically, the two second clamping ribs 422 of the second waterproof structure 42 are spaced apart on a same surface of the sealing plate 421. One second clamping rib 422 is clamped into one second clamping groove 231 and the other second clamping rib 422 is clamped into another second clamping groove 231 spaced apart and adjacent to the second clamping groove 231, such that the sealing plate 421 is enabled to cover the gap between the two spaced-apart second cover plate 1102 and third cover plate 1103, thereby providing waterproofing. In addition, during a relative rotation of the two adjacent second cover plate 1102 and third cover plate 1103, the sealing plate 421 is able to bend and deform to follow the rotation of the two adjacent second cover plate 1102 and third cover plate 1103, and the two second clamping ribs 422 always remain clamped into the two second clamping groove 231 respectively, thereby enabling the sealing plate 421 to always cover the gap between the second cover plate 1102 and third cover plate 1103, and further making the second waterproof structure 42 good at waterproofing.

Furthermore, the second clamping rib 422 defines a first fixed hole 4221, and the first fixed hole 4221 is configured to insert the fixed member 423, so as to improve a connection stability of the second clamping rib 422 with the second clamping groove 231, thereby improving a connection stability of the second waterproof structure 42 with the two adjacent second profiles 22 or a connection stability of the second profile 22 with the third profile 23 adjacent to the second profile 22, thereby further improving the waterproofing effect of the second waterproof structure 42.

In addition, along a direction perpendicular to the extension direction of the second clamping rib 422, the second clamping rib 422 can be pressed into the second clamping groove 231, and the fixed member 423 can be inserted into the first fixed hole 4221 from the extension direction of the second clamping rib 422 to fix the second waterproof structure 42. In other words, the sealing plate 421 is pressed such that the second clamping rib 422 is clamped into the second clamping groove 231. After the second clamping rib 422 is clamped into the second clamping groove 231, a surface of the sealing plate 421 facing towards the second profile 22 or the third profile 231 is capable of being affixed to the second profile 22 or the third profile 23. Furthermore, the second profile 22 and third profile 23 both define a locking hole 326 interconnected to the first fixed hole 4221, the fixed member 423 passes through the locking hole 326 and is inserted into the first fixed hole 4221, so as to further fix the second waterproof structure 42 to the second profile 22 or the third profile 23, improving the stability of the waterproofing.

Optionally, the inner wall of the first fixed hole 4221 includes at least one convex rib 424, at least one of the convex rib 424 and the second clamping rib 422 is resilient, the second clamping rib 422 is configured to clamp the fixed member 423.

Optionally, the second clamping rib 422 is resilient and the second clamping rib 422 defines a groove 4222, the opening of the groove 4222 is configured to increase in size after the fixed member 423 is inserted into the first fixed hole 4221. In this embodiment, after the fixed member 423 is inserted into the first fixed hole 4221, the second clamping rib 422 will expand and deform under the squeezing of the fixed member 423, due to the groove 4222, the resistance of the deformation of the second clamping rib 422 is smaller, thereby reducing the resistance of the insertion of the fixed member 423 into the first fixed hole 4221.

Optionally, at least a portion of the fitting portion 425 becomes progressively smaller in a direction away from the sealing plate 421, to allow the fitting portion 425 to be deformed toward the second profile 22 or the third profile 23 after the second clamping rib 422 is clamped into the second clamping groove 231, thereby allowing the fitting portion 425 to fit more tightly with the second profile 22 or the third profile 23, and thereby improving the waterproofing effect of the second waterproof structure 42 at the second profile 22 or the third profile 23.

Furthermore, the thickness of the fitting portion 425 is less than that of the sealing plate 421. The fitting portion 425 includes a top surface 4251, a bottom surface 4252 opposite to the top surface 4251, and a first side surface 4253 connecting the top surface 4251 with the bottom surface 4252. The top surface 4251 and the bottom surface 4252 are disposed inclined towards the second clamping rib 422 compared to the sealing plate 421. The thickness of the fitting portion 425 is less than that of the second clamping groove 421, which facilitates that: after clamping rib 422 is clamped into the second clamping groove 231, the fitting portion 425 is fitted to the second profile 22 or the third profile 23, which causes the fitting portion 425 to deform that departs from the second profile 22 or the third profile 23, so as to improve the fit of the fitting portion 425 to the second profile 22 or the third profile 23. The top surface 4251 and the bottom surface 4252 are disposed inclined towards the clamping rib 422 compared to the sealing plate 421, and the first side surface 4253 is disposed inclined towards the sealing plate 421 compared to the bottom surface 4252, thereby increasing the amount of deformation of the fitting portion 425 that departs from the second profile 22 or the third profile 23 resulting from the fitting portion 425 being attached to the second profile 22 or the third profile 23 after the clamping rib 422 is clamped into the second clamping groove 231, thereby further improving the fit of the fitting portion 425 to the second profile 22 or third profile 23 for better waterproofing.

Figure 55:
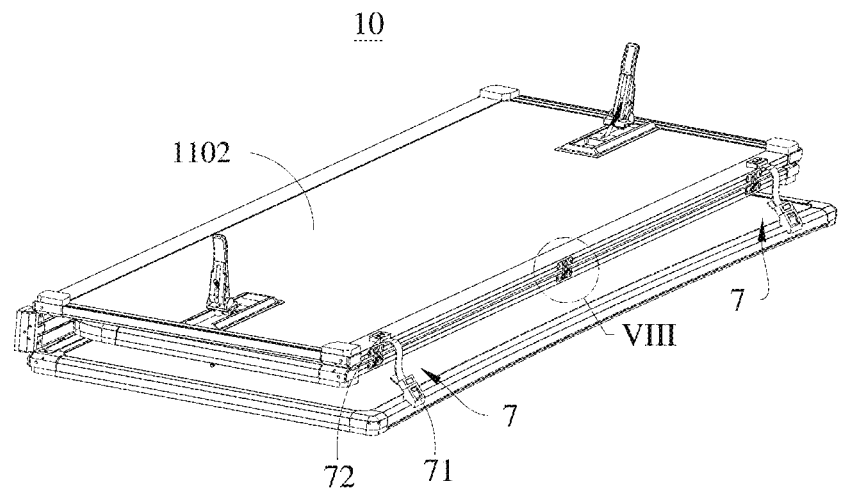
FIG. 55 illustrates a schematic view of the foldable cover plate in FIG. 5 from another view.
Figure 56:
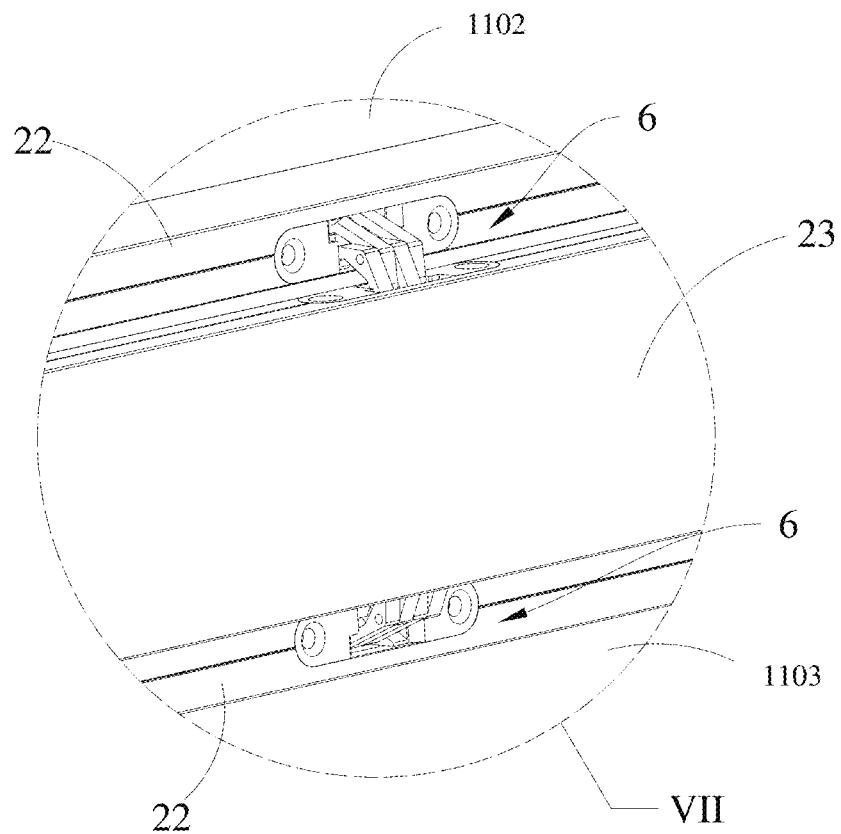
FIG. 56 illustrates a partially enlarged schematic view at VII in FIG. 5.
Figure 57:
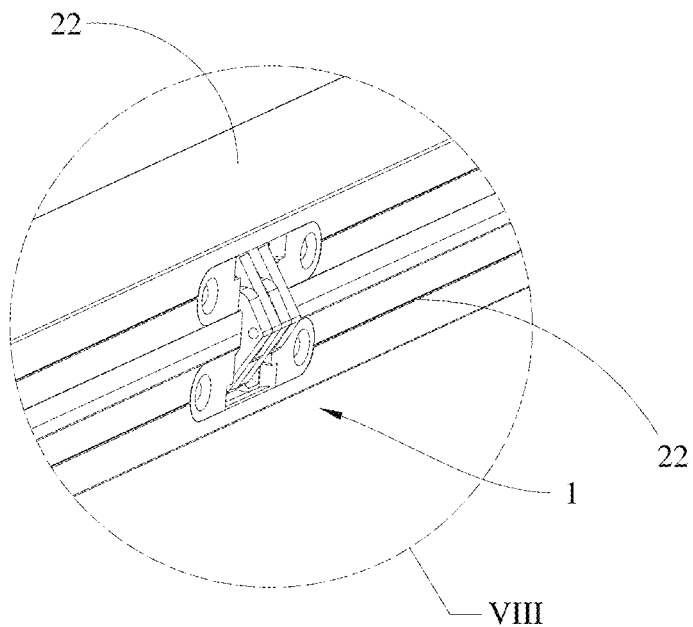
FIG. 57 illustrates a partially enlarged schematic view at VIII in FIG. 55.
Figure 58:
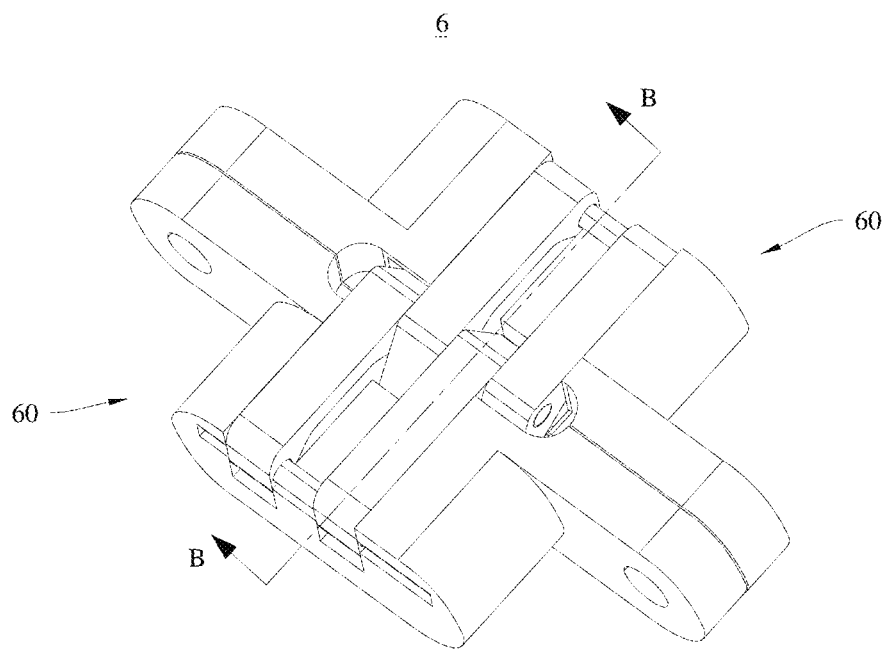
FIG. 58 illustrates a schematic structural view of a rotating structure in FIG. 2.
Figure 59:
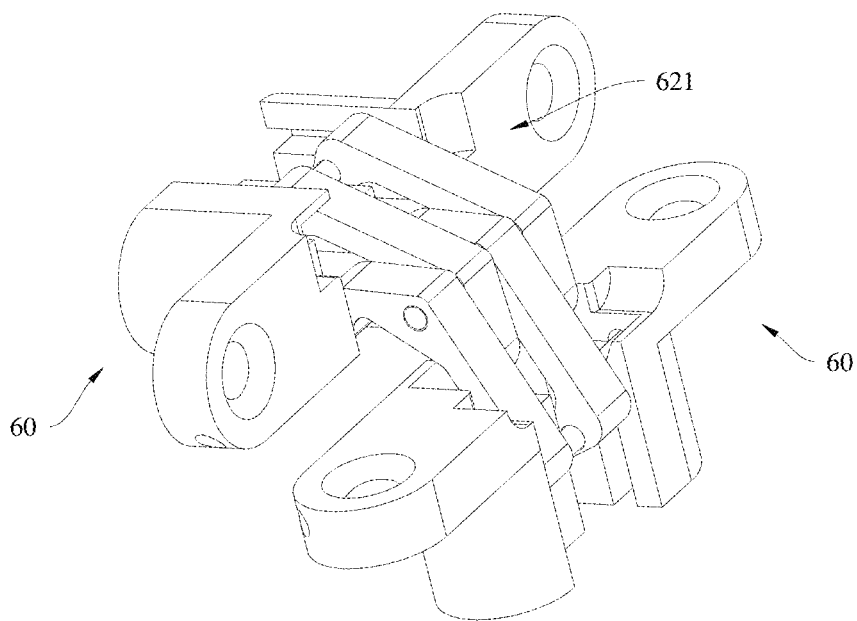
FIG. 59 illustrates a schematic structural view of the rotating structure in FIG. 5.
Figure 60:
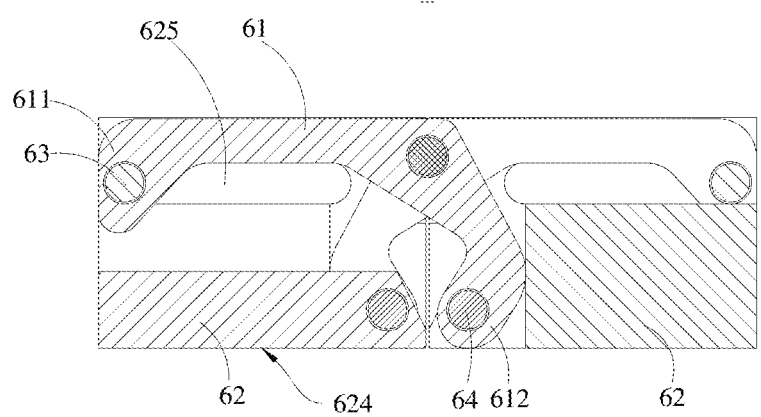
FIG. 60 illustrates a schematic structural view of the rotating structure in FIG. 58 after being sectioned along line B-B.
Figure 61:
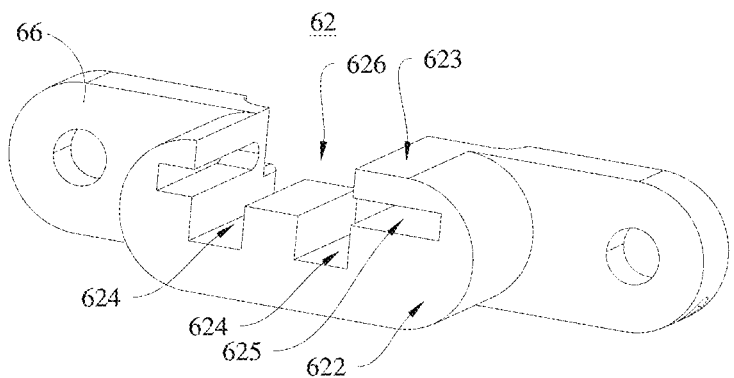
FIG. 61 illustrates a schematic structural view of a rotating seat in FIG. 58.
Figure 62:
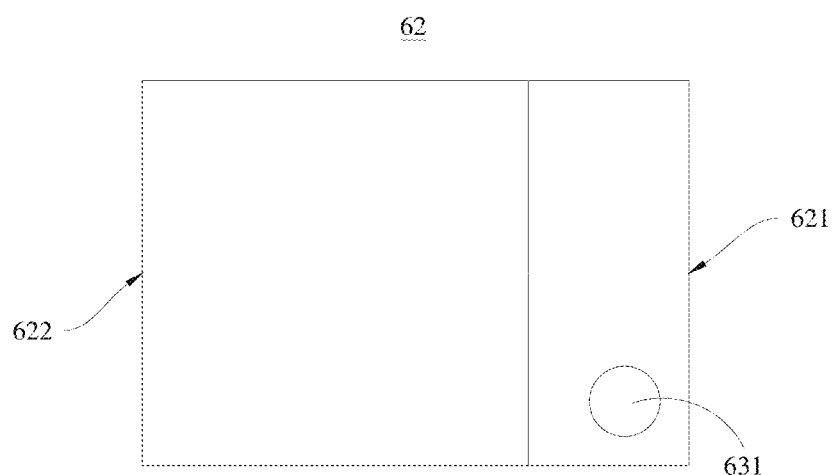
FIG. 62 illustrates a schematic structural view of the rotating structure in FIG. 58 from another view.
Figure 63:
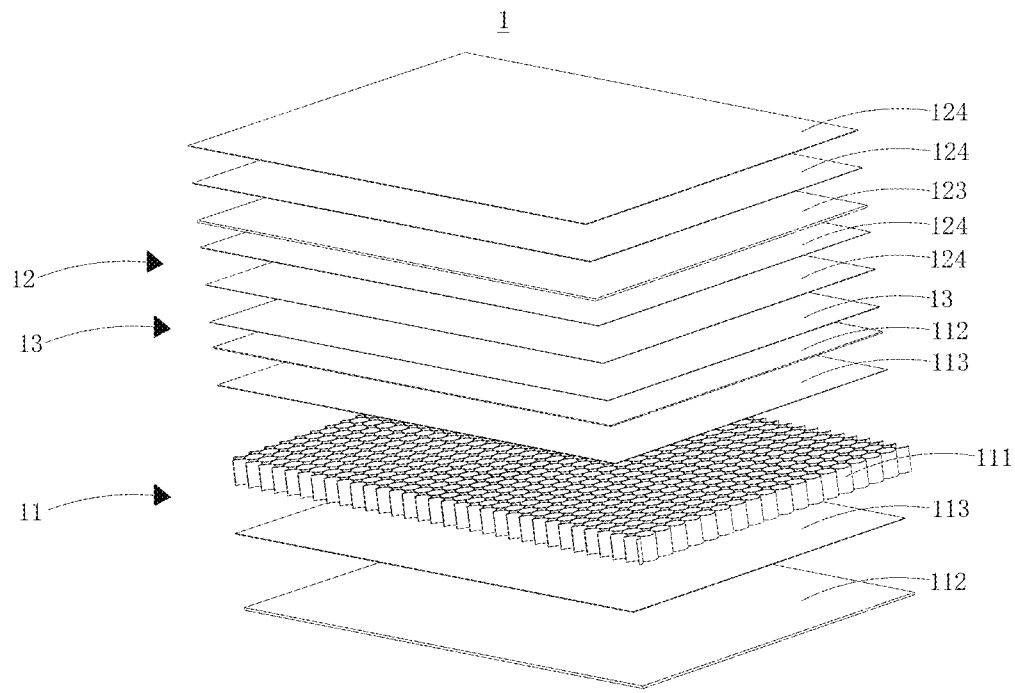
FIG. 63 illustrates an exploded view of a cover plate assembly in FIG. 2.

Referring to FIGS. 5, and 55 to 62, FIG. 55 illustrates a schematic view of the foldable cover plate in FIG. 5 from another view; FIG. 56 illustrates a partially enlarged schematic view at VII in FIG. 5; FIG. 57 illustrates a partially enlarged schematic view at VIII in FIG. 55; FIG. 58 illustrates a schematic structural view of a rotating structure in FIG. 2; FIG. 59 illustrates a schematic structural view of the rotating structure in FIG. 5; FIG. 60 illustrates a schematic structural view of the rotating structure in FIG. 58 after being sectioned along line B-B; FIG. 61 illustrates a schematic structural view of a rotating seat in FIG. 58; FIG. 62 illustrates a schematic structural view of the rotating structure in FIG. 58 from another view. In this embodiment, the foldable cover plate 10 further includes a rotating mechanism 6, and the rotating mechanism 6 includes two rotating assemblies 60 rotationally connected. The rotating assembly 60 includes at least two rotating arms 61, a rotating seat 62, a first rotating shaft 63 and a second rotating shaft 64. The rotating arm 61 includes a third end 611 and a fourth end 612 opposite to the third end 611. The rotating seat 62 includes a first face 621, a second face 622 opposite to the first face 621, and a third face 623 connecting the first face 621 to the second face 622. The first face 621 of one rotating assembly 60 faces the other rotating assembly 60. The rotating seat 62 defines at least two second limiting holes 624 penetrating through the first face 621, the second face 622 and the third face 623. Each of at least two second limiting holes 624 is configured to receive the third end 611 of one rotating arm 61. The second face 622 defines a sliding groove 625 interconnected with the second limiting hole 624. The first rotating shaft 63 penetrates through the third end 611 and is slidably mounted in the sliding groove 625. The second rotating shaft 64 of one rotating assembly 60 is rotationally coupled to the rotating seat 62 and penetrates through the fourth end 612 of the other rotating assembly 60, to rotationally couple the rotating arm 61 of the other rotating assembly 60 to the rotating seat 62 of the one rotating assembly 60. The rotating mechanism 6 located between the first cover plate 1101 which is located close to the tail portion of the tail box 201 and the second cover plate 1102 which is located in the center of the tail box 201 is connected to the two second profiles 22 by the two rotating seats 62. The rotating mechanism 6 located between the third cover plate 1103 which is located close to the driver's cab 202 and the second cover plate 1102 located which is located in the center of the tail box 201 is connected to the second profile 22 and the third profile 23 respectively through the two rotating seats 62.

In this embodiment, the first rotating shaft 63 penetrates through the third end 611 and is slidably mounted within the sliding groove 625, to enable one rotating assembly 60, via the rotating arm 61 to drive the first rotating shaft 63 to move relative to the rotating seat 62 in the sliding groove 625, to rotate relative to the other rotating assembly 60. Since the first rotating shaft 63 is able to move within the sliding groove 625, in a case that the length of the rotating arm 61 is constant, the degree of freedom of rotation of one rotating assembly 60 relative to the other rotating assembly 60 is increased, which is conducive to increasing the structural compactness of the rotating mechanism 6, thereby increasing the structural strength of the rotating mechanism 6 and decreasing the size of the rotating mechanism 6.

In addition, in one rotating assembly 60, the second rotating shaft 64 is rotationally connected within the rotating seat 62 and penetrates through the fourth end 612 of the other rotating assembly 60, such that the rotating arm 61 of the other rotating assembly 60 is rotationally connected to the rotating seat 62 of the one rotating assembly 60, that is, the rotating arm 61 of one rotating assembly 60 is lapped to the rotating seat 62 of the other rotating assembly 60, and the rotating seat 62 of one rotating assembly 60 is lapped to the rotating arm 61 of the other rotating assembly 60. The rotating assembly 60 is rotationally connected to the rotating seat 62 of the other rotating assembly 60 through the second rotating shaft 64 of the other rotating assembly 60. The other rotating assembly 60 is rotationally connected to the rotating seat 62 of the one rotating assembly 60 through the second rotating shaft 64 of the one rotating assembly 60. During rotation of one rotating assembly 60 relative to the other rotating assembly 60, one rotating assembly 60 is capable of rotating, with its third end 611 and the fourth end 612 in the other rotating assembly 60 as a rotational pivot point, relative to the other rotating assembly 60, thereby improving the stability of the two rotating assemblies 60 during their relative rotation.

In this embodiment, when the two adjacent first cover plate 1101 and the second cover plate 1102 are rotationally connected by the second profile 22, one rotating assembly 60 in the rotating mechanism 6 is mounted on one second profile 22, and the other rotating assembly 60 is mounted on an adjacent second profile 22, such that the two adjacent first cover plate 1101 and the second cover plate 1102 can rotate through the rotating mechanism 6, thereby achieving the first cover plate 1101 to rotationally fold onto the second cover plate 1102 to expose the opening. When the third profile 23 is located between the two adjacent second profiles 22, each second profile 22 is connected to the third profile 23 by the rotating mechanism 6 to enable the second cover plate 1102 to rotate relative to the third profile 23, and further drive the third profile 23 to rotate relative to the third cover plate 1103, such that the second cover plate 1102 is capable of driving the third profile 23 to lap onto the third cover plate 1103. Since the third profile 23 is able to provide a gap for the second cover plate 1102 and the third cover plate 1103 to accommodate the first cover plate 1101 after the second cover plate 1102 and the third cover plate 1103 are set in a laminated fashion, this enables the foldable cover plate 10 to be folded twice.

Figure 64:
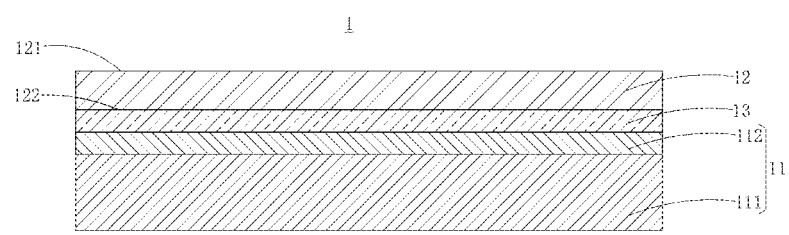
FIG. 64 illustrates a cross-sectional view of the cover plate assembly in FIG. 2.
Figure 65:
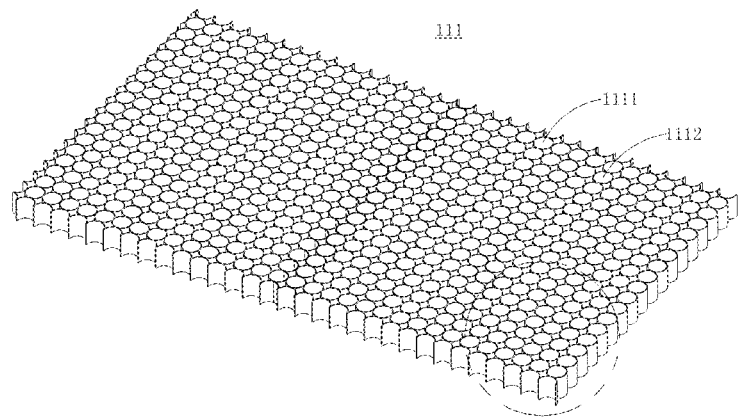
FIG. 65 illustrates a schematic structural view of a supporting layer in FIG. 63.
Figure 66:
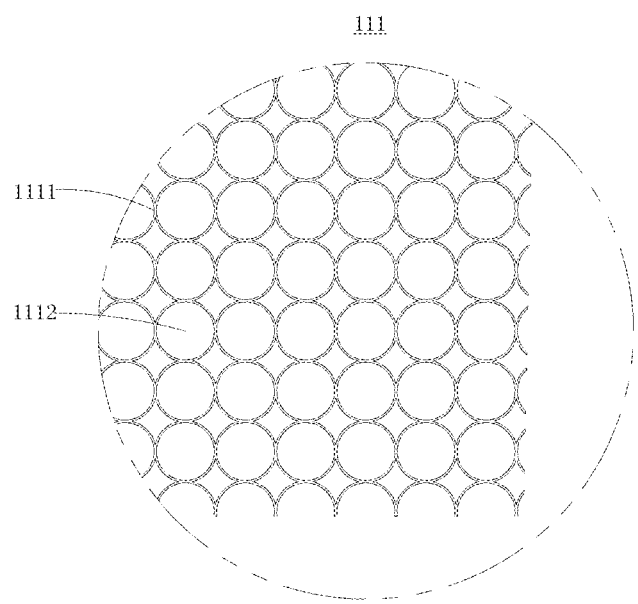
FIG. 66 illustrates a partial top view of FIG. 65.
Figure 67:
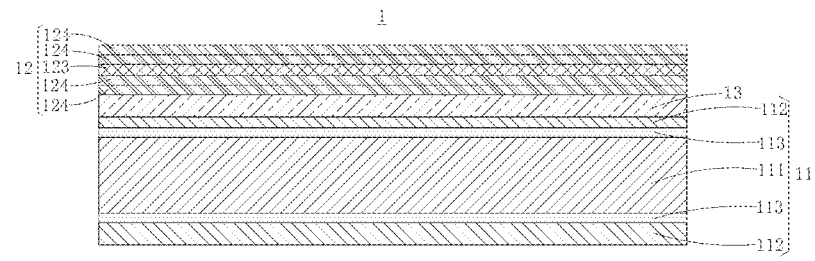
FIG. 67 illustrates a cross-sectional view of the cover plate assembly of FIG. 2 in accordance with another embodiment.
Figure 68:
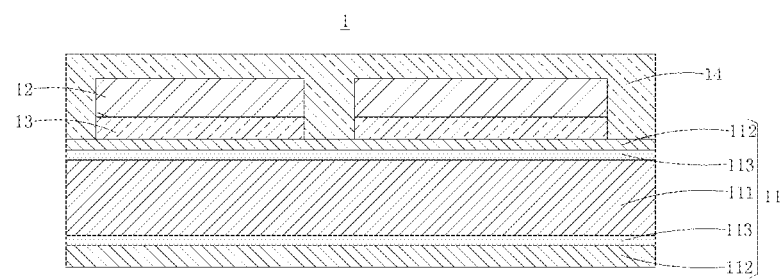
FIG. 68 illustrates a cross-sectional view of the cover plate assembly of FIG. 2 in accordance with yet another embodiment.
Figure 69:
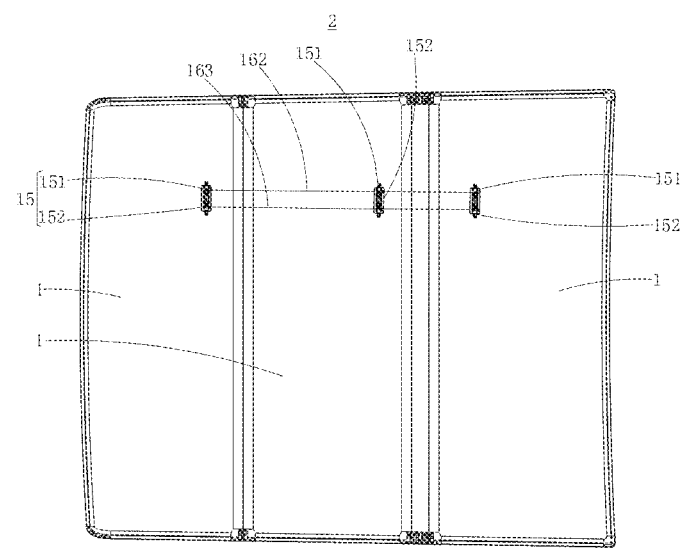
FIG. 69 illustrates a cross-sectional view of the foldable cover plate in FIG. 2 in accordance with yet another embodiment from another view.

Referring to FIGS. 1 and 63 to 69, FIG. 63 illustrates an exploded view of a cover plate assembly in FIG. 2; FIG. 64 illustrates a cross-sectional view of the cover plate assembly in FIG. 2; FIG. 65 illustrates a schematic structural view of a supporting layer in FIG. 63; FIG. 66 illustrates a partial top view of FIG. 65; FIG. 67 illustrates a cross-sectional view of the cover plate assembly of FIG. 2 in accordance with another embodiment; FIG. 68 illustrates a cross-sectional view of the cover plate assembly of FIG. 2 in accordance with yet another embodiment; FIG. 69 illustrates a cross-sectional view of the foldable cover plate in FIG. 2 in accordance with yet another embodiment from another view. In this embodiment, the cover plate assembly 1 further includes: a photovoltaic panel 12 and a bonding layer 13. The photovoltaic panel 12 includes a light absorbing surface 121 and a backlight surface 122 opposite to the light absorbing surface 121. The bonding layer 13 is bonded to the backlight surface 122. The cover plate 11 is bonded to one side of the bonding layer 13 away from the photovoltaic panel 12. The cover plate 11 includes a supporting layer 111 and a reinforcing layer 112. The reinforcing layer 112 is located on at least one side of the supporting layer 111. The supporting layer 111 includes plastic supporting layer 111 or aluminum alloy supporting layer 111.

The cover plate assembly 1 mainly includes the photovoltaic panel 12, the bonding layer 13 and the cover plate 11. The bonding layer 13 is bonded between the photovoltaic panel 12 and the cover plate 11. Optionally, the bonding layer 13 includes, but is not limited to, a polyethylene terephthalate (PET) adhesive, an epoxy resin adhesive, a ketoprofen (KPF) liposomal gel, and the like. Furthermore, optionally, the bonding layer 13 may be selected from the KPF adhesive, so as to further improve the flatness of the surface of the bonding layer 13, so as to better bond together with the cover plate 11, and improve the bonding performance.

The cover plate 11 is mainly configured to support the photovoltaic panel 12, which plays a role of supporting and fixing the photovoltaic panel 12. The photovoltaic panel 12 can also be called a solar panel, which is mainly configured for absorbing natural light, unnatural light, and other light, and converting the light energy into electric energy for power supply to other power consumption devices. Therefore, the photovoltaic panel 12 includes the light absorbing surface 121 that absorbs light, and the backlight surface 122 that is opposite to the light absorbing surface 121. The above can also be understood as one side of the bonding layer 13 is bonded to the backlight surface 122, and the other side of the bonding layer 13 is bonded to the cover plate 11. Compared to the conventional cover plate 11, the present embodiment integrates the photovoltaic panel 12 on the cover plate 11, which enables covering the opening of the tail box 201 while at the same time utilizing the photovoltaic panel 12 in the cover plate assembly 1 to convert the light energy into electrical energy, thereby providing electrical energy to the power consumption device.

The cover plate 11 mainly includes the supporting layer 111 and the reinforcement layer 112. The supporting layer 111 is mainly configured to support the photovoltaic panel 12. The material of the supporting layer 111 is mainly plastic or aluminum alloy, and optionally the material of the plastic includes but is not limited to polyethylene (PP). Under the same size and volume, the application uses the plastic supporting layer 111 or aluminum alloy supporting layer to reduce the weight of the cover plate 11, to realize the lightweight of the product, to reduce the manufacturing, installation and transportation costs, and not heat absorption, and good insulation effect. And supporting layer 111 made of polypropylene is corrosion-resistant, has a long service life, and can be recycled and reused without causing pollution to the environment.

In addition, the reinforcement layer 112 serves as a reinforcement, and the reinforcement layer 112 in conjunction with the supporting layer improves the structural strength of the cover plate 11 so as to well support the cover plate 11.

Furthermore, optionally, the material of the reinforcement layer 112 includes, but is not limited to, fiberglass reinforced plastic (FRP), glass fiber reinforced unsaturated polyester for fiberglass reinforcement, epoxy and phenolic resin matrices, reinforced plastics with glass fibers or their products as reinforcing materials, which is s fiberglass reinforced plastic, or FRP. The reinforcement layer 112 with fiberglass reinforced plastic material combined with the photovoltaic panel 12 can provide high impact and compression resistance, as well as excellent thermal insulation.

The supporting layer 111 is not a solid layer structure, but is a supporting structure formed by interconnecting and splicing a plurality of annular supporting portions 1111. Each annular supporting portion 1111 defines a third through hole 1112 penetrating along a direction from the light absorbing surface 121 to the backlight surface 122, at which time the supporting layer 111 can be called a PP honeycomb core. As can be seen, the weight of the supporting layer 111 and the cover plate 11 can be further reduced by using the annular supporting portion 1111 to support the photovoltaic panel 12.

In addition, the aperture of the third through hole 1112 may be 5 mm to 15 mm. If the aperture of the third through hole 1112 is less than 5 mm, the supporting layer 111 will have a larger mass, which will not be able to satisfy the requirement of light weight of the cover plate assembly 1. If the aperture of the third through hole 1112 is larger than 15 mm, the aperture is too large, which reduces the structural strength of the supporting layer 111 and fails to meet the requirements for supporting the photovoltaic panel 12. Optionally, the hole diameter of the third through hole 1112 may be 5 mm, 6 mm, 7 mm, 8 mm, 9 mm, 10 mm, 11 mm, 12 mm, 13 mm, 14 mm, 15 mm.

The cover plate 11 further includes a heat insulation layer 113 located between the supporting layer 111 and the reinforcement layer 112. The addition of the heat insulation layer 113 between the supporting layer 111 and the reinforcing layer 112 further improves the heat insulation properties of the cover plate 11 and makes it less prone to absorbing heat. The heat insulation layer 113 is made of materials including, but not limited to, polyethylene terephthalate (PET). Furthermore, optionally, the heat insulation layer 113 includes, but is not limited to, a non-woven fabric. Optionally, the number of the heat insulation layer 113 may also be one or two.

Optionally, the thickness of the reinforcement layer 112 close to the photovoltaic panel 12 is 0.1 mm-0.5 mm, and the thickness of the reinforcement layer 112 away from the photovoltaic panel 12 is 0.5 mm-1.5 mm. Furthermore, optionally, the thickness of the reinforcement layer 112 close to the photovoltaic panel 12 is 0.1 mm, 0.2 mm, 0.3 mm, 0.4 mm, 0.5 mm. The thickness of the reinforcement layer 112 away from the photovoltaic panel 12 is 0.5 mm, 0.6 mm, 0.7 mm, 0.8 mm, 0.9 mm, 1.0 mm, 1.1 mm, 1.2 mm, 1.3 mm, 1.4 mm, 1.5 mm.

In this embodiment, the thickness of the supporting layer 111 is 7 mm-15 mm. Optionally, the thickness of the supporting layer 111 is 7 mm, 8 mm, 9 mm, 10 mm, 11 mm, 12 mm, 13 mm, 14 mm, 15 mm.

In this embodiment, the thickness of the heat insulation layer 113 is 0.05 mm-0.15 mm. Optionally, the thickness of the heat insulation layer 113 is 0.05 mm, 0.06 mm, 0.07 mm, 0.08 mm, 0.09 mm, 0.1 mm, 0.11 mm, 0.12 mm, 0.13 mm, 0.13 mm, 0.14 mm, 15 mm. mm, 0.13 mm, 0.14 mm, 0.15 mm.

In this embodiment, the total thickness of the cover plate 11 is 7.7 mm-17.15 mm, Specifically, the total thickness of the cover plate 11 is the sum of the thicknesses of each of the above layers. By controlling the thicknesses of different layers, the total thickness of the cover plate 11 can be controlled. Optionally, the total thickness of the cover plate 11 is 7.7 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 16.5 mm, 17 mm, 17.15 mm.

In this embodiment, the thickness of the photovoltaic panel 12 is 2 mm-2.5 mm. Optionally, the thickness of the photovoltaic panel 12 is 2 mm, 2.1 mm, 2.2 mm, 2.3 mm, 2.4 mm, 2.5 mm.

Optionally, the photovoltaic panel 12 includes a battery sheet 123 and four layers of hot melt adhesive layer 124 (EVA) located on opposite sides of the battery sheet 123. The hot melt adhesive layer 124 can protect the center of the battery sheet 123. Two layers of the hot melt adhesive layer 124 are located on one side of the battery sheet 123 away from the cover plate 11, and another two layers of the hot melt adhesive layer 124 are located on one side of the battery sheet 123 close to the cover plate 11. As for the specific structure of the photovoltaic panel 12, the present embodiment is not limited herein.

In this embodiment, the thickness of the cover plate assembly 1 is 10 mm-20 mm. Optionally, the thickness of the cover plate assembly 1 is 10 mm, 11 mm, 12 mm, 13 mm, 14 mm, 15 mm, 16 mm, 17 mm, 18 mm, 19 mm, 20 mm.

Optionally, the number of the photovoltaic panels 12 is multiple. Multiple photovoltaic panels 12 are bonded to the cover plate 11 by bonding layers 13 in an array. The cover plate assembly 1 further includes a flat layer 14. The flat layer 14 is located on the cover plate 11 where the photovoltaic panel 12 is not set, and on the photovoltaic panel 12. A surface of the flat layer 14 away from the cover plate 11 is flush.

The number of photovoltaic panels 12 may be multiple, and multiple photovoltaic panels 12 are located in an array on the cover plate 11. The cover plate assembly 1 may include, in addition to the above-described components, the flat layer 14, which is located at an area of the cover plate 11 where the photovoltaic panel 12 is not set, and a side of the photovoltaic panel 12 away from the cover plate 11, so as to play a role of covering and protecting the photovoltaic panel 12. Optionally, the flat layer 14 has light transmittance, and the light can be directed to the photovoltaic panel 12 through the flat layer 14. Moreover, a surface of the flat layer 14 away from the cover plate 11 is flush, i.e., the top surface of the flat layer 14 is set flush, which can improve the flatness of the cover plate assembly 1. Optionally, the material of the flat layer 14 includes, but is not limited to, an Ethylene-tetrafluoroethylene copolymer, and the use of the above material makes the flat layer 14 have characteristics such as heat resistance, abrasion resistance, and scratch resistance.

Optionally, the cover plate assembly 1 further includes a first electrically conductive member (not shown in the figure) and a connector 15. The connector 15 is fixed to one side of the cover plate 11 that is away from the photovoltaic panel 12 and directly faces the photovoltaic panel 12. One end of the first electrically conductive member is electrically connected to the photovoltaic panel 12, and the other end of the first electrically conductive member passes through the bonding layer 13 and the cover plate 11, so as to electrically connect the connector 15.

The cover plate assembly 1 may also include the first electrically conductive member and the connector 15. The connector 15 is fixed to one side of the cover plate 11 away from the photovoltaic panel 12, i.e., the photovoltaic panel 12 is set on the cover plate 11, and the connector 15 is set below the cover plate 11. The connector 15 directly faces the photovoltaic panel 12 to facilitate connection of the first electrically conductive member. One end of the first conductive member is electrically connected to the photovoltaic panel 12, and the other end of the first conductive member passes through the bonding layer 13 and the cover plate 11, so as to electrically connect the connector 15, whereby the first conductive member can be utilized to transmit the converted electrical energy of the photovoltaic panel 12 to the connector 15 through the first conductive member, and then subsequently transmitted by connector 15 to an energy storage device or a power consumption device. Optionally, the first conductive member includes, but is not limited to, a wire.

The cover plate assembly 1 further includes at least one second conductor 162 and at least one third conductor 163. Opposite ends of each second conductor 162 are electrically connected to positive connecting terminals 151 of two adjacent connectors 15. Opposite ends of each third conductor 163 are electrically connected to negative connecting terminals 152 of the two adjacent connectors 15. The second conductor 162 and the third conductor 163 are removably coupled to the connector 15, and/or the length of the second conductor 162 and the third conductor 163 is capable of being elongated and is capable of being restored to its original shape. The second conductor 162 is configured to electrically connect the positive connecting terminals 151 of the two adjacent connectors 15, and the third conductor 163 is configured to electrically connect the negative connecting terminals 152 of the two adjacent connectors 15, thereby connecting the positive connecting terminals 151 and the negative connecting terminals 152 of the multiple cover plate assembly 1 together, which can simplify the layout of the electrical connectors and facilitate subsequent electrical connection to the energy storage device or the power consumption device.

In addition, referring to FIGS. 2, 3 and 55, the foldable cover plate 10 further includes a retaining assembly 7. The retaining assembly 7 includes a first retaining member 71 and a second retaining member 72. The first retaining member 71 is located on a side of the first profile 21 close to the driver's cab 202 away from the tail box 201. The second retaining member 72 is located on a surface of the second profile 22 located on an edge of the middle cover plate 11 close to the tail portion of the tail box 201 facing inwardly toward the tail box 201 When the foldable cover plate 10 is folded twice, the first retaining member 71 and the second retaining member 72 may be connected by means of clamping to hold the foldable cover plate 10 in place, thereby facilitating the stowage of the foldable cover plate 10.

Although embodiments of the present disclosure have been shown and described above, it is to be understood that the above embodiments are exemplary and are not to be construed as a limitation of the present disclosure, and that a person of ordinary skill in the art may make changes, modifications, substitutions, and variations of the above embodiments within the scope of the present disclosure, and that these improvements and embellishments are also considered to be within the scope of protection of the present disclosure.

What is claimed is:

1. A foldable cover plate, wherein the foldable cover plate is configured to be mounted on a tail box of a mobile device, to cover an opening of the tail box, the foldable cover plate comprises:
   a cover plate assembly comprising three cover plates, the three cover plate comprising a first cover plate, a second cover plate and a third cover plate rotationally connected in sequence, the first cover plate being rotatably folded over the second cover plate to expose the opening or the first cover plate being rotatably folded over the second cover plate and the second cover plate being folded over the third cover plate to expose the opening;
   a profile assembly being fixed to a periphery of the first cover plate, the second cover plate and the third cover plate;
   a connecting assembly being connected to the profile assembly;
   a waterproof assembly being mounted to the profile assembly; and
   a locking assembly being mounted to a face of the first cover plate, the second cover plate and the third cover plate facing an interior of the tail box, the locking assembly being configured to fix the first cover plate, the second cover plate and the third cover plate to the tail box;

wherein the profile assembly comprises:
a first profile defining a first clamping hole and a first mounting groove penetrating axially through the first profile, the first clamping hole and the first mounting groove being separated by a first groove wall of the first mounting groove; the first profile being mounted on an edge of a circumferential side of the foldable cover plate through the first mounting groove;

wherein the connecting assembly comprises:
a first connecting member comprising a connecting body, and two first clamping portions respectively fixed to two ends of the connecting body; the first clamping portion comprises a first clamping post, two first bending posts bent and connected to opposite sides of the first clamping post, and two second bending posts each bent and connected to a side of one of the two first bending posts away from the first clamping post; the two second bending posts are disposed in close proximity to each other; wherein a shape and a dimension of the first clamping portion is adapted to the first clamping hole; the two first clamping portions are clamped with the first clamping holes of the two adjacent first profiles on the first cover plate or the third cover plate.

2. The foldable cover plate according to claim 1, wherein the locking assembly comprises a first locking structure; the first locking structure comprises:
a sliding rail being fixed to the third cover plate which is close to a driver's cab of the mobile device, the sliding rail defining a sliding groove;
a sliding block being detachably slidably connected within the sliding groove of the sliding rail; wherein the sliding block comprises a first receiving portion located on one side of the sliding block facing the sliding rail, the first receiving portion defines a receiving groove, the sliding block further defines a first limiting hole penetrating through one side of the sliding block and interconnected with the receiving groove; the sliding block further comprises two limiting ribs located on opposite sides of the first limiting hole;
a threaded rod, wherein one end of the threaded rod is located within the receiving groove, the threaded rod is capable of rotating relative to the sliding block via the first limiting hole, and a gap between the two limiting ribs;
a first locking member being sleeved on the threaded rod; and
a handle being threaded to the threaded rod;
wherein the two limiting ribs cooperatively limit a movement of the threaded rod so that the handle, the first locking member and the threaded rod are received within the sliding groove;
wherein when the threaded rod is subjected to a torsional force departing from the sliding groove, the threaded rod is capable of rotating relative to the sliding block such that the handle, the first locking member and the threaded rod are partially rotated to outside of the sliding groove;
wherein when the first locking member is located outside of the sliding groove, the first locking member is capable of fixing the third cover plate to the tail box through the handle.

3. The foldable cover plate according to claim 2, wherein the sliding groove has a first supporting surface for supporting the sliding block; the sliding block comprises a first surface facing the first supporting surface, and a second surface opposite to the first surface; the first surface comprises the first receiving portion; the first limiting hole penetrates through the first surface, the second surface, a side surface between the first surface and the second surface, and the first receiving portion; the first surface further comprises the two limiting ribs located on opposite sides of the first limiting hole.

4. The foldable cover plate according to claim 1, wherein the locking assembly comprises:
a second locking structure comprising a sliding rail, a sliding block, a threaded rod, a second locking member, a hand shank and a rotating bolt; the sliding rail is fixed to first cover plate which is proximate to a tail portion of the tail box and second cover plate which is located in a center of the tail box;
wherein the sliding rail defines a sliding groove; the sliding block is detachably slidably connected within the sliding groove;
wherein one end of the threaded rod is detachably rotationally connected to the sliding block, the second locking member is sleeved on the threaded rod, the hand shank is rotationally coupled to the second locking member;
wherein the hand shank defines a mounting hole for mounting the rotating bolt; the rotating bolt is threaded to the threaded rod;
wherein the hand shank is configured to:
rotate the rotating bolt in a circumferential direction of the threaded rod, so as to move the second locking member along the threaded rod;
rotate relative to the second locking member to drive the second locking member, and
drive the second locking member to rotate relative to the sliding block into the sliding groove or out of the sliding groove.

5. The foldable cover plate according to claim 4, wherein the sliding rail comprises a bottom rail, two side rails located on two opposite sides of the bottom rail, two first limiting rails respectively connected to the two side rails, two second limiting rails respectively connected to the two first limiting rails; the two first limiting rails are inclined relative to the bottom rail so as to be in close proximity to each other; the two second limiting rails respectively extend from the two first limiting rails so as to be in close proximity to each other; the bottom rail, the two side rails, the two first limiting rails and the two second limiting rails cooperatively form the sliding groove.

6. The foldable cover plate according to claim 1, wherein the first profile comprises a first top wall and a first bottom wall opposite to the first top ball; the first clamping hole has a first supporting member disposed on the first groove wall, a second supporting member disposed on the first bottom wall, and a first fixed member connecting the first supporting member to the second supporting member; the connecting body defines a fourth through hole, the fourth through hole penetrates through one side of the connecting body where the connecting body sets the first clamping portion, and another side of the connecting body opposite to the side of the connecting body where the connecting body sets the first clamping portion; the fourth through hole is configured to allow a first fastener to pass through and fasten with the first fixed member of the first profile; the fourth through hole is located within a space formed by the first clamping post, the first bending post, and the second bending post.

7. The foldable cover plate according to claim 6, wherein the first supporting member, the second supporting member, the first bottom wall, and the first groove wall cooperatively form a first clamping groove; the first bottom wall defines a first through hole interconnected with the first clamping groove; the waterproof assembly comprises a first waterproof structure; the first waterproof structure comprises a first waterproof member; the first waterproof member comprises a first bearing portion and a first clamping rib; the first clamping rib is protruded from one side of the first bearing portion and configured to clamp into the first clamping groove of the first profile which is located close to a driver's cab of the mobile device, and the first clamping groove of the first profile which is located close to a tail portion of the tail box.

8. The foldable cover plate according to claim 7, wherein the first waterproof member further comprises a first water retaining portion, and a first sealing portion; the first water retaining portion protrudes from an opposite side of the first bearing portion; the first sealing portion is bent in a direction away from the first bearing portion so that a second end of the first sealing portion is located on one side of the first water retaining portion away from the first end; the first sealing portion is enclosed with the first bearing portion to form a sealing space; the first water retaining portion is received within the sealing space; in a direction of the first end pointing toward the first water retaining portion, the second end is protruded from the first bearing portion, and the second end of the first sealing portion is capable of rotating relative to the first bearing portion.

9. The foldable cover plate according to claim 6, wherein the first bottom wall protrudes over the first groove wall and the second supporting member.

10. The foldable cover plate according to claim 1, wherein the profile assembly further comprises:
a second profile defining a second through hole and a first mounting groove spaced apart from each other; wherein the second profile wraps an edge of the first cover plate close to the second cover plate through the first mounting groove, or wraps an edge of the third cover plate close to the second cover plate through the first mounting groove, or wraps two edges of the second cover plate respectively close to the first cover plate and the second cover plate through the first mounting groove; the second through hole has a division portion; the second through hole is separated by the division portion into a second clamping hole and a weight reducing hole; the division portion comprises a locking portion located within the weight reducing hole; and the connecting assembly further comprises:
a second connecting member, wherein one side of the second connecting member comprises a second clamping portion and a mounting member spaced apart from each other; the second clamping portion is configured to be inserted into the second clamping hole; the mounting member is configured to be inserted into the weight reducing hole; a height of the second clamping portion is greater than that of the mounting member; another side of the second connecting member comprises a first clamping portion; the second connecting member connects to the first profile and the second profile on the same first cover plate, the same second cover plate, the same third cover plate through the first clamping portion, the second clamping portion and the mounting member.

11. The foldable cover plate according to claim 10, wherein the profile assembly further comprises:
a third profile, wherein the third profile is located between the second profile located at an edge of the third cover plate close to a driver's cab and the second profile located at an edge of the second cover plate in a center of the tail box; one side of the third profile is curved to form a circular second clamping groove; the second clamping groove extends along an extension direction of the third profile; a width of an opening of the second clamping groove is smaller than a diameter of the second clamping groove;
the waterproof assembly comprises a second waterproof structure;
the waterproof structure comprises a sealing plate and two second clamping ribs located on one side of the second clamping plate;
the second waterproof structure is attached to the two second clamping grooves by the two second clamping ribs respectively.

12. The foldable cover plate according to claim 11, wherein a top surface of the second profile defines a second clamping groove; the waterproof assembly comprises a plurality of second waterproof structures;
the waterproof structure comprises a sealing plate and two second clamping ribs located on one side of the second clamping plate; one second clamping rib in the partial second waterproof structure is clamped into one second clamping groove, and the other second clamping rib in the partial second waterproof structure is clamped into another second clamping groove provided at intervals, to block a gap between the two second profiles that are rotationally connected, or to block a gap between the second profile and the third profile that are rotationally connected.

13. The foldable cover plate according to claim 12, wherein the connecting assembly further comprises:
a third connecting member, wherein the third connecting member has an insertion surface for inserting the third profile, the insertion surface has a resisting portion, the resisting portion abuts against a top surface of the sealing plate, the top surface of the sealing plate is opposite to the second clamping rib.

14. The foldable cover plate according to claim 13, wherein along an extension direction of the second clamping rib, the second clamping rib defines a first fixed hole;
the resisting portion abuts against a top surface of the sealing plate, the second connecting member and the third connecting member each defines a locking hole interconnected to the first fixed hole; the locking hole and the first fixed hole are configured to insert the fixed member to fix the second waterproof structure.

15. The foldable cover plate according to claim 11, wherein the foldable cover plate further comprises a rotating mechanism; the rotating mechanism comprises two rotating assemblies rotationally connected; the rotating assembly comprises:
at least two rotating arms comprising a third end and a fourth end opposite to the third end;
a rotating seat comprising a first face, a second face opposite to the first face, and a third face connecting the first face to the second face; wherein the first face of one rotating assembly faces the other rotating assembly; the rotating seat defines at least two second limiting holes penetrating through the first face, the second face and the third face; each of at least two second limiting holes is configured to receive the third end of one rotating arm; the second face defines a sliding groove interconnected with the second limiting hole;

a first rotating shaft penetrating through the third end and being slidably mounted in the sliding groove;

a second rotating shaft, wherein the second rotating shaft of one rotating assembly is rotationally connected to the rotating seat and penetrates through the fourth end of the other rotating assembly, to rotationally connect the rotating arm of the other rotating assembly to the rotating seat of the one rotating assembly;

wherein the rotating mechanism located between the first cover plate which is located close to a tail portion of the tail box and the second cover plate which is located in a center of the tail box is connected to the two second profiles by the two rotating seats; the rotating mechanism located between the third cover plate which is located close to a driver's cab and the second cover plate located which is located in the center of the tail box is connected to the second profile and the third profile respectively through the two rotating seats.

16. The foldable cover plate according to claim 1, wherein the cover plate assembly further comprises:

a photovoltaic panel comprising a light absorbing surface and a backlight surface opposite to the light absorbing surface;

a bonding layer being bonded to the backlight surface;

wherein the three cover plates are bonded to one side of the bonding layer away from the photovoltaic panel; the three cover plates each cover plate comprises a supporting layer and a reinforcing layer; the reinforcing layer is located on at least one side of the supporting layer, the supporting layer comprises a plastic supporting layer or aluminum alloy supporting layer.

17. The foldable cover plate according to claim 16, wherein the supporting layer comprises a plurality of annular supporting portions connected with each other, each annular supporting portion defines a third through hole penetrating along a direction from the light absorbing surface to the backlight surface, an aperture of the third through hole is 5 mm to 15 mm.

18. The foldable cover plate according to claim 17, wherein the three cover plates each further comprises a reinforcement layer and a heat insulation layer located between the supporting layer and the reinforcement layer.

19. The foldable cover plate according to claim 18, wherein a thickness of the reinforcement layer close to the photovoltaic panel is less than that of the reinforcement layer away from the photovoltaic panel.

20. A foldable cover plate, wherein the foldable cover plate is configured to be mounted on a tail box of a mobile device, to cover an opening of the tail box, the foldable cover plate comprises:

a cover plate assembly comprising three cover plates, the three cover plate comprising a first cover plate, a second cover plate and a third cover plate rotationally connected in sequence, the first cover plate being rotatably folded over the second cover plate to expose the opening, or, the first cover plate being rotatably folded over the second cover plate and the second cover plate being folded over the third cover plate to expose the opening;

a profile assembly being fixed to a periphery of the first cover plate, the second cover plate and the third cover plate;

a connecting assembly being connected to the profile assembly;

a waterproof assembly being mounted to the profile assembly; and a locking assembly being mounted to a face of the first cover plate, the second cover plate and the third cover plate facing an interior of the tail box, the locking assembly being configured to fix the first cover plate, the second cover plate and the third cover plate to the tail box;

wherein the cover plate assembly further comprises:

a photovoltaic panel comprising a light absorbing surface and a backlight surface opposite to the light absorbing surface;

a bonding layer being bonded to the backlight surface;

wherein the three cover plates are bonded to one side of the bonding layer away from the photovoltaic panel; the three cover plates each cover plate comprises a supporting layer and a reinforcing layer; the reinforcing layer is located on at least one side of the supporting layer, the supporting layer comprises a plastic supporting layer or aluminum alloy supporting layer;

wherein the supporting layer comprises a plurality of annular supporting portions connected with each other, each annular supporting portion defines a third through hole penetrating along a direction from the light absorbing surface to the backlight surface, an aperture of the third through hole is 5 mm to 15 mm.

\* \* \* \* \*